(12) United States Patent
Fields et al.

(10) Patent No.: US 11,752,860 B2
(45) Date of Patent: Sep. 12, 2023

(54) UTILITY VEHICLE

(71) Applicant: Polaris Industries Inc., Medina, MN (US)

(72) Inventors: Jason R. Fields, Oak Grove, MN (US); Daniel S. Weber, North Branch, MN (US); Amery D. Kuhl, North Branch, MN (US); Andrew J. Miller, Madison, WI (US)

(73) Assignee: Polaris Industries Inc., Medina, MN (US)

( * ) Notice: Subject to any disclaimer, the term of this patent is extended or adjusted under 35 U.S.C. 154(b) by 671 days.

(21) Appl. No.: 16/677,110

(22) Filed: Nov. 7, 2019

(65) Prior Publication Data

US 2020/0070709 A1 Mar. 5, 2020

Related U.S. Application Data

(63) Continuation of application No. 16/229,881, filed on Dec. 21, 2018, now abandoned, which is a (Continued)

(51) Int. Cl.
*B60K 17/04* (2006.01)
*B60K 13/02* (2006.01)
(Continued)

(52) U.S. Cl.
CPC ............... *B60K 17/04* (2013.01); *B60G 3/20* (2013.01); *B60G 15/062* (2013.01);
(Continued)

(58) Field of Classification Search
CPC ........ B60K 17/04; B60K 11/06; B60K 13/02; B60K 17/06; B60K 17/08; F16H 57/0416; B60N 2/01; B60Y 2200/20; B62D 21/183
See application file for complete search history.

(56) References Cited

U.S. PATENT DOCUMENTS

| 1,031,497 A | 7/1912 | West |
| D119,377 S | 3/1940 | Cadwallader |

(Continued)

FOREIGN PATENT DOCUMENTS

| CA | 2746655 A1 | 7/2010 |
| CA | 2903511 A1 | 12/2016 |

(Continued)

OTHER PUBLICATIONS

2016 MUDPRO 700 Limited, Artic Cat, http://www.adiccat.com/dirt/atvs/model/2016-en-mudpro-700-limited/, copyright 2015, 23 pages.

(Continued)

*Primary Examiner* — Frank B Vanaman
(74) *Attorney, Agent, or Firm* — Faegre Drinker Biddle & Reath LLP

(57) ABSTRACT

A utility vehicle includes a plurality of ground-engaging members, a frame, a powertrain assembly, a front suspension assembly, and a rear suspension assembly. A cargo bed may be supported by the frame at the rear of the vehicle. The vehicle also includes an operator seat and at least one passenger seat positioned within an operator area. In one embodiment, the vehicle includes doors to enclose the operator area.

30 Claims, 56 Drawing Sheets

Related U.S. Application Data continuation of application No. 15/154,131, filed on May 13, 2016, now Pat. No. 10,183,605.

(60) Provisional application No. 62/162,354, filed on May 15, 2015.

(51) Int. Cl.

| | | |
|---|---|---|
| *B60K 11/06* | (2006.01) | |
| *B60G 3/20* | (2006.01) | |
| *B60G 15/06* | (2006.01) | |
| *F16H 57/04* | (2010.01) | |
| *B60P 1/04* | (2006.01) | |
| *B60K 13/04* | (2006.01) | |
| *B62D 33/02* | (2006.01) | |
| *B60K 17/08* | (2006.01) | |
| *B60K 5/00* | (2006.01) | |
| *E05D 5/02* | (2006.01) | |
| *E05D 11/06* | (2006.01) | |
| *E05D 3/02* | (2006.01) | |
| *B60G 11/48* | (2006.01) | |
| *B60J 5/04* | (2006.01) | |
| *B60N 2/01* | (2006.01) | |
| *B62D 1/18* | (2006.01) | |
| *B62D 21/18* | (2006.01) | |
| *B60G 3/02* | (2006.01) | |
| *B60K 17/06* | (2006.01) | |
| *B60K 5/04* | (2006.01) | |
| *B60K 37/02* | (2006.01) | |

(52) U.S. Cl.
CPC ............ *B60G 15/065* (2013.01); *B60K 11/06* (2013.01); *B60K 13/02* (2013.01); *F16H 57/0416* (2013.01); *B60G 3/02* (2013.01); *B60G 11/48* (2013.01); *B60G 2200/14* (2013.01); *B60G 2200/156* (2013.01); *B60G 2202/312* (2013.01); *B60G 2300/02* (2013.01); *B60G 2300/07* (2013.01); *B60G 2300/124* (2013.01); *B60J 5/0487* (2013.01); *B60K 5/04* (2013.01); *B60K 13/04* (2013.01); *B60K 17/06* (2013.01); *B60K 17/08* (2013.01); *B60K 37/02* (2013.01); *B60K 2005/003* (2013.01); *B60K 2370/60* (2019.05); *B60K 2370/685* (2019.05); *B60N 2/01* (2013.01); *B60P 1/04* (2013.01); *B60Y 2200/20* (2013.01); *B60Y 2400/72* (2013.01); *B62D 1/18* (2013.01); *B62D 21/183* (2013.01); *B62D 33/02* (2013.01); *E05D 5/0207* (2013.01); *E05D 11/06* (2013.01); *E05D 2003/027* (2013.01); *E05Y 2900/531* (2013.01)

(56) References Cited

U.S. PATENT DOCUMENTS

| | | | |
|---|---|---|---|
| 2,468,809 A | 5/1949 | Brock et al. | |
| 2,553,795 A | 5/1951 | Staude | |
| 2,576,017 A | 11/1951 | John et al. | |
| 2,672,103 A | 3/1954 | Hohmes | |
| 2,757,017 A | 7/1956 | Matthias et al. | |
| 2,833,366 A | 5/1958 | Olley | |
| 3,007,726 A | 11/1961 | Parkin | |
| 3,048,233 A | 8/1962 | Crain | |
| 3,193,302 A | 7/1965 | Hill | |
| 3,292,944 A | 12/1966 | Dangauthier | |
| 3,366,411 A | 1/1968 | Vittone | |
| 3,422,918 A | 1/1969 | Musser | |
| 3,508,764 A | 4/1970 | Dobson et al. | |
| 3,560,022 A | 2/1971 | Gold | |
| 3,600,768 A | 8/1971 | Romanzi et al. | |
| 3,603,422 A | 9/1971 | Cordiano | |
| 3,712,416 A | 1/1973 | Swanson et al. | |
| 3,734,219 A | 5/1973 | Christensen | |
| 3,791,482 A | 2/1974 | Sykora | |
| 3,800,910 A | 4/1974 | Rose | |
| 3,858,902 A | 1/1975 | Howells et al. | |
| 3,861,229 A | 1/1975 | Domaas | |
| D237,873 S | 12/1975 | Johnson | |
| 3,966,014 A | 6/1976 | Gowing | |
| 4,010,975 A | 3/1977 | Horton | |
| 4,027,892 A | 6/1977 | Parks | |
| 4,046,403 A | 9/1977 | Yoshida | |
| 4,098,414 A | 7/1978 | Abiera | |
| 4,109,751 A | 8/1978 | Kabele | |
| 4,114,713 A | 9/1978 | Mery | |
| 4,136,756 A | 1/1979 | Kawamura | |
| 4,217,970 A | 8/1980 | Chika | |
| 4,254,746 A | 3/1981 | Chiba et al. | |
| 4,340,123 A | 7/1982 | Fujikawa | |
| 4,344,718 A | 8/1982 | Taylor | |
| 4,366,878 A | 1/1983 | Warf | |
| 4,425,976 A | 1/1984 | Kimura | |
| 4,429,588 A | 2/1984 | Emundts et al. | |
| 4,434,755 A | 3/1984 | Kazuta | |
| 4,505,169 A | 3/1985 | Ganoung | |
| 4,529,244 A | 7/1985 | Zaydel | |
| 4,561,323 A | 12/1985 | Stromberg | |
| 4,577,716 A | 3/1986 | Norton | |
| 4,592,316 A | 6/1986 | Shiratsuchi et al. | |
| 4,600,072 A | 7/1986 | Krude | |
| 4,641,854 A | 2/1987 | Masuda et al. | |
| 4,650,210 A | 3/1987 | Hirose | |
| 4,671,521 A | 6/1987 | Talbot | |
| 4,681,178 A | 7/1987 | Brown | |
| 4,686,433 A | 8/1987 | Shimizu | |
| 4,705,128 A | 11/1987 | Krude | |
| 4,708,699 A * | 11/1987 | Takano | F16H 57/0006 474/93 |
| 4,712,629 A | 12/1987 | Takahashi | |
| 4,722,548 A | 2/1988 | Hamilton et al. | |
| 4,732,244 A | 3/1988 | Verkuylen | |
| D297,132 S | 8/1988 | Ryuzoji et al. | |
| 4,773,675 A | 9/1988 | Kosuge | |
| 4,779,895 A | 10/1988 | Rubel | |
| D298,811 S | 12/1988 | Morita | |
| 4,817,985 A | 4/1989 | Enokimoto | |
| 4,821,825 A | 4/1989 | Somerton-Rayner | |
| 4,826,205 A | 5/1989 | Kouda et al. | |
| 4,827,416 A | 5/1989 | Kawagoe et al. | |
| D301,849 S | 6/1989 | Oba | |
| 4,867,474 A | 9/1989 | Smith | |
| D305,999 S | 2/1990 | Ueda | |
| 4,927,170 A | 5/1990 | Wada | |
| 4,934,737 A | 6/1990 | Nakatsuka | |
| 4,941,784 A | 7/1990 | Flament | |
| D312,441 S | 11/1990 | Guelfi | |
| 4,967,944 A | 11/1990 | Waters | |
| 4,969,661 A | 11/1990 | Omura et al. | |
| 4,974,697 A | 12/1990 | Krude | |
| 5,010,970 A | 4/1991 | Yamamoto | |
| 5,015,009 A | 5/1991 | Ohyama et al. | |
| 5,016,728 A | 5/1991 | Zulawski | |
| 5,016,903 A | 5/1991 | Kijima et al. | |
| 5,020,616 A | 6/1991 | Yagi | |
| 5,021,721 A | 6/1991 | Oshita | |
| 5,024,460 A | 6/1991 | Hanson et al. | |
| 5,027,915 A | 7/1991 | Suzuki | |
| 5,036,939 A | 8/1991 | Johnson et al. | |
| 5,038,582 A | 8/1991 | Takamatsu | |
| 5,044,614 A | 9/1991 | Rau | |
| 5,048,860 A | 9/1991 | Kanai et al. | |
| 5,062,654 A | 11/1991 | Kakimoto et al. | |
| 5,062,657 A | 11/1991 | Majeed | |
| 5,074,374 A | 12/1991 | Ohtake et al. | |
| 5,076,383 A | 12/1991 | Inoue | |
| 5,078,225 A | 1/1992 | Ohmura | |
| 5,080,392 A | 1/1992 | Bazergui | |
| 5,083,827 A | 1/1992 | Hollenbaugh, Sr. | |

(56) References Cited

U.S. PATENT DOCUMENTS

| | | |
|---|---|---|
| D327,237 S | 6/1992 | Miyamoto et al. |
| 5,163,538 A | 11/1992 | Derr et al. |
| 5,167,433 A | 12/1992 | Ryan |
| 5,181,696 A | 1/1993 | Abe |
| 5,189,615 A | 2/1993 | Rubel et al. |
| 5,195,607 A | 3/1993 | Shimada |
| 5,201,562 A | 4/1993 | Dorsey |
| 5,203,585 A | 4/1993 | Pierce |
| 5,205,371 A | 4/1993 | Kamopp |
| 5,251,713 A | 10/1993 | Enokimoto |
| 5,251,718 A | 10/1993 | Inagawa et al. |
| 5,253,730 A | 10/1993 | Hayashi |
| 5,306,044 A | 4/1994 | Tucker |
| 5,327,989 A | 7/1994 | Furuhashi |
| 5,342,023 A | 8/1994 | Kuriki et al. |
| D354,264 S | 1/1995 | McCoy |
| 5,390,121 A | 2/1995 | Wolfe |
| 5,473,990 A | 12/1995 | Anderson |
| 5,475,596 A | 12/1995 | Henry et al. |
| 5,483,448 A | 1/1996 | Liubakka et al. |
| 5,507,510 A | 4/1996 | Kami et al. |
| D373,099 S | 8/1996 | Molzon |
| 5,549,428 A | 8/1996 | Yeatts |
| 5,550,739 A | 8/1996 | Hoffmann et al. |
| D374,416 S | 10/1996 | Miyamoto et al. |
| 5,562,066 A | 10/1996 | Gere et al. |
| 5,653,304 A | 8/1997 | Renfroe |
| D383,095 S | 9/1997 | Miyamoto et al. |
| 5,676,292 A | 10/1997 | Miller |
| 5,678,847 A | 10/1997 | Izawa et al. |
| 5,697,633 A | 12/1997 | Lee |
| D391,911 S | 3/1998 | Lagaay |
| 5,738,471 A | 4/1998 | Zentner |
| 5,752,791 A | 5/1998 | Ehrlich |
| 5,776,568 A | 7/1998 | Andress |
| 5,816,650 A | 10/1998 | Lucas |
| 5,819,702 A | 10/1998 | Mendler |
| 5,820,114 A | 10/1998 | Tsai |
| 5,820,150 A | 10/1998 | Archer et al. |
| 5,863,277 A | 1/1999 | Melbourne |
| D405,029 S | 2/1999 | Deutschman |
| 5,887,671 A | 3/1999 | Yuki |
| 5,895,063 A | 4/1999 | Hasshi |
| 5,921,343 A | 7/1999 | Yamakaji |
| 5,950,750 A | 9/1999 | Dong et al. |
| 5,954,364 A | 9/1999 | Nechushtan |
| 5,957,252 A | 9/1999 | Berthold |
| D414,735 S | 10/1999 | Gerisch |
| 5,961,106 A | 10/1999 | Shaffer |
| 5,961,135 A | 10/1999 | Smock |
| 6,000,702 A | 12/1999 | Streiter |
| D421,934 S | 3/2000 | Hunter |
| D421,935 S | 3/2000 | Fujieda |
| 6,032,752 A | 3/2000 | Karpik et al. |
| 6,056,077 A | 5/2000 | Kobayashi |
| 6,067,078 A | 5/2000 | Hartman |
| 6,070,681 A | 6/2000 | Catanzarite et al. |
| 6,070,689 A | 6/2000 | Tanaka et al. |
| 6,078,252 A | 6/2000 | Kulczycki et al. |
| D428,363 S | 7/2000 | Sugimoto et al. |
| 6,086,158 A | 7/2000 | Zeoli |
| 6,092,877 A | 7/2000 | Rasidescu et al. |
| D429,663 S | 8/2000 | Tamashima et al. |
| 6,095,275 A | 8/2000 | Shaw |
| 6,098,739 A | 8/2000 | Anderson |
| 6,112,866 A | 9/2000 | Boichot et al. |
| 6,113,328 A | 9/2000 | Claucherty |
| 6,120,399 A | 9/2000 | Okeson |
| 6,142,123 A | 11/2000 | Galasso et al. |
| 6,149,540 A | 11/2000 | Johnson et al. |
| 6,152,253 A | 11/2000 | Monaghan |
| D436,557 S | 1/2001 | Selby et al. |
| D436,559 S | 1/2001 | Fujieda |
| 6,176,796 B1 | 1/2001 | Lislegard |
| 6,186,547 B1 | 2/2001 | Skabrond et al. |
| 6,196,634 B1 | 3/2001 | Jurinek |
| 6,199,894 B1 | 3/2001 | Anderson |
| 6,202,993 B1 | 3/2001 | Wilms |
| 6,216,809 B1 | 4/2001 | Etou et al. |
| 6,224,046 B1 | 5/2001 | Miyamoto |
| 6,247,442 B1 | 6/2001 | Bedard et al. |
| 6,249,728 B1 | 6/2001 | Streiter |
| 6,293,588 B1 | 9/2001 | Clune |
| 6,293,617 B1 | 9/2001 | Sukegawa |
| 6,309,024 B1 | 10/2001 | Busch |
| 6,328,364 B1 | 12/2001 | Darbishire |
| 6,352,142 B1 | 3/2002 | Kim |
| 6,370,458 B1 | 4/2002 | Shal et al. |
| 6,412,585 B1 | 7/2002 | DeAnda |
| D461,151 S | 8/2002 | Morris |
| 6,467,787 B1 | 10/2002 | Marsh |
| D467,200 S | 12/2002 | Luo |
| 6,502,886 B1 | 1/2003 | Bleau et al. |
| 6,507,778 B2 | 1/2003 | Koh |
| 6,523,627 B2 | 2/2003 | Fukuda |
| 6,523,634 B1 | 2/2003 | Gagnon et al. |
| RE38,012 E | 3/2003 | Ochab et al. |
| D472,193 S | 3/2003 | Sinkwitz |
| 6,530,730 B2 | 3/2003 | Swensen |
| 6,547,224 B2 | 4/2003 | Jensen |
| 6,553,761 B2 | 4/2003 | Beck |
| 6,581,716 B1 | 6/2003 | Matsuura |
| 6,582,002 B2 | 6/2003 | Hogan |
| 6,582,004 B1 | 6/2003 | Hamm |
| D476,935 S | 7/2003 | Boyer |
| 6,588,536 B1 | 7/2003 | Chiu |
| 6,604,034 B1 | 8/2003 | Speck et al. |
| 6,622,806 B1 | 9/2003 | Matsuura |
| 6,622,968 B1 | 9/2003 | St et al. |
| 6,626,256 B2 | 9/2003 | Dennison et al. |
| 6,626,260 B2 | 9/2003 | Gagnon |
| D480,991 S | 10/2003 | Rondeau et al. |
| 6,644,709 B2 | 11/2003 | Inagaki et al. |
| 6,648,569 B2 | 11/2003 | Douglass et al. |
| 6,651,768 B2 | 11/2003 | Fournier et al. |
| 6,655,717 B1 | 12/2003 | Wang |
| 6,682,118 B2 | 1/2004 | Ryan |
| 6,685,174 B2 | 2/2004 | Behmenburg et al. |
| 6,695,566 B2 | 2/2004 | Rodriguez Navio |
| 6,722,463 B1 | 4/2004 | Reese |
| 6,725,962 B1 | 4/2004 | Fukuda |
| D490,018 S | 5/2004 | Berg |
| 6,732,830 B2 | 5/2004 | Gagnon et al. |
| 6,733,060 B1 | 5/2004 | Pavkov |
| 6,745,862 B2 | 6/2004 | Morii et al. |
| 6,752,235 B1 | 6/2004 | Bell et al. |
| 6,752,401 B2 | 6/2004 | Burdock |
| D492,916 S | 7/2004 | Rondeau et al. |
| 6,767,022 B1 | 7/2004 | Chevalier |
| D493,749 S | 8/2004 | Duncan |
| D493,750 S | 8/2004 | Crepeau et al. |
| D494,890 S | 8/2004 | Katoh |
| D496,308 S | 9/2004 | Wu |
| 6,786,526 B1 | 9/2004 | Blalock |
| D497,324 S | 10/2004 | Chestnut |
| D497,327 S | 10/2004 | Lai |
| 6,799,779 B2 | 10/2004 | Shibayama |
| 6,799,781 B2 | 10/2004 | Rasidescu et al. |
| D498,435 S | 11/2004 | Saito |
| 6,820,708 B2 | 11/2004 | Nakamura |
| 6,827,184 B1 | 12/2004 | Lin |
| 6,834,736 B2 | 12/2004 | Kramer et al. |
| D501,570 S | 2/2005 | Tandrup |
| 6,851,679 B2 | 2/2005 | Downey et al. |
| 6,857,498 B2 | 2/2005 | Vitale et al. |
| 6,860,826 B1 | 3/2005 | Johnson |
| 6,868,932 B1 | 3/2005 | Davis et al. |
| D503,657 S | 4/2005 | Katoh |
| D503,658 S | 4/2005 | Lu |
| D503,905 S | 4/2005 | Saito |
| 6,880,875 B2 | 4/2005 | McClure et al. |
| 6,883,851 B2 | 4/2005 | McClure et al. |
| D504,638 S | 5/2005 | Tanaka |
| 6,892,842 B2 | 5/2005 | Bouffard |

(56) References Cited

U.S. PATENT DOCUMENTS

| | | |
|---|---|---|
| 6,895,318 B1 | 5/2005 | Barton et al. |
| D507,766 S | 7/2005 | McMahan |
| 6,916,142 B2 | 7/2005 | Hansen et al. |
| D508,224 S | 8/2005 | Mays |
| 6,923,507 B1 | 8/2005 | Billberg et al. |
| 6,938,508 B1 | 9/2005 | Saagge |
| 6,942,050 B1 | 9/2005 | Honkala |
| 6,945,541 B2 | 9/2005 | Brown |
| RE38,895 E | 11/2005 | McLemore |
| D511,317 S | 11/2005 | Tanaka |
| D511,717 S | 11/2005 | Lin |
| 6,966,399 B2 | 11/2005 | Tanigaki |
| 6,976,720 B1 | 12/2005 | Bequette |
| 6,978,857 B2 | 12/2005 | Korenjak |
| D513,718 S | 1/2006 | Itaya et al. |
| 6,988,759 B2 | 1/2006 | Fin |
| 7,000,931 B1 | 2/2006 | Chevalier |
| 7,004,137 B2 | 2/2006 | Kunugi |
| D516,467 S | 3/2006 | Wu |
| D517,951 S | 3/2006 | Luh |
| D517,952 S | 3/2006 | Luh |
| 7,011,174 B1 | 3/2006 | James |
| 7,014,241 B2 | 3/2006 | Toyota |
| D518,759 S | 4/2006 | Kettler et al. |
| D519,439 S | 4/2006 | Dahl |
| 7,032,895 B2 | 4/2006 | Folchert |
| 7,035,836 B2 | 4/2006 | Caponetto et al. |
| D520,912 S | 5/2006 | Knight et al. |
| D520,914 S | 5/2006 | Luh |
| D521,413 S | 5/2006 | Katoh |
| 7,040,437 B1 | 5/2006 | Fredrickson |
| D522,924 S | 6/2006 | Yokoyama et al. |
| D523,782 S | 6/2006 | Lin |
| 7,055,454 B1 | 6/2006 | Whiting et al. |
| 7,070,527 B1 * | 7/2006 | Saagge ............... F16H 57/0489 474/93 |
| 7,076,351 B2 | 7/2006 | Hamilton et al. |
| 7,077,233 B2 | 7/2006 | Hasegawa |
| 7,096,988 B2 | 8/2006 | Moriyama |
| 7,097,166 B2 | 8/2006 | Folchert |
| D529,414 S | 10/2006 | Wu et al. |
| D531,088 S | 10/2006 | Lin |
| 7,118,151 B2 | 10/2006 | Bejin et al. |
| 7,124,853 B1 | 10/2006 | Kole, Jr. |
| 7,125,134 B1 | 10/2006 | Hedlund et al. |
| D532,339 S | 11/2006 | Hishiki |
| 7,136,729 B2 | 11/2006 | Salman et al. |
| 7,137,764 B2 | 11/2006 | Johnson |
| 7,140,619 B2 | 11/2006 | Hrovat et al. |
| 7,143,861 B2 | 12/2006 | Chu |
| 7,147,075 B2 | 12/2006 | Tanaka |
| D535,215 S | 1/2007 | Turner et al. |
| 7,156,439 B2 | 1/2007 | Bejin et al. |
| 7,159,557 B2 | 1/2007 | Yasuda |
| 7,168,516 B2 | 1/2007 | Nozaki et al. |
| 7,168,709 B2 | 1/2007 | Niwa et al. |
| 7,172,232 B2 | 2/2007 | Chiku et al. |
| 7,182,169 B2 | 2/2007 | Suzuki |
| 7,185,732 B2 | 3/2007 | Saito |
| D539,705 S | 4/2007 | Ichikawa et al. |
| D542,186 S | 5/2007 | Lai et al. |
| D542,188 S | 5/2007 | Miwa et al. |
| 7,213,669 B2 | 5/2007 | Fecteau |
| 7,216,733 B2 | 5/2007 | Iwami |
| 7,234,707 B2 | 6/2007 | Green et al. |
| D546,246 S | 7/2007 | Crepeau et al. |
| 7,237,789 B1 | 7/2007 | Herman |
| 7,239,032 B1 | 7/2007 | Wilson et al. |
| D548,662 S | 8/2007 | Markefka |
| D549,133 S | 8/2007 | LePage |
| 7,258,355 B2 | 8/2007 | Amano |
| 7,270,335 B2 | 9/2007 | Hio et al. |
| 7,275,512 B2 | 10/2007 | Deiss et al. |
| 7,281,753 B2 | 10/2007 | Curtis |
| 7,286,919 B2 | 10/2007 | Nordgren et al. |
| 7,287,619 B2 | 10/2007 | Tanaka |
| D555,036 S | 11/2007 | Eck |
| D561,064 S | 2/2008 | Crepeau |
| D562,189 S | 2/2008 | Miwa et al. |
| D563,274 S | 3/2008 | Ramos |
| 7,347,296 B2 | 3/2008 | Nakamura |
| 7,357,207 B2 | 4/2008 | Vaeisaenen |
| 7,357,211 B2 | 4/2008 | Inui |
| 7,359,787 B2 | 4/2008 | Ono et al. |
| 7,367,247 B2 | 5/2008 | Horiuchi |
| 7,367,417 B2 | 5/2008 | Inui |
| 7,370,724 B2 | 5/2008 | Saito |
| 7,374,012 B2 | 5/2008 | Inui |
| 7,377,351 B2 | 5/2008 | Smith |
| 7,380,622 B2 | 6/2008 | Shimizu |
| 7,380,805 B1 | 6/2008 | Turner |
| 7,386,378 B2 | 6/2008 | Lauwerys et al. |
| 7,387,180 B2 | 6/2008 | Konno |
| 7,401,794 B2 | 7/2008 | Laurent et al. |
| 7,401,797 B2 | 7/2008 | Cho |
| 7,407,190 B2 | 8/2008 | Berg et al. |
| 7,416,234 B2 | 8/2008 | Bequette |
| 7,421,954 B2 | 9/2008 | Bose |
| 7,427,072 B2 | 9/2008 | Brown |
| D578,433 S | 10/2008 | Kawaguchi |
| D578,934 S | 10/2008 | Tanaka |
| 7,431,024 B2 | 10/2008 | Buckwitz |
| 7,438,147 B2 | 10/2008 | Kato |
| 7,438,153 B2 * | 10/2008 | Kalsnes ............... B60K 17/34 180/908 |
| 7,441,789 B2 | 10/2008 | Geiger et al. |
| 7,458,593 B2 | 12/2008 | Saito |
| D584,661 S | 1/2009 | Tanaka et al. |
| 7,481,293 B2 | 1/2009 | Ogawa |
| 7,483,775 B2 | 1/2009 | Karaba et al. |
| D585,792 S | 2/2009 | Chao et al. |
| D586,694 S | 2/2009 | Huang |
| 7,490,694 B1 | 2/2009 | Berg |
| 7,497,299 B2 | 3/2009 | Kobayashi |
| 7,497,471 B2 | 3/2009 | Kobayashi |
| 7,497,472 B2 | 3/2009 | Cymbal et al. |
| 7,503,610 B2 | 3/2009 | Karagitz et al. |
| 7,510,060 B2 | 3/2009 | Izawa et al. |
| D592,556 S | 5/2009 | Mehra |
| D592,557 S | 5/2009 | Mehra |
| D592,998 S | 5/2009 | Woodard |
| D593,454 S | 6/2009 | Sanschagrin et al. |
| D595,188 S | 6/2009 | Tandrup |
| 7,540,511 B2 | 6/2009 | Saito |
| D595,613 S | 7/2009 | Lai |
| D596,080 S | 7/2009 | Lai et al. |
| 7,565,944 B2 | 7/2009 | Sakamoto |
| 7,565,945 B2 | 7/2009 | Okada |
| D597,890 S | 8/2009 | Lai et al. |
| 7,571,039 B2 | 8/2009 | Chen et al. |
| 7,575,088 B2 | 8/2009 | Mir et al. |
| D599,250 S | 9/2009 | Hirano |
| D599,251 S | 9/2009 | Yin et al. |
| 7,588,010 B2 | 9/2009 | Mochizuki et al. |
| 7,591,472 B2 | 9/2009 | Kinjyo et al. |
| 7,597,385 B2 | 10/2009 | Shibata |
| 7,600,603 B2 | 10/2009 | Okada |
| 7,600,762 B2 | 10/2009 | Yasui et al. |
| 7,600,769 B2 | 10/2009 | Bessho et al. |
| 7,604,084 B2 | 10/2009 | Okada |
| 7,610,132 B2 | 10/2009 | Yanai |
| D604,201 S | 11/2009 | Kawaguchi |
| 7,611,154 B2 | 11/2009 | Delaney |
| 7,623,327 B2 | 11/2009 | Ogawa |
| D605,555 S | 12/2009 | Tanaka |
| D606,900 S | 12/2009 | Flores |
| D606,905 S | 12/2009 | Yao |
| 7,625,048 B2 | 12/2009 | Rouhana et al. |
| 7,630,807 B2 | 12/2009 | Yoshimura et al. |
| D607,377 S | 1/2010 | Shimomura |
| 7,641,208 B1 | 1/2010 | Barron et al. |
| 7,644,791 B2 | 1/2010 | Davis et al. |
| 7,644,934 B2 | 1/2010 | Mizuta |
| D609,136 S | 2/2010 | Renchuan |

(56) References Cited

U.S. PATENT DOCUMENTS

| | | |
|---|---|---|
| D610,514 S | 2/2010 | Eck |
| 7,677,646 B2 | 3/2010 | Nakamura |
| 7,682,115 B1 | 3/2010 | Jay et al. |
| 7,684,911 B2 | 3/2010 | Seifert et al. |
| 7,694,769 B2 | 4/2010 | McGuire |
| 7,703,826 B1 | 4/2010 | German |
| 7,708,103 B2 | 5/2010 | Okuyama et al. |
| 7,708,106 B1 | 5/2010 | Bergman et al. |
| 7,717,495 B2 | 5/2010 | Leonard |
| 7,728,212 B2 | 6/2010 | Fujishima et al. |
| 7,740,103 B2 | 6/2010 | Sasajima |
| 7,740,256 B2 | 6/2010 | Davis |
| 7,742,851 B2 | 6/2010 | Hisada |
| D620,399 S | 7/2010 | Wu et al. |
| 7,751,959 B2 | 7/2010 | Boon et al. |
| D621,423 S | 8/2010 | Nakanishi |
| D622,631 S | 8/2010 | Lai |
| 7,778,741 B2 | 8/2010 | Rao et al. |
| 7,786,886 B2 | 8/2010 | Maruyama et al. |
| 7,788,212 B2 | 8/2010 | Beckmann et al. |
| 7,795,602 B2 | 9/2010 | Leonard |
| D625,662 S | 10/2010 | Li |
| 7,810,818 B2 | 10/2010 | Bushko |
| 7,819,220 B2 | 10/2010 | Sunsdahl |
| 7,832,770 B2 | 11/2010 | Bradley et al. |
| D628,520 S | 12/2010 | Lin |
| 7,857,334 B2 | 12/2010 | Seki |
| D631,395 S | 1/2011 | Tandrup |
| 7,862,061 B2 | 1/2011 | Jung |
| D633,006 S | 2/2011 | Sanschagrin |
| 7,885,750 B2 | 2/2011 | Lu |
| 7,891,684 B1 | 2/2011 | Luttinen et al. |
| 7,899,594 B2 | 3/2011 | Messih et al. |
| 7,912,610 B2 | 3/2011 | Saito et al. |
| 7,913,505 B2 | 3/2011 | Nakamura |
| 7,913,782 B1 | 3/2011 | Foss |
| D636,295 S | 4/2011 | Eck et al. |
| D636,704 S | 4/2011 | Yoo |
| 7,926,822 B2 | 4/2011 | Ohletz et al. |
| 7,931,106 B1 * | 4/2011 | Suzuki ............... B62D 23/005 180/908 |
| D638,755 S | 5/2011 | Bracy et al. |
| 7,942,427 B2 | 5/2011 | Lloyd |
| 7,950,486 B2 | 5/2011 | Van et al. |
| D640,171 S | 6/2011 | Danisi |
| D640,598 S | 6/2011 | Zhang |
| D640,604 S | 6/2011 | Lai et al. |
| D640,605 S | 6/2011 | Lai et al. |
| 7,954,679 B2 | 6/2011 | Edwards |
| 7,959,163 B2 | 6/2011 | Beno et al. |
| 7,962,261 B2 | 6/2011 | Bushko et al. |
| 7,963,529 B2 | 6/2011 | Oteman et al. |
| 7,970,512 B2 | 6/2011 | Lu et al. |
| D641,288 S | 7/2011 | Sun |
| 7,984,915 B2 | 7/2011 | Post et al. |
| D642,493 S | 8/2011 | Goebert |
| D643,781 S | 8/2011 | Nagao et al. |
| 8,002,061 B2 | 8/2011 | Yamamura et al. |
| 8,005,596 B2 | 8/2011 | Lu et al. |
| 8,027,775 B2 | 9/2011 | Takenaka et al. |
| 8,032,281 B2 | 10/2011 | Bujak et al. |
| 8,047,324 B2 | 11/2011 | Yao |
| 8,050,818 B2 | 11/2011 | Mizuta |
| 8,050,857 B2 | 11/2011 | Lu et al. |
| 8,052,202 B2 | 11/2011 | Nakamura |
| 8,056,392 B2 | 11/2011 | Ryan et al. |
| 8,056,912 B2 | 11/2011 | Kawabe et al. |
| 8,065,054 B2 | 11/2011 | Tarasinski et al. |
| D650,311 S | 12/2011 | Bracy |
| 8,075,002 B1 | 12/2011 | Pionke et al. |
| 8,079,602 B2 | 12/2011 | Kinsman et al. |
| 8,086,371 B2 | 12/2011 | Furuichi et al. |
| 8,087,676 B2 | 1/2012 | Mcintyre |
| 8,095,268 B2 | 1/2012 | Parison et al. |
| 8,100,434 B2 | 1/2012 | Miura |
| 8,104,524 B2 | 1/2012 | Manesh |
| 8,108,104 B2 | 1/2012 | Hrovat et al. |
| 8,116,938 B2 | 2/2012 | Itagaki et al. |
| 8,121,757 B2 | 2/2012 | Song et al. |
| D657,720 S | 4/2012 | Eck et al. |
| D657,721 S | 4/2012 | Miyanishi |
| 8,152,880 B2 | 4/2012 | Matschl |
| D660,746 S | 5/2012 | Bracy |
| 8,167,325 B2 | 5/2012 | Lee et al. |
| 8,170,749 B2 | 5/2012 | Mizuta |
| 8,176,957 B2 | 5/2012 | Manesh |
| 8,205,910 B2 | 6/2012 | Leonard et al. |
| 8,209,087 B2 | 6/2012 | Haegglund et al. |
| D662,855 S | 7/2012 | Wang |
| 8,214,106 B2 | 7/2012 | Ghoneim et al. |
| 8,215,694 B2 | 7/2012 | Smith et al. |
| 8,219,262 B2 | 7/2012 | Stiller |
| 8,229,642 B2 | 7/2012 | Post et al. |
| 8,231,164 B2 | 7/2012 | Schubring et al. |
| D665,309 S | 8/2012 | Lepine et al. |
| D665,705 S | 8/2012 | Lepine et al. |
| 8,260,496 B2 | 9/2012 | Gagliano |
| 8,271,175 B2 | 9/2012 | Takenaka et al. |
| D668,184 S | 10/2012 | Tashiro |
| 8,296,010 B2 | 10/2012 | Hirao et al. |
| D671,037 S | 11/2012 | Wu et al. |
| 8,302,711 B2 | 11/2012 | Kinsman et al. |
| 8,308,170 B2 | 11/2012 | Van et al. |
| 8,315,764 B2 | 11/2012 | Chen et al. |
| 8,321,088 B2 | 11/2012 | Brown et al. |
| 8,322,497 B2 | 12/2012 | Marjoram et al. |
| 8,328,235 B2 | 12/2012 | Schneider |
| D674,728 S | 1/2013 | Matsumura |
| 8,352,143 B2 | 1/2013 | Lu et al. |
| 8,355,840 B2 | 1/2013 | Ammon et al. |
| 8,374,748 B2 | 2/2013 | Jolly |
| 8,376,373 B2 | 2/2013 | Conradie |
| 8,376,441 B2 | 2/2013 | Nakamura et al. |
| 8,382,125 B2 | 2/2013 | Sunsdahl |
| 8,396,627 B2 | 3/2013 | Jung et al. |
| D680,468 S | 4/2013 | Li et al. |
| D680,469 S | 4/2013 | Li et al. |
| 8,417,417 B2 | 4/2013 | Chen et al. |
| 8,424,832 B2 | 4/2013 | Robbins et al. |
| 8,434,774 B2 | 5/2013 | Leclerc et al. |
| 8,442,720 B2 | 5/2013 | Lu et al. |
| 8,444,161 B2 | 5/2013 | Leclerc et al. |
| 8,447,489 B2 | 5/2013 | Murata et al. |
| 8,457,841 B2 | 6/2013 | Knoll et al. |
| 8,464,824 B1 | 6/2013 | Reisenberger |
| 8,465,050 B1 | 6/2013 | Spindler et al. |
| 8,473,157 B2 | 6/2013 | Savaresi et al. |
| 8,517,136 B2 | 8/2013 | Hurd et al. |
| 8,517,395 B2 | 8/2013 | Knox et al. |
| 8,522,911 B2 | 9/2013 | Hurd et al. |
| 8,538,628 B2 | 9/2013 | Backman |
| D691,519 S | 10/2013 | Fisher |
| D691,924 S | 10/2013 | Smith |
| 8,548,678 B2 | 10/2013 | Ummethala et al. |
| 8,548,710 B1 | 10/2013 | Reisenberger |
| 8,550,221 B2 | 10/2013 | Paulides et al. |
| 8,556,015 B2 | 10/2013 | Itoo |
| 8,573,605 B2 | 11/2013 | Di Maria |
| D694,671 S | 12/2013 | Lai et al. |
| 8,596,398 B2 | 12/2013 | Bennett |
| 8,596,405 B2 | 12/2013 | Sunsdahl |
| 8,613,335 B2 | 12/2013 | Deckard |
| 8,613,336 B2 | 12/2013 | Deckard et al. |
| 8,613,337 B2 | 12/2013 | Kinsman |
| 8,626,388 B2 | 1/2014 | Oikawa |
| 8,626,389 B2 | 1/2014 | Sidlosky |
| 8,640,814 B2 | 2/2014 | Deckard |
| 8,641,052 B2 | 2/2014 | Kondo et al. |
| 8,645,024 B2 | 2/2014 | Daniels |
| 8,651,557 B2 | 2/2014 | Suzuki |
| 8,657,050 B2 | 2/2014 | Yamaguchi |
| D701,143 S | 3/2014 | Shan |
| D701,469 S | 3/2014 | Lai et al. |
| 8,672,106 B2 | 3/2014 | Laird et al. |

(56) References Cited

U.S. PATENT DOCUMENTS

| | | |
|---|---|---|
| 8,672,337 B2 | 3/2014 | Van et al. |
| D703,102 S | 4/2014 | Eck et al. |
| 8,700,260 B2 | 4/2014 | Jolly et al. |
| 8,712,599 B1 | 4/2014 | Westpfahl |
| 8,712,639 B2 | 4/2014 | Lu et al. |
| 8,718,872 B2 | 5/2014 | Hirao et al. |
| 8,725,351 B1 | 5/2014 | Selden et al. |
| 8,731,774 B2 | 5/2014 | Yang |
| 8,746,719 B2 | 6/2014 | Safranski et al. |
| 8,781,705 B1 | 7/2014 | Reisenberger |
| D711,778 S | 8/2014 | Chun et al. |
| D712,311 S | 9/2014 | Morgan et al. |
| 8,827,019 B2 | 9/2014 | Deckard |
| 8,827,020 B2 | 9/2014 | Deckard et al. |
| 8,827,025 B2 | 9/2014 | Hapka |
| 8,827,028 B2 | 9/2014 | Sunsdahl |
| D719,061 S | 12/2014 | Tandrup et al. |
| D721,300 S | 1/2015 | Li et al. |
| D722,538 S | 2/2015 | Song et al. |
| 8,944,449 B2 | 2/2015 | Hurd et al. |
| 8,960,347 B2 | 2/2015 | Bennett |
| 8,998,253 B2 | 4/2015 | Novotny et al. |
| 9,010,768 B2 | 4/2015 | Kinsman et al. |
| 9,016,760 B2 | 4/2015 | Kuroda |
| 9,027,937 B2 | 5/2015 | Ryan et al. |
| 9,061,711 B2 | 6/2015 | Kuroda et al. |
| D734,689 S | 7/2015 | Hashimoto |
| D735,615 S | 8/2015 | Itaya et al. |
| 9,211,924 B2 | 12/2015 | Safranski et al. |
| 9,217,501 B2 | 12/2015 | Deckard et al. |
| 9,266,417 B2 | 2/2016 | Nadeau et al. |
| D751,467 S | 3/2016 | Lai et al. |
| 9,365,251 B2 | 6/2016 | Safranski et al. |
| D761,698 S | 7/2016 | Umemoto |
| 9,381,803 B2 | 7/2016 | Galsworthy et al. |
| D763,732 S | 8/2016 | Okuyama et al. |
| D764,973 S | 8/2016 | Mikhailov et al. |
| 9,421,860 B2 | 8/2016 | Schuhmacher et al. |
| 9,428,031 B2 | 8/2016 | Kuwabara et al. |
| 9,434,244 B2 | 9/2016 | Sunsdahl |
| 9,469,329 B1 | 10/2016 | Leanza |
| D774,955 S | 12/2016 | Lai et al. |
| D774,957 S | 12/2016 | Umemoto |
| 9,540,052 B2 | 1/2017 | Burt, II et al. |
| 9,566,858 B2 | 2/2017 | Tsuchiya |
| 9,573,561 B2 | 2/2017 | Muto et al. |
| 9,592,713 B2 | 3/2017 | Kinsman |
| D787,985 S | 5/2017 | Wilcox et al. |
| 9,649,928 B2 | 5/2017 | Danielson et al. |
| 9,650,078 B2 | 5/2017 | Kinsman et al. |
| 9,713,976 B2 | 7/2017 | Miller |
| 9,718,351 B2 | 8/2017 | Ripley et al. |
| 9,725,023 B2 | 8/2017 | Miller |
| 9,776,481 B2 | 10/2017 | Deckard |
| 9,789,909 B2 | 10/2017 | Erspamer et al. |
| 9,809,102 B2 | 11/2017 | Sunsdahl et al. |
| 9,895,946 B2 | 2/2018 | Schlangen et al. |
| 9,908,577 B2 | 3/2018 | Novak et al. |
| 9,944,177 B2 | 4/2018 | Fischer et al. |
| 10,011,189 B2 | 7/2018 | Sunsdahl et al. |
| 10,017,090 B2 | 7/2018 | Franker |
| D832,149 S | 10/2018 | Wilcox et al. |
| 10,099,547 B2 | 10/2018 | Bessho et al. |
| 10,112,555 B2 | 10/2018 | Aguilera et al. |
| 10,124,709 B2 | 11/2018 | Bohnsack |
| D835,545 S | 12/2018 | Hanten et al. |
| 10,154,377 B2 | 12/2018 | Post et al. |
| 10,183,605 B2 | 1/2019 | Weber |
| 10,300,786 B2 | 5/2019 | Nugteren |
| D852,674 S | 7/2019 | Wilcox et al. |
| 10,359,011 B2 | 7/2019 | Dewit |
| 10,369,861 B2 | 8/2019 | Deckard |
| 10,479,422 B2 | 11/2019 | Hollman et al. |
| 10,718,238 B2 | 7/2020 | Wenger et al. |
| 10,800,250 B2 | 10/2020 | Nugteren et al. |
| 10,864,828 B2 | 12/2020 | Sunsdahl et al. |
| 10,926,618 B2 | 2/2021 | Deckard et al. |
| 10,926,664 B2 | 2/2021 | Sunsdahl et al. |
| 10,946,736 B2 | 3/2021 | Fischer et al. |
| 10,960,941 B2 | 3/2021 | Endrizzi et al. |
| 11,173,808 B2 | 11/2021 | Swain et al. |
| 11,285,807 B2 | 3/2022 | Galsworthy et al. |
| 2001/0005803 A1 | 6/2001 | Cochofel et al. |
| 2001/0007396 A1 | 7/2001 | Mizuta |
| 2001/0013433 A1 | 8/2001 | Szymkowiak |
| 2001/0021887 A1 | 9/2001 | Obradovich et al. |
| 2001/0031185 A1 | 10/2001 | Swensen |
| 2001/0035642 A1 | 11/2001 | Gotz et al. |
| 2001/0041126 A1 | 11/2001 | Morin et al. |
| 2002/0023792 A1 | 2/2002 | Bouffard |
| 2002/0063440 A1 | 5/2002 | Spurr |
| 2002/0074760 A1 | 6/2002 | Eshelman |
| 2002/0082752 A1 | 6/2002 | Obradovich |
| 2002/0135175 A1 | 9/2002 | Schroth |
| 2002/0147072 A1 | 10/2002 | Goodell et al. |
| 2002/0178968 A1 | 12/2002 | Christensen |
| 2003/0001409 A1 | 1/2003 | Semple et al. |
| 2003/0015531 A1 | 1/2003 | Choi |
| 2003/0029413 A1 | 2/2003 | Sachdev et al. |
| 2003/0057724 A1 | 3/2003 | Inagaki et al. |
| 2003/0125857 A1 | 7/2003 | Madau et al. |
| 2003/0132075 A1 | 7/2003 | Drivers |
| 2003/0137121 A1 | 7/2003 | Lenz et al. |
| 2003/0168267 A1 | 9/2003 | Borroni-Bird |
| 2003/0173754 A1 | 9/2003 | Bryant |
| 2003/0200016 A1 | 10/2003 | Spillane et al. |
| 2003/0205867 A1 | 11/2003 | Coelingh et al. |
| 2003/0213628 A1 | 11/2003 | Rioux |
| 2004/0010383 A1 | 1/2004 | Lu et al. |
| 2004/0041358 A1 | 3/2004 | Hrovat et al. |
| 2004/0079561 A1 | 4/2004 | Ozawa et al. |
| 2004/0090020 A1 | 5/2004 | Braswell |
| 2004/0094912 A1 | 5/2004 | Niwa et al. |
| 2004/0107591 A1 | 6/2004 | Cuddy |
| 2004/0108159 A1 | 6/2004 | Rondeau et al. |
| 2004/0153782 A1 | 8/2004 | Fukui |
| 2004/0169347 A1 | 9/2004 | Seki |
| 2004/0195018 A1 | 10/2004 | Inui |
| 2004/0195019 A1 | 10/2004 | Kato |
| 2004/0195034 A1 | 10/2004 | Kato |
| 2004/0195797 A1 | 10/2004 | Nash et al. |
| 2004/0206567 A1 | 10/2004 | Kato et al. |
| 2004/0206568 A1 | 10/2004 | Davis et al. |
| 2004/0207190 A1 | 10/2004 | Nakagawa et al. |
| 2004/0221669 A1 | 11/2004 | Shimizu |
| 2004/0226384 A1 | 11/2004 | Shimizu |
| 2004/0231630 A1 | 11/2004 | Liebert |
| 2004/0231900 A1 | 11/2004 | Tanaka |
| 2005/0006168 A1 | 1/2005 | Iwasaka et al. |
| 2005/0012421 A1 | 1/2005 | Fukuda |
| 2005/0045414 A1 | 3/2005 | Takagi |
| 2005/0056472 A1 | 3/2005 | Smith et al. |
| 2005/0073187 A1 | 4/2005 | Frank et al. |
| 2005/0077098 A1 | 4/2005 | Takayanagi |
| 2005/0098964 A1 | 5/2005 | Brown |
| 2005/0131604 A1 | 6/2005 | Lu |
| 2005/0173177 A1 | 8/2005 | Smith |
| 2005/0173180 A1 | 8/2005 | Hypes et al. |
| 2005/0206111 A1 | 9/2005 | Gibson et al. |
| 2005/0231145 A1 | 10/2005 | Mukai |
| 2005/0235767 A1 | 10/2005 | Shimizu |
| 2005/0235768 A1 | 10/2005 | Shimizu |
| 2005/0242677 A1 | 11/2005 | Akutsu |
| 2005/0246052 A1 | 11/2005 | Coleman |
| 2005/0248116 A1 | 11/2005 | Fanson |
| 2005/0248173 A1 | 11/2005 | Bejin et al. |
| 2005/0257989 A1 | 11/2005 | Iwami |
| 2005/0257990 A1 | 11/2005 | Shimizu |
| 2005/0267660 A1 | 12/2005 | Fujiwara |
| 2005/0269141 A1 | 12/2005 | Davis |
| 2005/0279244 A1 | 12/2005 | Bose |
| 2005/0279330 A1 | 12/2005 | Okazaki |
| 2005/0280219 A1 | 12/2005 | Brown |
| 2006/0000458 A1 | 1/2006 | Dees et al. |

(56) References Cited

U.S. PATENT DOCUMENTS

| | | |
|---|---|---|
| 2006/0006010 A1 | 1/2006 | Nakamura |
| 2006/0006696 A1 | 1/2006 | Umemoto |
| 2006/0017240 A1 | 1/2006 | Laurent et al. |
| 2006/0017301 A1 | 1/2006 | Edwards |
| 2006/0022619 A1 | 2/2006 | Koike |
| 2006/0032690 A1 | 2/2006 | Inomoto et al. |
| 2006/0032700 A1 | 2/2006 | Vizanko |
| 2006/0042862 A1 | 3/2006 | Saito |
| 2006/0055139 A1 | 3/2006 | Furumi |
| 2006/0065472 A1 | 3/2006 | Ogawa |
| 2006/0071441 A1 | 4/2006 | Mathis |
| 2006/0075840 A1 | 4/2006 | Saito |
| 2006/0076180 A1 | 4/2006 | Saito |
| 2006/0108174 A1 | 5/2006 | Saito |
| 2006/0131088 A1 | 6/2006 | Pawusch et al. |
| 2006/0162990 A1 | 7/2006 | Saito |
| 2006/0169525 A1 | 8/2006 | Saito |
| 2006/0175124 A1 | 8/2006 | Saito |
| 2006/0180383 A1 | 8/2006 | Bataille |
| 2006/0180385 A1 | 8/2006 | Yanai |
| 2006/0181104 A1 | 8/2006 | Khan et al. |
| 2006/0185741 A1 | 8/2006 | McKee |
| 2006/0185927 A1 | 8/2006 | Sakamoto |
| 2006/0191734 A1 | 8/2006 | Kobayashi |
| 2006/0191735 A1 | 8/2006 | Kobayashi |
| 2006/0191737 A1 | 8/2006 | Kobayashi |
| 2006/0191739 A1 | 8/2006 | Koga |
| 2006/0196721 A1 | 9/2006 | Saito |
| 2006/0196722 A1 | 9/2006 | Makabe |
| 2006/0201270 A1 | 9/2006 | Kobayashi |
| 2006/0207823 A1 | 9/2006 | Okada |
| 2006/0207824 A1 | 9/2006 | Saito |
| 2006/0207825 A1 | 9/2006 | Okada |
| 2006/0208564 A1 | 9/2006 | Yuda |
| 2006/0212200 A1 | 9/2006 | Yanai |
| 2006/0219452 A1 | 10/2006 | Okada |
| 2006/0219463 A1 | 10/2006 | Seki et al. |
| 2006/0219469 A1 | 10/2006 | Okada |
| 2006/0219470 A1 | 10/2006 | Imagawa |
| 2006/0220330 A1 | 10/2006 | Urquidi et al. |
| 2006/0220341 A1 | 10/2006 | Seki et al. |
| 2006/0236980 A1 | 10/2006 | Maruo et al. |
| 2006/0255610 A1 | 11/2006 | Bejin et al. |
| 2006/0270503 A1 | 11/2006 | Suzuki |
| 2006/0278197 A1 | 12/2006 | Takamatsu et al. |
| 2006/0288800 A1 | 12/2006 | Mukai |
| 2007/0000715 A1 | 1/2007 | Denney |
| 2007/0013181 A1 | 1/2007 | Heck |
| 2007/0018419 A1 | 1/2007 | Kinouchi et al. |
| 2007/0023221 A1 | 2/2007 | Okuyama et al. |
| 2007/0023566 A1 | 2/2007 | Howard |
| 2007/0068726 A1 | 3/2007 | Shimizu |
| 2007/0073461 A1 | 3/2007 | Fielder |
| 2007/0074588 A1 | 4/2007 | Harata |
| 2007/0074589 A1 | 4/2007 | Harata |
| 2007/0074927 A1 | 4/2007 | Okada |
| 2007/0074928 A1 | 4/2007 | Okada |
| 2007/0095601 A1 | 5/2007 | Okada |
| 2007/0096449 A1 | 5/2007 | Okada |
| 2007/0119650 A1 | 5/2007 | Eide |
| 2007/0120332 A1 | 5/2007 | Bushko et al. |
| 2007/0158920 A1 | 7/2007 | Delaney |
| 2007/0175696 A1 | 8/2007 | Saito |
| 2007/0214818 A1 | 9/2007 | Nakamura |
| 2007/0215404 A1 | 9/2007 | Lan |
| 2007/0221430 A1 | 9/2007 | Allison, Sr. |
| 2007/0227793 A1 | 10/2007 | Nozaki |
| 2007/0242398 A1 | 10/2007 | Ogawa |
| 2007/0255466 A1 | 11/2007 | Chiao |
| 2007/0256882 A1 | 11/2007 | Bedard et al. |
| 2007/0261904 A1 | 11/2007 | Fecteau |
| 2008/0023240 A1 | 1/2008 | Sunsdahl |
| 2008/0023249 A1 | 1/2008 | Sunsdahl |
| 2008/0028603 A1 | 2/2008 | Takegawa et al. |
| 2008/0041335 A1 | 2/2008 | Buchwitz |
| 2008/0053738 A1 | 3/2008 | Kosuge |
| 2008/0053743 A1 | 3/2008 | Tomita |
| 2008/0059034 A1 | 3/2008 | Lu |
| 2008/0084091 A1 | 4/2008 | Nakamura |
| 2008/0093883 A1 | 4/2008 | Shibata |
| 2008/0106115 A1 | 5/2008 | Hughes |
| 2008/0143505 A1 | 6/2008 | Maruyama et al. |
| 2008/0172155 A1 | 7/2008 | Takamatsu et al. |
| 2008/0183353 A1 | 7/2008 | Post et al. |
| 2008/0199253 A1 | 8/2008 | Okada |
| 2008/0243336 A1 | 10/2008 | Fitzgibbons |
| 2008/0256738 A1 | 10/2008 | Malone |
| 2008/0257630 A1 | 10/2008 | Takeshima |
| 2008/0275606 A1 | 11/2008 | Tarasinski et al. |
| 2008/0283326 A1 | 11/2008 | Bennett et al. |
| 2008/0284124 A1 | 11/2008 | Brady |
| 2008/0296884 A1 | 12/2008 | Rouhana et al. |
| 2008/0308334 A1 | 12/2008 | Leonard |
| 2009/0000849 A1 | 1/2009 | Leonard |
| 2009/0001748 A1 | 1/2009 | Brown et al. |
| 2009/0014977 A1 | 1/2009 | Molenaar |
| 2009/0037051 A1 | 2/2009 | Shimizu et al. |
| 2009/0065285 A1 | 3/2009 | Maeda et al. |
| 2009/0071737 A1 | 3/2009 | Leonard |
| 2009/0071739 A1 | 3/2009 | Leonard |
| 2009/0078082 A1 | 3/2009 | Poskie et al. |
| 2009/0078491 A1 | 3/2009 | Tsutsumikoshi |
| 2009/0090575 A1 | 4/2009 | Nagasaka |
| 2009/0091101 A1 | 4/2009 | Leonard |
| 2009/0093928 A1 | 4/2009 | Getman et al. |
| 2009/0108546 A1 | 4/2009 | Ohletz et al. |
| 2009/0108617 A1 | 4/2009 | Songwe, Jr. |
| 2009/0121518 A1 | 5/2009 | Leonard |
| 2009/0152035 A1 | 6/2009 | Okada |
| 2009/0152036 A1 | 6/2009 | Okada |
| 2009/0178871 A1 | 7/2009 | Sunsdahl et al. |
| 2009/0184531 A1 | 7/2009 | Yamamura et al. |
| 2009/0189373 A1 | 7/2009 | Schramm et al. |
| 2009/0205891 A1 | 8/2009 | Parrett et al. |
| 2009/0240427 A1 | 9/2009 | Siereveld et al. |
| 2009/0261542 A1 | 10/2009 | Mcintyre |
| 2009/0301830 A1 | 12/2009 | Kinsman |
| 2009/0302590 A1 | 12/2009 | Van Bronkhorst |
| 2010/0017059 A1 | 1/2010 | Lu et al. |
| 2010/0057297 A1 | 3/2010 | Itagaki et al. |
| 2010/0078256 A1 | 4/2010 | Kuwabara et al. |
| 2010/0090797 A1 | 4/2010 | Koenig et al. |
| 2010/0121529 A1 | 5/2010 | Savaresi et al. |
| 2010/0152969 A1 | 6/2010 | Li et al. |
| 2010/0155170 A1 | 6/2010 | Melvin |
| 2010/0187032 A1 | 7/2010 | Yamamura |
| 2010/0187033 A1 | 7/2010 | Hayashi et al. |
| 2010/0194086 A1 | 8/2010 | Takashi |
| 2010/0194087 A1 | 8/2010 | Yamamura et al. |
| 2010/0211261 A1 | 8/2010 | Sasaki et al. |
| 2010/0230876 A1 | 9/2010 | Inoue et al. |
| 2010/0252972 A1 | 10/2010 | Cox et al. |
| 2010/0253018 A1 | 10/2010 | Peterson |
| 2010/0301571 A1 | 12/2010 | Van et al. |
| 2010/0314184 A1 | 12/2010 | Stenberg |
| 2010/0314191 A1 | 12/2010 | Deckard et al. |
| 2010/0317484 A1 | 12/2010 | Gillingham et al. |
| 2010/0317485 A1 | 12/2010 | Gillingham et al. |
| 2011/0035089 A1 | 2/2011 | Hirao et al. |
| 2011/0035105 A1 | 2/2011 | Jolly |
| 2011/0062748 A1 | 3/2011 | Kaita |
| 2011/0074123 A1 | 3/2011 | Fought et al. |
| 2011/0094813 A1 | 4/2011 | Suzuki |
| 2011/0094816 A1 | 4/2011 | Suzuki |
| 2011/0094818 A1 | 4/2011 | Suzuki et al. |
| 2011/0153158 A1 | 6/2011 | Acocella |
| 2011/0155087 A1 | 6/2011 | Wenger |
| 2011/0209937 A1 | 9/2011 | Belzile et al. |
| 2011/0240250 A1 | 10/2011 | Azuma |
| 2011/0297462 A1 | 12/2011 | Grajkowski et al. |
| 2011/0298189 A1 | 12/2011 | Schneider |
| 2011/0309118 A1 | 12/2011 | Wada |
| 2012/0029770 A1 | 2/2012 | Hirao et al. |
| 2012/0031693 A1 | 2/2012 | Deckard |

(56) References Cited

U.S. PATENT DOCUMENTS

| | | |
|---|---|---|
| 2012/0031694 A1 | 2/2012 | Deckard et al. |
| 2012/0053790 A1 | 3/2012 | Oikawa |
| 2012/0053791 A1 | 3/2012 | Harada |
| 2012/0055728 A1* | 3/2012 | Bessho ............... B60K 17/344 180/292 |
| 2012/0073527 A1 | 3/2012 | Oltmans |
| 2012/0073537 A1 | 3/2012 | Oltmans |
| 2012/0078470 A1 | 3/2012 | Hirao et al. |
| 2012/0085588 A1 | 4/2012 | Kinsman et al. |
| 2012/0119454 A1 | 5/2012 | Di Maria |
| 2012/0161468 A1 | 6/2012 | Tsumiyama |
| 2012/0168268 A1 | 7/2012 | Bruno et al. |
| 2012/0193163 A1 | 8/2012 | Wimpfheimer et al. |
| 2012/0212013 A1 | 8/2012 | Ripley |
| 2012/0217078 A1 | 8/2012 | Kinsman |
| 2012/0223500 A1 | 9/2012 | Kinsman |
| 2012/0247888 A1 | 10/2012 | Chikuma et al. |
| 2012/0265402 A1 | 10/2012 | Post et al. |
| 2012/0277953 A1 | 11/2012 | Savaresi et al. |
| 2013/0009350 A1 | 1/2013 | Wolf-Monheim |
| 2013/0018559 A1 | 1/2013 | Epple et al. |
| 2013/0030650 A1 | 1/2013 | Norris et al. |
| 2013/0033070 A1 | 2/2013 | Kinsman |
| 2013/0041545 A1 | 2/2013 | Baer et al. |
| 2013/0060423 A1 | 3/2013 | Jolly |
| 2013/0060444 A1 | 3/2013 | Matsunaga et al. |
| 2013/0074487 A1 | 3/2013 | Herold et al. |
| 2013/0079988 A1 | 3/2013 | Hirao et al. |
| 2013/0087396 A1 | 4/2013 | Itoo et al. |
| 2013/0103259 A1 | 4/2013 | Eng et al. |
| 2013/0158799 A1 | 6/2013 | Kamimura |
| 2013/0161921 A1 | 6/2013 | Cheng et al. |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0199097 A1 | 8/2013 | Spindler et al. |
| 2013/0218414 A1 | 8/2013 | Meitinger et al. |
| 2013/0226405 A1 | 8/2013 | Koumura et al. |
| 2013/0261893 A1 | 10/2013 | Yang |
| 2013/0304319 A1 | 11/2013 | Daniels |
| 2013/0319785 A1 | 12/2013 | Spindler et al. |
| 2013/0328277 A1 | 12/2013 | Ryan et al. |
| 2013/0334394 A1 | 12/2013 | Parison et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0005888 A1 | 1/2014 | Bose et al. |
| 2014/0008136 A1 | 1/2014 | Bennett |
| 2014/0012467 A1 | 1/2014 | Knox et al. |
| 2014/0034409 A1 | 2/2014 | Nakamura et al. |
| 2014/0046539 A1 | 2/2014 | Wijffels et al. |
| 2014/0058606 A1 | 2/2014 | Hilton |
| 2014/0060954 A1 | 3/2014 | Smith |
| 2014/0062048 A1 | 3/2014 | Schlangen |
| 2014/0065936 A1 | 3/2014 | Smith |
| 2014/0067215 A1 | 3/2014 | Wetterlund |
| 2014/0095022 A1 | 4/2014 | Cashman |
| 2014/0102819 A1 | 4/2014 | Deckard et al. |
| 2014/0102820 A1 | 4/2014 | Deckard |
| 2014/0103627 A1 | 4/2014 | Deckard et al. |
| 2014/0109627 A1 | 4/2014 | Lee |
| 2014/0125018 A1 | 5/2014 | Brady |
| 2014/0129083 A1 | 5/2014 | Gibson |
| 2014/0131971 A1 | 5/2014 | Hou |
| 2014/0136048 A1 | 5/2014 | Ummethala |
| 2014/0156143 A1 | 6/2014 | Evangelou |
| 2014/0167372 A1 | 6/2014 | Kim |
| 2014/0203533 A1 | 7/2014 | Safranski |
| 2014/0217774 A1 | 8/2014 | Peterson |
| 2014/0262584 A1 | 9/2014 | Lovold et al. |
| 2014/0294195 A1 | 10/2014 | Perez et al. |
| 2014/0353956 A1 | 12/2014 | Bjerketvedt |
| 2014/0358373 A1 | 12/2014 | Kikuchi |
| 2014/0360794 A1 | 12/2014 | Tallman |
| 2015/0002404 A1 | 1/2015 | Hooton |
| 2015/0029018 A1 | 1/2015 | Bowden |
| 2015/0039199 A1 | 2/2015 | Kikuchi |
| 2015/0047917 A1 | 2/2015 | Burt et al. |
| 2015/0057885 A1 | 2/2015 | Brady et al. |
| 2015/0061275 A1 | 3/2015 | Deckard |
| 2015/0210137 A1 | 7/2015 | Kinsman et al. |
| 2016/0059660 A1 | 3/2016 | Brady et al. |
| 2016/0061314 A1 | 3/2016 | Kuhl |
| 2016/0108866 A1 | 4/2016 | Dewit et al. |
| 2016/0176283 A1 | 6/2016 | Hicke et al. |
| 2016/0176284 A1 | 6/2016 | Nugteren et al. |
| 2016/0332553 A1 | 11/2016 | Miller et al. |
| 2016/0341148 A1 | 11/2016 | Maki et al. |
| 2017/0013336 A1 | 1/2017 | Stys et al. |
| 2017/0106747 A1 | 4/2017 | Safranski et al. |
| 2017/0120946 A1 | 5/2017 | Gong et al. |
| 2017/0131095 A1 | 5/2017 | Kim |
| 2017/0152810 A1 | 6/2017 | Wicks |
| 2017/0175621 A1 | 6/2017 | Schenkel |
| 2017/0199094 A1 | 7/2017 | Duff et al. |
| 2017/0334500 A1 | 11/2017 | Jarek et al. |
| 2018/0022391 A1 | 1/2018 | Erspamer et al. |
| 2018/0142609 A1 | 5/2018 | Seo et al. |
| 2019/0110161 A1 | 4/2019 | Rentz et al. |
| 2019/0143871 A1 | 5/2019 | Weber |
| 2019/0193501 A1 | 6/2019 | Brady et al. |
| 2019/0210457 A1 | 7/2019 | Galsworthy et al. |
| 2019/0210668 A1 | 7/2019 | Endrizzi et al. |
| 2019/0217909 A1 | 7/2019 | Deckard et al. |
| 2019/0256010 A1 | 8/2019 | Baba et al. |
| 2019/0264635 A1 | 8/2019 | Oltmans et al. |
| 2019/0265064 A1 | 8/2019 | Koenig et al. |
| 2019/0306599 A1 | 10/2019 | Nagai et al. |
| 2019/0367117 A1 | 12/2019 | Fischer |
| 2020/0001673 A1 | 1/2020 | Schlangen et al. |
| 2020/0010125 A1 | 1/2020 | Peterson et al. |
| 2020/0122776 A1 | 4/2020 | Schlangen et al. |
| 2020/0262285 A1 | 8/2020 | Sunsdahl et al. |
| 2020/0346542 A1 | 11/2020 | Rasa et al. |
| 2021/0024007 A1 | 1/2021 | Fredrickson et al. |
| 2021/0213822 A1 | 7/2021 | Ripley et al. |
| 2021/0354542 A1 | 11/2021 | Schleif et al. |

FOREIGN PATENT DOCUMENTS

| | | |
|---|---|---|
| CH | 317335 A | 11/1956 |
| CN | 2255379 Y | 6/1997 |
| CN | 2544987 Y | 4/2003 |
| CN | 1660615 A | 8/2005 |
| CN | 1746803 A | 3/2006 |
| CN | 1749048 A | 3/2006 |
| CN | 1810530 A | 8/2006 |
| CN | 101511664 | 8/2009 |
| CN | 101549626 A | 10/2009 |
| CN | 201723635 U | 1/2011 |
| CN | 102069813 A | 5/2011 |
| CN | 102168732 A | 8/2011 |
| CN | 201914049 U | 8/2011 |
| CN | 202040257 U | 11/2011 |
| CN | 102616104 A | 8/2012 |
| CN | 102627063 A | 8/2012 |
| CN | 102678808 A | 9/2012 |
| CN | 102729760 A | 10/2012 |
| CN | 202468817 U | 10/2012 |
| CN | 102840265 A | 12/2012 |
| CN | 202986930 | 6/2013 |
| CN | 212690200 U | 3/2021 |
| DE | 37435 | 1/1886 |
| DE | 0116605 C | 2/1900 |
| DE | 1755101 A1 | 4/1971 |
| DE | 2210070 | 9/1973 |
| DE | 2752798 A1 | 6/1978 |
| DE | 3007726 A1 | 9/1981 |
| DE | 3033707 A1 | 4/1982 |
| DE | 4129643 A1 | 3/1993 |
| DE | 19508302 A1 | 9/1996 |
| DE | 19949787 | 4/2000 |
| DE | 19922745 A1 | 12/2000 |

(56) References Cited

FOREIGN PATENT DOCUMENTS

| | | |
|---|---|---|
| DE | 202005005999 U1 | 8/2006 |
| DE | 102010020544 A1 | 1/2011 |
| DE | 102016012781 A1 | 4/2017 |
| EP | 0237085 | 9/1987 |
| EP | 0238077 A2 | 9/1987 |
| EP | 0398804 A1 | 11/1990 |
| EP | 0403803 A1 | 12/1990 |
| EP | 0544108 A1 | 6/1993 |
| EP | 0546295 A1 | 6/1993 |
| EP | 0405123 | 10/1993 |
| EP | 0568251 | 11/1993 |
| EP | 0575962 | 12/1993 |
| EP | 0473766 | 2/1994 |
| EP | 0691226 A1 | 1/1996 |
| EP | 0697306 A1 | 2/1996 |
| EP | 0709247 A2 | 5/1996 |
| EP | 0794096 A2 | 9/1997 |
| EP | 0893618 | 1/1999 |
| EP | 1013310 | 6/2000 |
| EP | 1172239 A2 | 1/2002 |
| EP | 1215107 A1 | 6/2002 |
| EP | 1219475 A1 | 7/2002 |
| EP | 1449688 A2 | 8/2004 |
| EP | 1493624 | 1/2005 |
| EP | 1164897 | 2/2005 |
| EP | 1557345 A2 | 7/2005 |
| EP | 1564123 A2 | 8/2005 |
| EP | 2057060 | 5/2009 |
| EP | 2123933 A2 | 11/2009 |
| EP | 2236395 | 6/2010 |
| EP | 2517904 A1 | 10/2012 |
| FR | 2460797 | 1/1981 |
| FR | 2907410 A1 | 4/2008 |
| FR | 2914597 | 10/2008 |
| FR | 2935642 | 3/2010 |
| FR | 2936028 | 3/2010 |
| GB | 2036659 | 7/1980 |
| GB | 2081191 | 2/1982 |
| GB | 2316923 | 3/1998 |
| GB | 2347398 A | 9/2000 |
| GB | 2423066 | 8/2006 |
| JP | 53-101625 U | 8/1978 |
| JP | 60-067206 | 4/1985 |
| JP | 60-067268 A | 4/1985 |
| JP | 60-067269 A | 4/1985 |
| JP | 02-155815 A | 6/1990 |
| JP | 04-368211 A | 12/1992 |
| JP | 05-149443 A | 6/1993 |
| JP | 05-178055 A | 7/1993 |
| JP | 06-156036 A | 6/1994 |
| JP | 6325977 | 11/1994 |
| JP | 7040783 | 2/1995 |
| JP | 07-117433 A | 5/1995 |
| JP | 2898949 B2 | 6/1999 |
| JP | 11-334447 A | 12/1999 |
| JP | 2000-177434 A | 6/2000 |
| JP | 2001-018623 A | 1/2001 |
| JP | 3137209 B2 | 2/2001 |
| JP | 2001-121939 A | 5/2001 |
| JP | 2001130304 | 5/2001 |
| JP | 2002-219921 A | 8/2002 |
| JP | 2003-237530 | 8/2003 |
| JP | 2004308453 | 11/2004 |
| JP | 2005-193788 | 7/2005 |
| JP | 2006-232058 | 9/2006 |
| JP | 2006-232061 | 9/2006 |
| JP | 2006-256579 | 9/2006 |
| JP | 2006-256580 | 9/2006 |
| JP | 2006-281839 | 10/2006 |
| JP | 2007-083864 A | 4/2007 |
| JP | 2007-106319 | 4/2007 |
| JP | 2009-035220 A | 2/2009 |
| JP | 2009-160964 A | 7/2009 |
| JP | 2010-95106 | 4/2010 |
| JP | 2011-126405 A | 6/2011 |
| JP | 2017-043130 A | 3/2017 |
| WO | 92/10693 A1 | 6/1992 |
| WO | 1998/30430 | 7/1998 |
| WO | 00/53057 A1 | 9/2000 |
| WO | 03/70543 A1 | 8/2003 |
| WO | 2007/103197 | 9/2007 |
| WO | 2008/005131 A2 | 1/2008 |
| WO | 2008/013564 | 1/2008 |
| WO | 2008/016377 | 2/2008 |
| WO | 2008/115459 A1 | 9/2008 |
| WO | 2009/096998 | 8/2009 |
| WO | 2010/074990 A2 | 7/2010 |
| WO | 2010/148014 | 12/2010 |
| WO | 2012/040553 | 3/2012 |
| WO | 2016/186942 | 3/2012 |
| WO | 2012/109546 | 8/2012 |
| WO | 2012/174793 | 12/2012 |
| WO | 2013/166310 | 11/2013 |
| WO | 2014/039432 | 3/2014 |
| WO | 2014/039433 | 3/2014 |
| WO | 2014/047488 A1 | 3/2014 |
| WO | 2014/059258 | 4/2014 |
| WO | 2014/143953 | 9/2014 |
| WO | 2014/193975 | 12/2014 |
| WO | 2016/038591 A1 | 3/2016 |
| WO | 2016/099770 A2 | 6/2016 |
| WO | 2018/118176 A1 | 6/2018 |
| WO | 2018/118508 A2 | 6/2018 |
| WO | 2019/140026 A1 | 7/2019 |
| WO | 2020/223379 A1 | 11/2020 |

OTHER PUBLICATIONS

2nd Written Opinion of the International Searching Authority in PCT/US2011/046395, dated Mar. 1, 2013, 9 pages.
Diver Down Snorkel for Polaris Scrambler 850/1000, High Lifter, last accessed Nov. 4, 2015, http://www.highlifter.com/p-4687-diver-down-snorkel-for-polaris-scrambler--8501000-see-apps.aspx; 1 page.
International Preliminary Report on Patentability, dated May 28, 2013, for related International Patent Application No. PCT/US2011/046395, 31 pages.
International Search Report of the International Searching Authority, dated Sep. 4, 2012, for related International Patent Application No. PCT/US2011/046395; 6 pages.
Outlander X mr850, available at https://can-am.brp.com/off-road/atv/outlander/outlander-x-mr-850.html; .Copyrgt. 2003-2017; 3 pages.
Radiator Relocation Kit for Polaris Scrambler, High Lifter, http://www.highlifter.com/p-4598-radiator-relocation-kit-for-polaris-scra- mbler-8501000-see-apps.aspx, last accessed Nov. 4, 2015, 1 page.
Radiator Relocation Kit-Polaris Sportsman 550/850, High Lifter, http://www.highlifter.com/p-2686-radiator-relocation-kit-polaris-sportsma- n-550850-see-apps.aspx, last accessed Nov. 4, 2015, 2 pages.
Redline Specs, copyright 2008, available at www.RedlinePerforms.com., 2 pages.
Renegade X MR 1000R, Can-Am, http://can-am.brp.com/off-road/atv/renegade/renegade-x-mr-1000R.html, copyright 2003-2015, 12 pages.
Troy Merrifield & Damon Flippo, Rise of the Machine: Let the "Revolution" Begin. One Seat at a Time., Cartwheelin' Magazine, published at least as early as Jan. 2008, available at http://www.1redline.com/news.sub.-events/PDF/cart.sub.-wheelin.sub.-ar- ticle.pdf, last accessed on Feb. 15, 2012, pp. 14-19.
Troy Merrifield, Redline's Rockin' Riot, UTV Off-Road Magazine, published in vol. 4, Issue 1, Feb./Mar. 2009, available at http://www.1redline.com/news.sub.-events/PDF/Redline.sub.-Riot.sub.-Ar- ticle.sub.-01.sub.-2009.pdf., last accessed on Feb. 15, 2012, pp. 16-19.
Written Opinion of the International Searching Authority, dated Feb. 3, 2013, for related International Patent Application No. PCT/US2011/046395; 7 pages.
Second Office Action issued by the China National Intellectual Property Administration, dated Jul. 3, 2020, for Chinese Patent Application No. 201680028024.5; 7 pages.

(56) References Cited

OTHER PUBLICATIONS

International Search Report and Written Opinion of the International Searching Authority, dated Sep. 19, 2016, for International Patent Application No. PCT/US2016/031992; 22 pages.
New for 2004, Yamaha Rhino 660 4×4, ATV Connection Magazine, copyright 2006; 3 pages.
Yamaha, Company Website, 2006 Rhino 450 Auto 4×4, copyright 2005; 3 pages.
Yamaha, Company Website, 2006 Rhino 660 Auto 4×4 Special Edition, copyright 2006; 4 pages.
Yamaha, Company Website, 2006 Rhino 660 Auto 4×4, copyright 2006; 4 pages.
Yamaha, Company Website, Rhino 660 Auto 4×4 Exploring Edition Specifications, copyright 2006; 3 pages.
Arctic Cat, Company Website, Prowler XT650 H1, undated; 9 pages.
Club Car, Company Website, product pages for XRT 1500 SE, undated; 2 pages.
Honda Hippo 1800 New Competition for Yamaha's Rhino, Dirt Wheels Magazine, Apr. 2006; pp. 91-92.
Buyer's Guide Supplement, 2006 Kart Guide, Powersports Business Magazine; 6 pages.
BRP Can-Am Commander photo, undated; 1 page.
Polaris Ranger Welcome to Ranger Country Brochure 2006, copyright 2005; 24 pages.
Polaris Ranger Brochure ATVs and Side x Sides Brochure 2010, copyright 2009; 26 pages.
Polaris Ranger RZR Brochure 2011, copyright 2010; 16 pages.
Polaris Ranger Brochure 2011, copyright 2010; 22 pages.
Kawasaki Mule Utility Vehicle Brochure 2009, copyright 2008; 10 pages.
Kawasaki Mule The Off-Road Capable 610 4×4 XC Brochure 2011, copyright 2010; 6 pages.
Kawasaki Teryx Recreation Utility Vehicle Brochure 2009, copyright 2008; 8 pages.
Kawasaki Teryx 750 FI 4×4 Sport Brochure 2011, copyright 2010; 6 pages.
Polaris Ranger Off-Road Utility Vehicles Brochure 2004, copyright 2003; 20 pages.
Polaris Ranger Work/Play Only Brochure 2008, copyright 2007; 28 pages.
Polaris Ranger Brochure 2009, copyright 2008; 32 pages.
International Search Report and Written Opinion issued by the European Patent Office, dated Jul. 6, 2012, for International Patent Application No. PCT/US2012/024664; 19 pages.
International Preliminary Report on Patentability issued by the European Patent Office, dated Mar. 8, 2013, for International Patent Application No. PCT/US2012/024664; 24 pages.
International Search Report and Written Opinion issued by the European Patent Office, dated Jul. 31, 2013, for International Patent Application No. PCT/US2013/039304; 11 pages.
International Search Report and Written Opinion issued by the European Patent Office, dated Sep. 19, 2014, for International Patent Application No. PCT/US2014/039824; 9 pages.
International Search Report and Written Opinion issued by the European Patent Office, dated Oct. 9, 2014, for International Patent Application No. PCT/US2014/028152; 20 pages.
International Preliminary Report on Patentability issued by the International Bureau of WIPO, dated Nov. 9, 2010, for International Patent Application No. PCT/US2009/042985; 13 pages.
International Preliminary Report on Patentability issued by the International Bureau of WIPO, dated Nov. 21, 2017, for International Patent Application No. PCT/US2016/031992; 14 pages.
Shock Owner's Manual: Float MXR—Fox Racing Shox, 2006; 16 pages.
Shock Owner's Manual: Float ATV/Snowmobile—Fox Racing Shox, 2006; 18 pages.
Shock Owner's Manual: Float X Evol—Snowmobile Applications, 2006; 32 pages.
Shock Owner's Manual: Float ATV Front Applications—Fox Racing Shox, 2004; 21 pages.
Mproved Fox Shox, Motocross Action, Mar. 1977 issue; 1 page.
High-Performance "Truck Steering" Automotive Engineering, Society of Automotive Engineers, Warrendale, US, vol. 98, No. 4, Apr. 1, 1990; pp. 5.
International Search Report and Written Opinion issued by the European Patent Office, dated Dec. 18, 2009, for International Patent Application No. PCT/US2009/042986; 15 pages.
International Preliminary Report on Patentability issued by the European Patent Office, dated Aug. 31, 2010, for International Patent Application No. PCT/US2009/042986; 14 pages.
International Search Report and Written Opinion issued by the European Patent Office, dated Sep. 4, 2009, for International Patent Application No. PCT/US2009/042985; 18 pages.
Eulenbach, Dr. Ing. Dieter, NIVOMAT: The Automatic Level Control System with Spring Function and Damping Function, Lecture given as part of the course "Springing and damping systems for road and rail vehicles" at the Technical Academy of Esslingen, Oct. 11, 2000; 18 pages.
DuneGuide.com, "Product Review 2009 Honda Big Red MUV", retrieved from http://www.duneguide.com/ProductReview_Honda_BigRed.htm, May 20, 2008; 3 pages.
Boss Smarthitch 2 at http://www.bossplow.com/smarthitch.html, May 14, 2008; 13 pages.
Boss Plow System for RANGER, at http://www.purepolaris.com/Detail.aspx?ItemID=2876870(Polaris PGA Catalog), May 14, 2008; 2 pages.
2009 Honda Big Red, ATV Illustrated at http://www.atvillustrated.com/?q=node/6615/20/2008, Sep. 6, 2007; 6 pages.
Welcome to Ranger Country brochure, 2005 copyright, Polaris Industries Inc.; 24 pages.
Office Action issued by the Canadian Intellectual Property Office, dated Apr. 1, 2021, for Canadian Patent Application No. 2,985,632; 4 pages.
Office Action issued by the Canadian Intellectual Property Office, dated Oct. 27, 2020, for Canadian Patent Application No. 3,044,002; 4 pages.
International Preliminary Report on Patentability issued by the International Bureau of WIPO, dated Apr. 14, 2015, for International Patent Application No. PCT/US2013/064516; 18 pages.
International Preliminary Report on Patentability issued by the International Bureau of WIPO, dated Jul. 14, 2020, for International Patent Application No. PCT/US2019/012958; 19 pages.
International Search Report and Written Opinion issued by the European Patent Office, dated Jan. 14, 2014, for International Patent Application No. PCT/US2013/064516; 24 pages.
International Search Report and Written Opinion issued by the International Searching Authority, dated Oct. 21, 2020, for International Patent Application No. PCT/US2020/42787; 18 pages.
International Search Report and Written Opinion received for PCT Patent Application No. PCT/US2019/012958, dated Jul. 3, 2019, 27 pages.
MTX (IMTX Audio Thunder Sports RZRPod65—owners-manual, 2016); 8 pages.
Patent Examination Report issued by the Australian Government IP Australia, dated Apr. 7, 2016, for Australian Patent Application No. 2013329090; 3 pages.
Select Increments 2007-2018 Compatible With Jeep Wrangler JK and Unlimited With Infinity or Alpine Premium Factory Systems Pillar Pods with Kicker speakers PP0718-IA-K (Select), Dec. 14, 2018; 6 pages.
International Search Report and Written Opinion received for PCT Patent Application No. PCT/US21/31782, dated Aug. 5, 2021, 11 pages.
International Search Report and Written Opinion received for PCT Patent Application No. PCT/US21/31804, dated Aug. 9, 2021, 6 pages.
Ridenow Powersports. 2017 Can-Am Maverick X3 Walk Around. YouTube. Sep. 14, 2016 (Sep. 14, 2016). [retrieved on Jul. 6, 2021]. Retrieved from internet: <URL: https://www.youtube.com/watch?v=5IOsIScF-y4> entire video. See pp. 6-8 of the ISA/237.

(56) References Cited

OTHER PUBLICATIONS

Suzuki; 1991 Suzuki GSX1100G Cylinder OEM Parts Diagram; retrieved Mar. 17, 2022; https://www.revzilla.com/oem/suzuki/1991-suzuki-gsx1100g/cylinder?submodel-gsx1100gp (Year: 2017).
International Preliminary Report on Patentability issued by the International Searching Authority, dated Nov. 15, 2022, for International Patent Application No. PCT/US2021/031782; 9 pages.

* cited by examiner

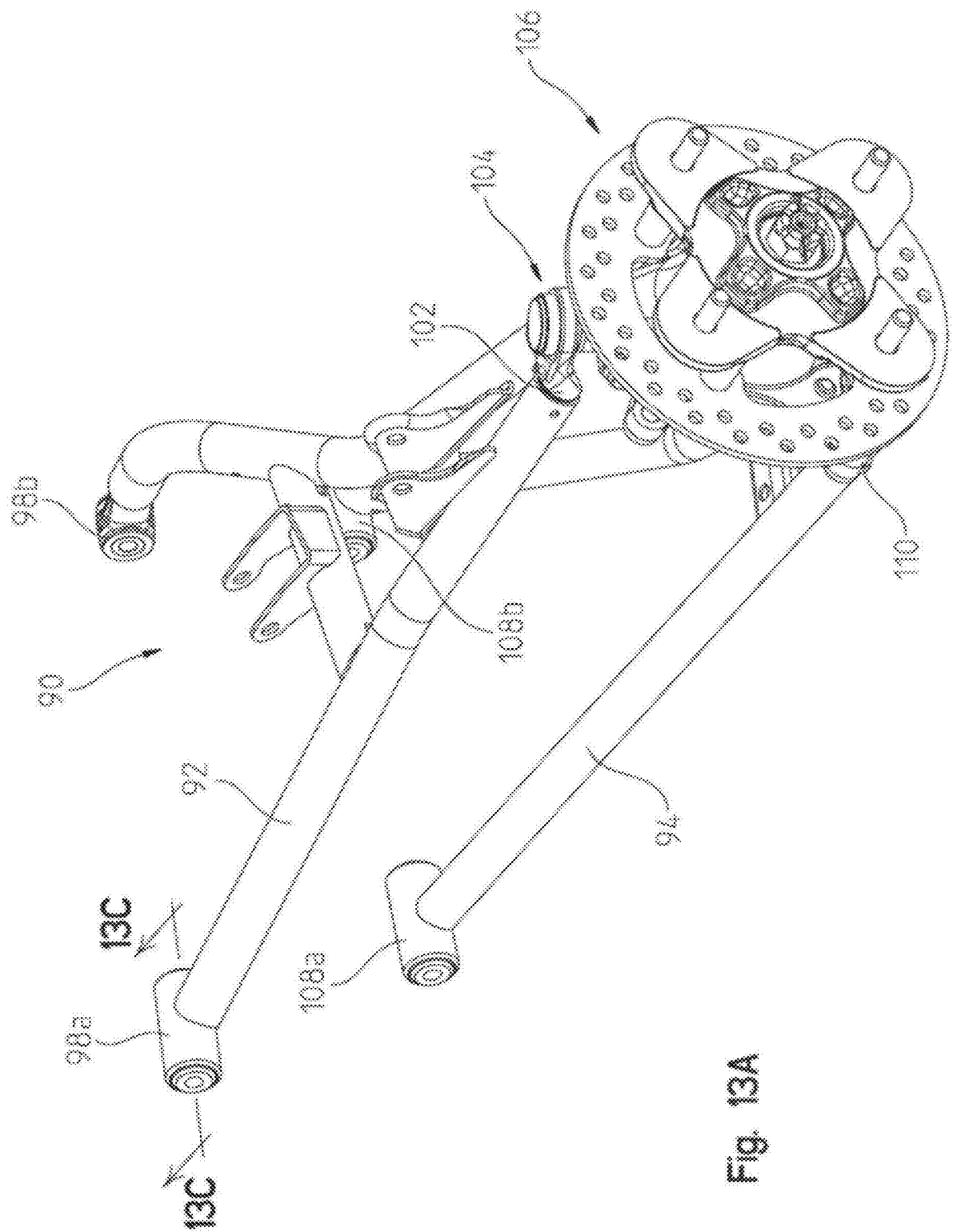

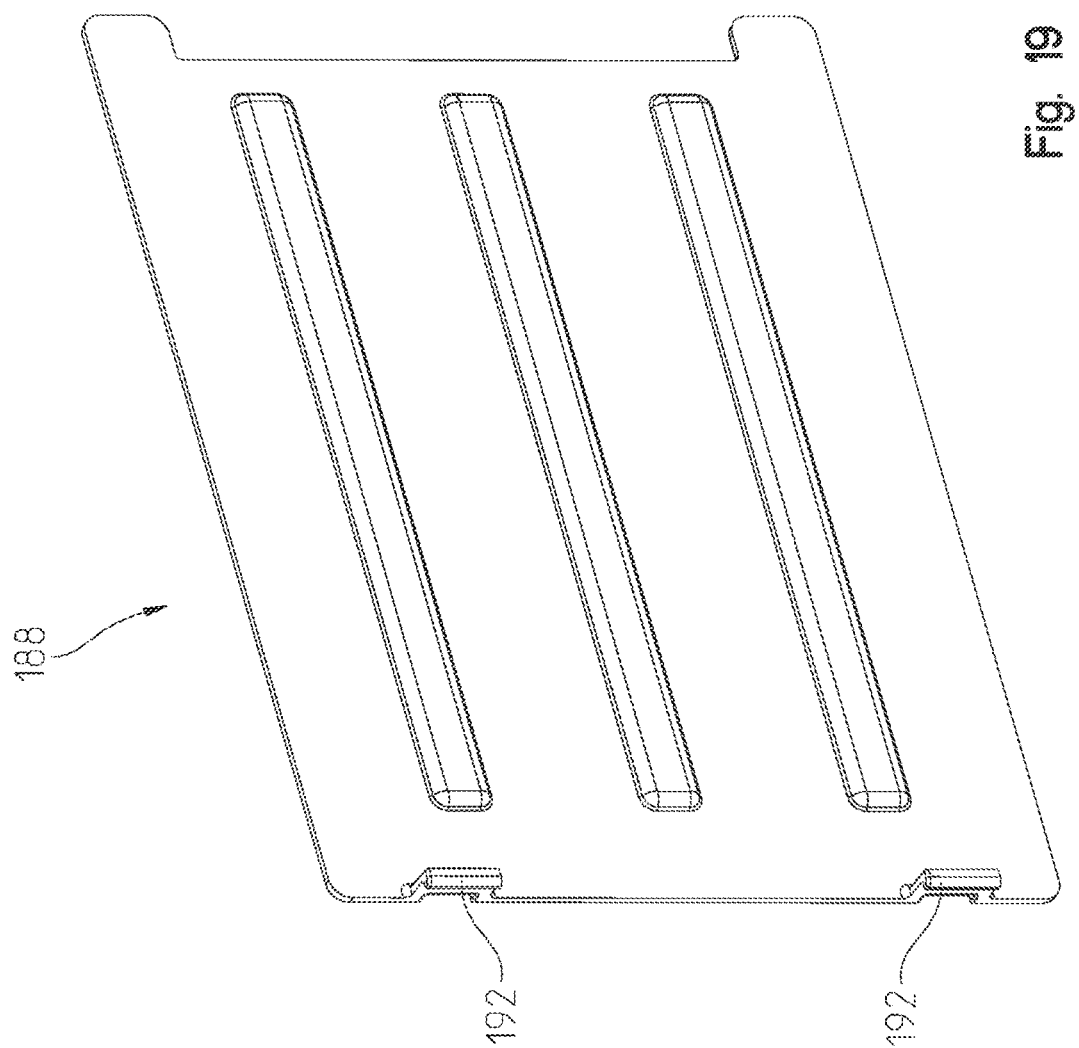

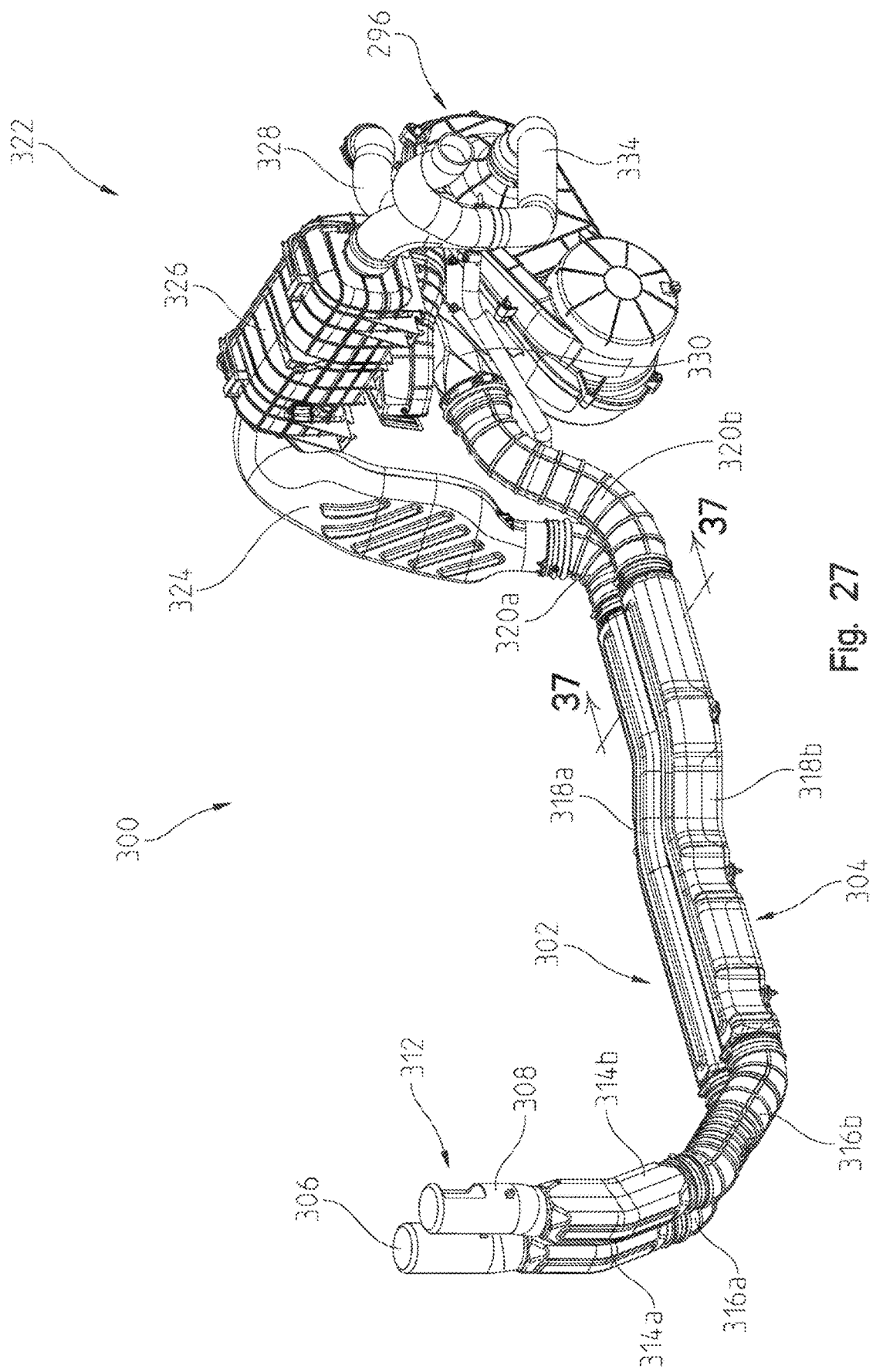

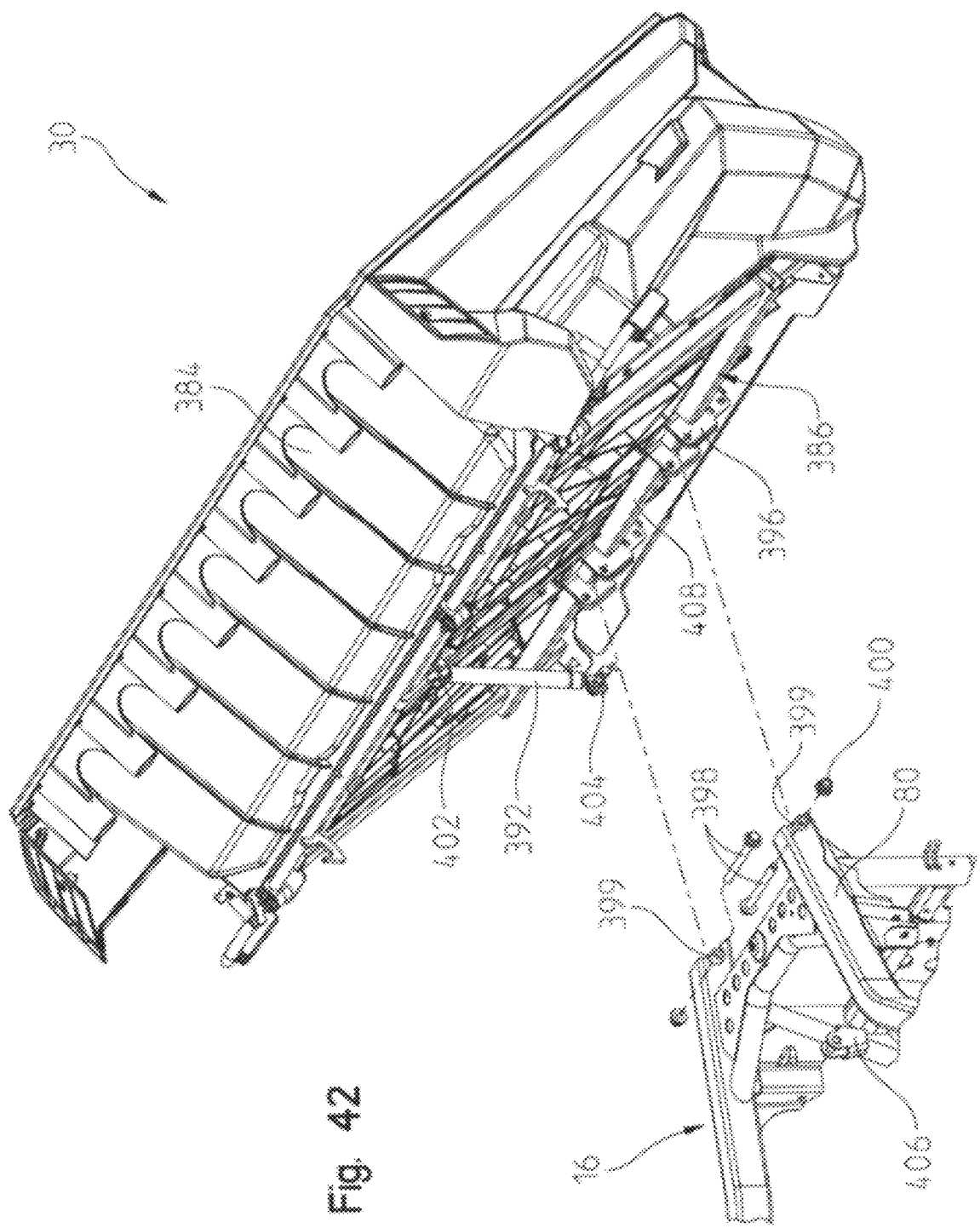

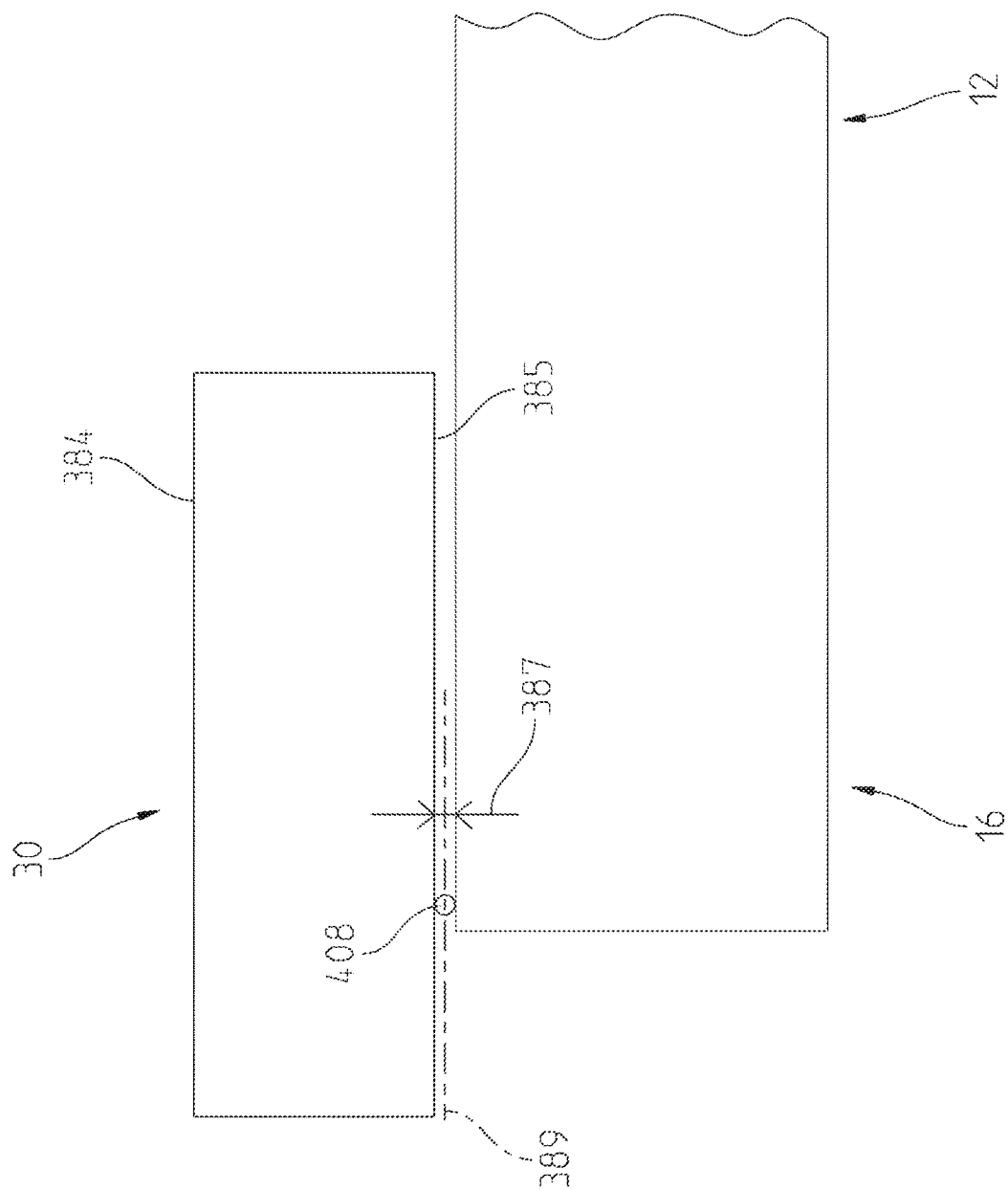

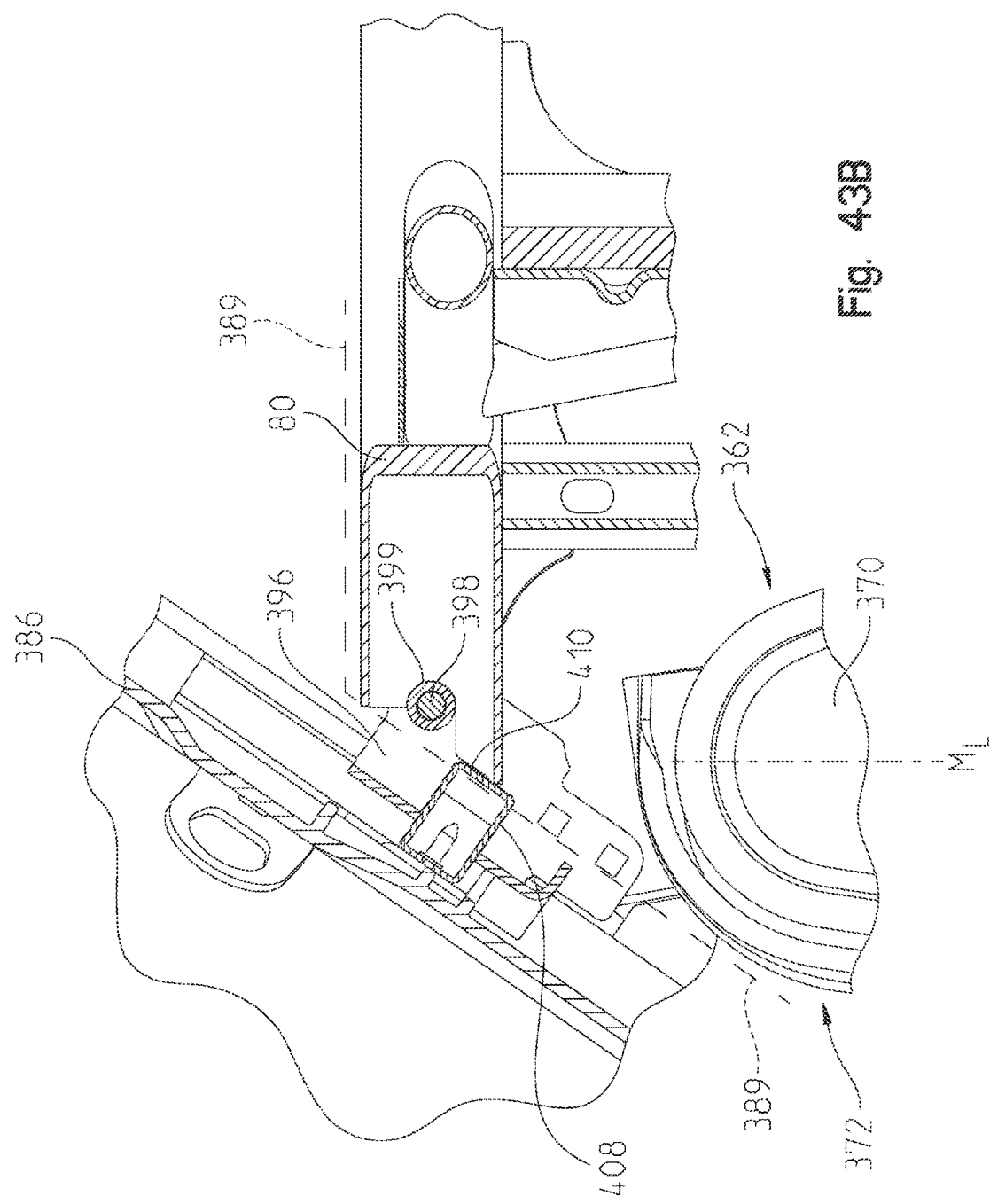

UTILITY VEHICLE

RELATED APPLICATIONS

The present application is a continuation of U.S. patent application Ser. No. 16/229,881, filed Dec. 21, 2018, which is a continuation U.S. patent application Ser. No. 15/154,131, filed May 13, 2016, which claims priority from Provisional patent application Ser. No. 62/162,354 filed May 15, 2015, the complete disclosures of which are expressly incorporated by reference herein.

FIELD OF THE DISCLOSURE

The present invention relates to a utility vehicle and, more particularly, to an all-terrain utility vehicle

BACKGROUND AND SUMMARY OF THE DISCLOSURE

Generally, all-terrain vehicles ("ATVs") and utility vehicles ("UVs") are used to carry one or more passengers and a small amount of cargo over a variety of terrains. There is increasing recreational interest in the market for ATVs, specialty ATVs, and UVs, such as those used for trail riding, racing, and/or cargo hauling. However, some UVs and/or ATVs are configured for utility and cargo hauling needs and, as such, may not be configured for fast speeds or racing. Alternatively, some UVs and/or ATVs are configured for sport and racing and, as such, are configured for faster speeds but may only be configured for limited cargo hauling.

SUMMARY OF THE DISCLOSURE

According to a further illustrative embodiment of the present disclosure, a utility vehicle comprises a plurality of ground engaging members, a frame assembly supported by the ground engaging members and including a lower frame portion and an upper frame portion coupled to the lower frame portion to define an operator area, and an operator seat positioned within the operator area and supported by the frame assembly. The operator seat includes a seat bottom, a seat back, and a head rest positioned above the seat back. The utility vehicle also comprises a first opening defined along a first side of the vehicle for ingress and egress from the operator area and having a first longitudinal length extending from a forward end to a rearward end of the first opening. Additionally, the utility vehicle comprises a first door positioned within the first opening and having a longitudinal length approximately equal to the longitudinal length of the first opening. The first door has an upper portion extending along a portion of the upper frame portion and adjacent a portion of the seat back.

According to yet another illustrative embodiment of the present disclosure, a utility vehicle comprises a plurality of ground engaging members and a frame assembly supported by the ground engaging members above a ground surface. The frame assembly includes a lower frame portion and an upper frame portion coupled to the lower frame portion to define an operator area. The lower frame portion includes a frame member. The utility vehicle also comprises an operator seat positioned within the operator area and supported by the frame assembly at a position adjacent the frame member. The operator seat includes a seat bottom and a seat back. Additionally, the utility vehicle comprises a first door having a forward portion adjacent a portion of the operator area forward of the seat bottom and having a first height relative to the frame member, an intermediate portion adjacent the seat bottom and having a second height relative to the frame member, and a rearward portion adjacent the seat back and having a third height relative to the frame member, and the second height is less than the first and third heights relative to the frame member.

According to yet a further illustrative embodiment of the present disclosure, a utility vehicle comprises a plurality of ground engaging members and a frame assembly supported by the ground engaging members above a ground surface. The frame assembly includes a lower frame portion and an upper frame portion coupled to the lower frame portion to define an operator area. The lower frame portion includes an upstanding frame member. Additionally, the utility vehicle comprises an operator seat positioned within the operator area and supported by the frame assembly at a position adjacent the frame member. The operator seat includes a seat bottom and a seat back. The utility vehicle also comprises a first door extending rearwardly from the upstanding frame member and having and outer surface facing away from the operator area and an inner surface facing the operator area and a hinge assembly operably coupled to the upstanding member and the first door. The hinge assembly is positioned adjacent the inner surface of the door and facing the operator area.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 13A is a front left perspective view of a portion of a front suspension assembly of the vehicle of FIG. 1;

FIG. 19 is a perspective view of a cover for the storage areas of FIG. 18;

FIG. 27 is a front left perspective view of an air intake assembly of the vehicle of FIG. 1;

FIG. 42 is an exploded view of the rear frame portion and the rear cargo area of FIG. 40;

FIG. 43A is a schematic side view of the rear frame portion and the rear cargo area of FIG. 40 in a lowered position with a stop member positioned within a gap between a portion of the vehicle frame and a portion of the rear cargo area;

FIG. 43B is a cross-sectional view of the rear frame portion and the rear cargo area of FIG. 40;

Figure 1:
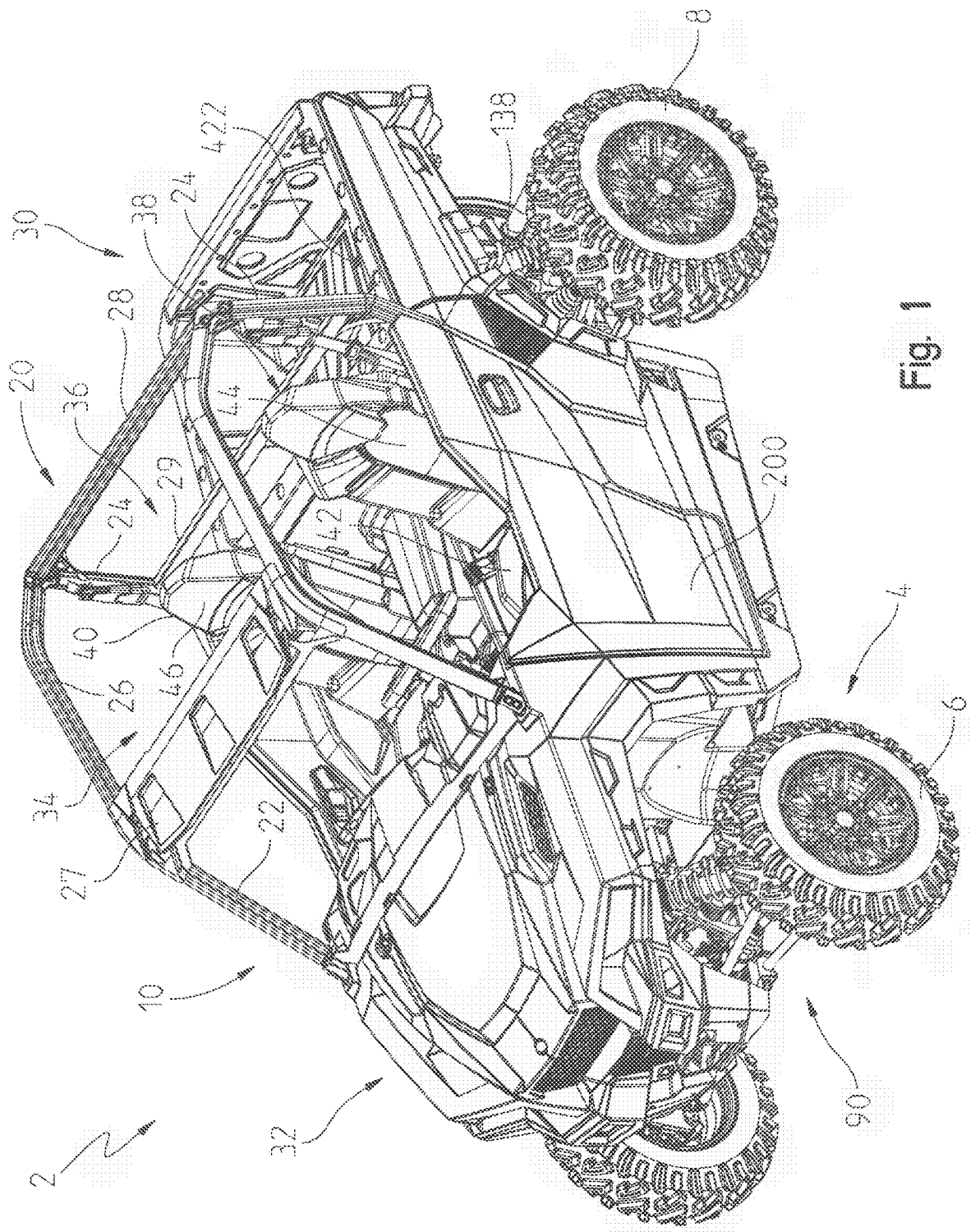
FIG. 1 is a front left perspective view of a utility vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Referring to FIGS. 1-7, an illustrative embodiment of a utility vehicle 2 is shown. Vehicle 2 is configured for off-road conditions. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries Inc., located at 2100 Highway 55 in Medina, Minn. 55340 or non-pneumatic tires, such as those shown in U.S. Pat. Nos. 8,176,957 and 8,104,524, the complete disclosures of which are expressly incorporated herein by reference.

Figure 5:
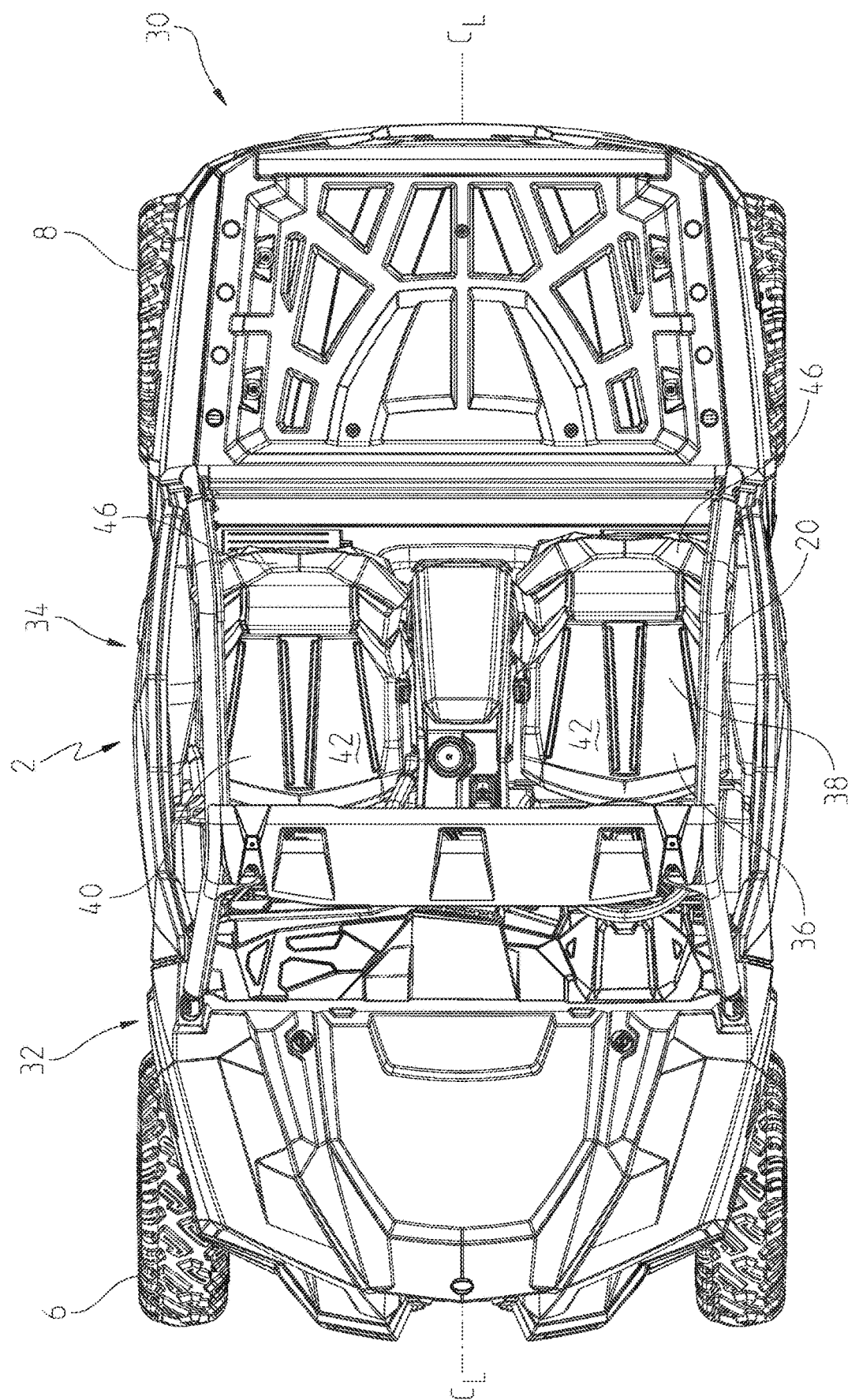
FIG. 5 is a top view of the vehicle of FIG. 1.

Vehicle 2 further includes a frame assembly 10 supported above a ground surface G by ground-engaging members 4. Ground surface G may be a generally level and horizontal dirt, grass, concrete, ceramic, polymeric, or other surface. Frame assembly 10 extends along a longitudinal centerline $C_L$ of vehicle 2 (FIG. 5). Frame assembly 10 includes a lower frame assembly 12 defining a front frame portion 14, a rear frame portion 16, and an intermediate frame portion 18 extending therebetween. Lower frame assembly 12 supports a rear cargo area 30 and a vehicle body 32, which includes a plurality of body panels.

Figure 2:
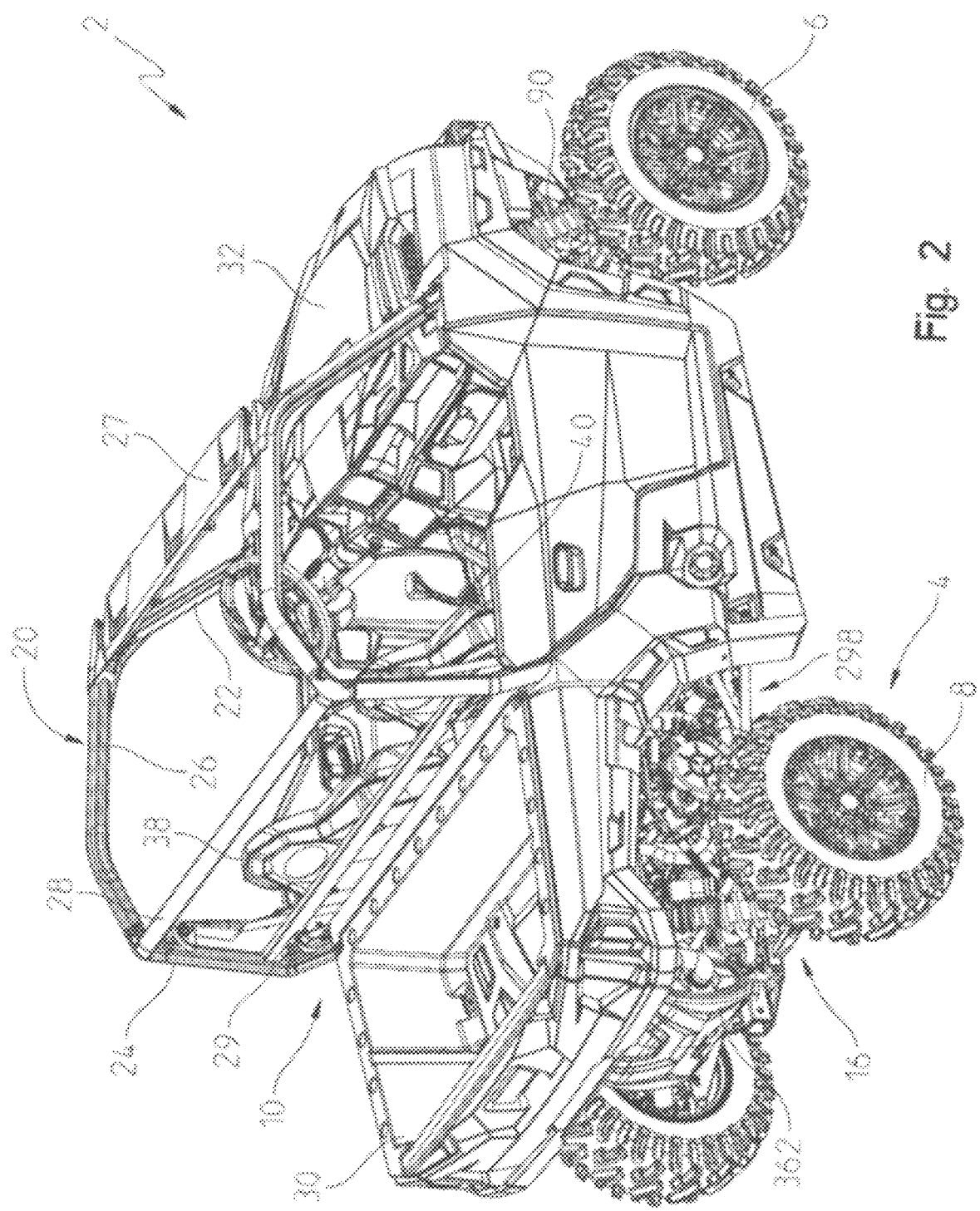
FIG. 2 is a rear right perspective view of the vehicle of FIG. 1.
Figure 3:
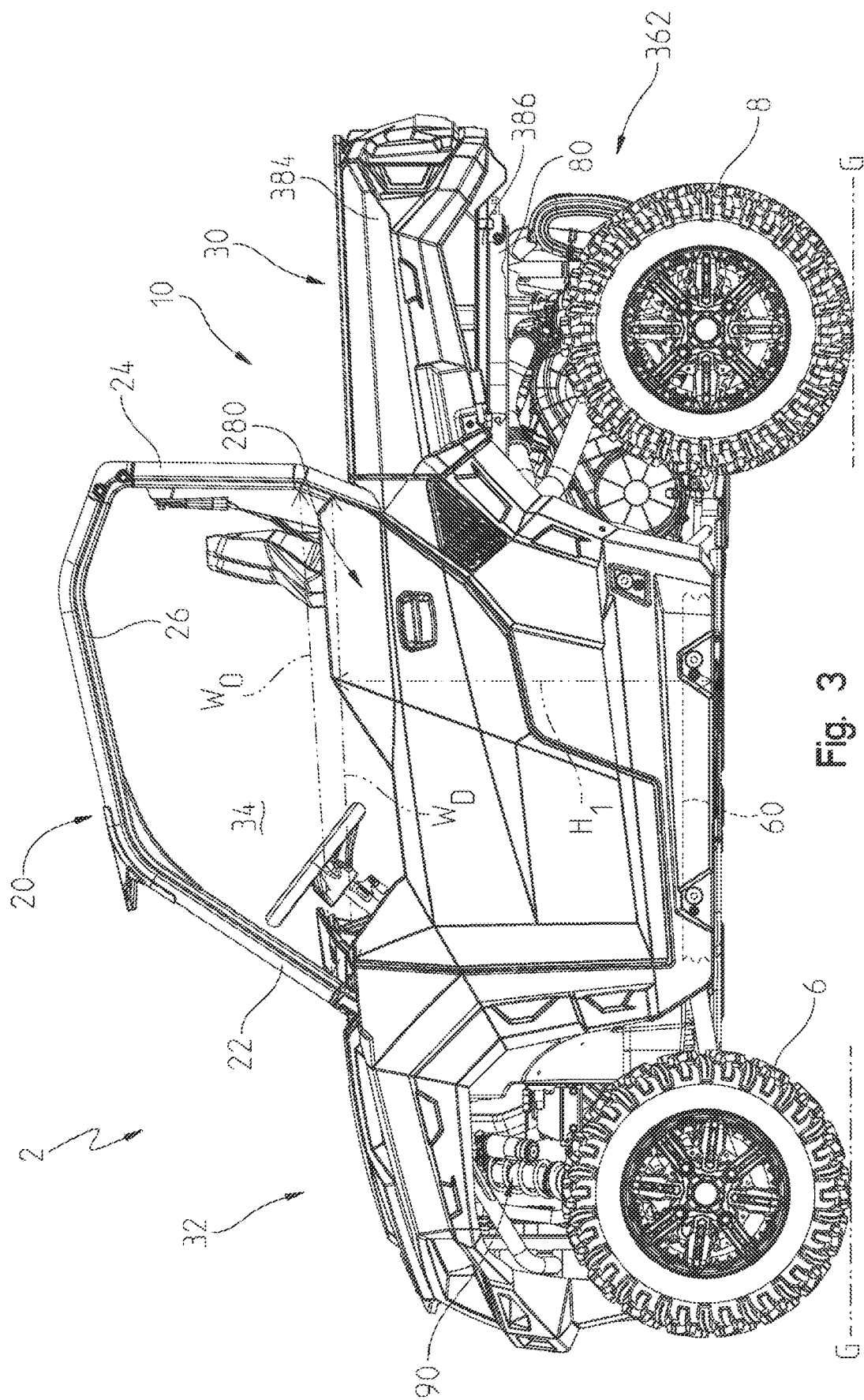
FIG. 3 is a left side view of the vehicle of FIG. 1.
Figure 4:
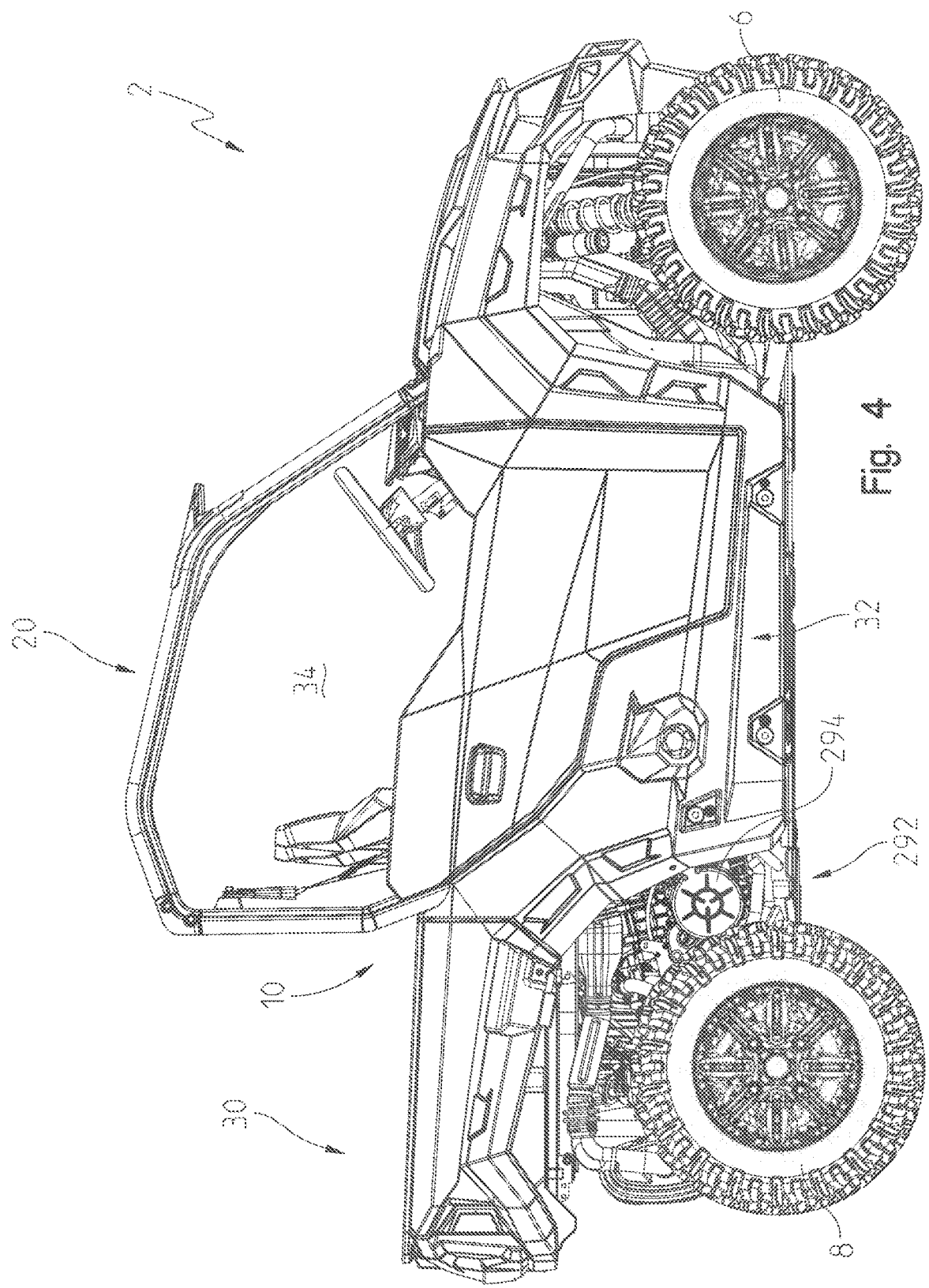
FIG. 4 is a right side view of the vehicle of FIG. 1.

Additionally, and as shown in FIGS. 1-3, frame assembly 10 includes an upper frame assembly 20 extending vertically above lower frame assembly 12 and, more particularly, above at least intermediate frame portion 18 of lower frame assembly 12. In one embodiment, the region bounded by upper frame assembly 20 and lower frame assembly 12 is referred to as an open-air operator area 34 of vehicle 2. Upper frame assembly 20 includes front upstanding members 22, rear upstanding members 24, longitudinally extending members 26, a front lateral member 27, a rear lateral member 28, and at least one brace 29.

As shown in FIGS. 1-6, operator area 34 includes seating 36 for an operator and one or more passengers. Illustratively, seating 36 includes an operator seat 38 and a passenger seat 40, however, seating 36 may also include rear seats for additional passengers.

Referring to FIGS. 8-11, lower frame assembly 12 is shown. Lower frame assembly 12 includes front frame portion 14, intermediate frame portion 18, and rear frame portion 16. In one embodiment, the wheel base length of vehicle 2 extends from front frame portion 14 to rear frame portion 16 and may be approximately 81 inches. Front frame portion 14 includes longitudinal members 48 (FIG. 10), lateral members 50, rear upstanding members 52, front upstanding members 54, and a cross brace 56. Additionally, front frame portion 14 includes a front plate 58 for supporting components of the vehicle, such as a front differential 297 (FIG. 12).

Figure 8:
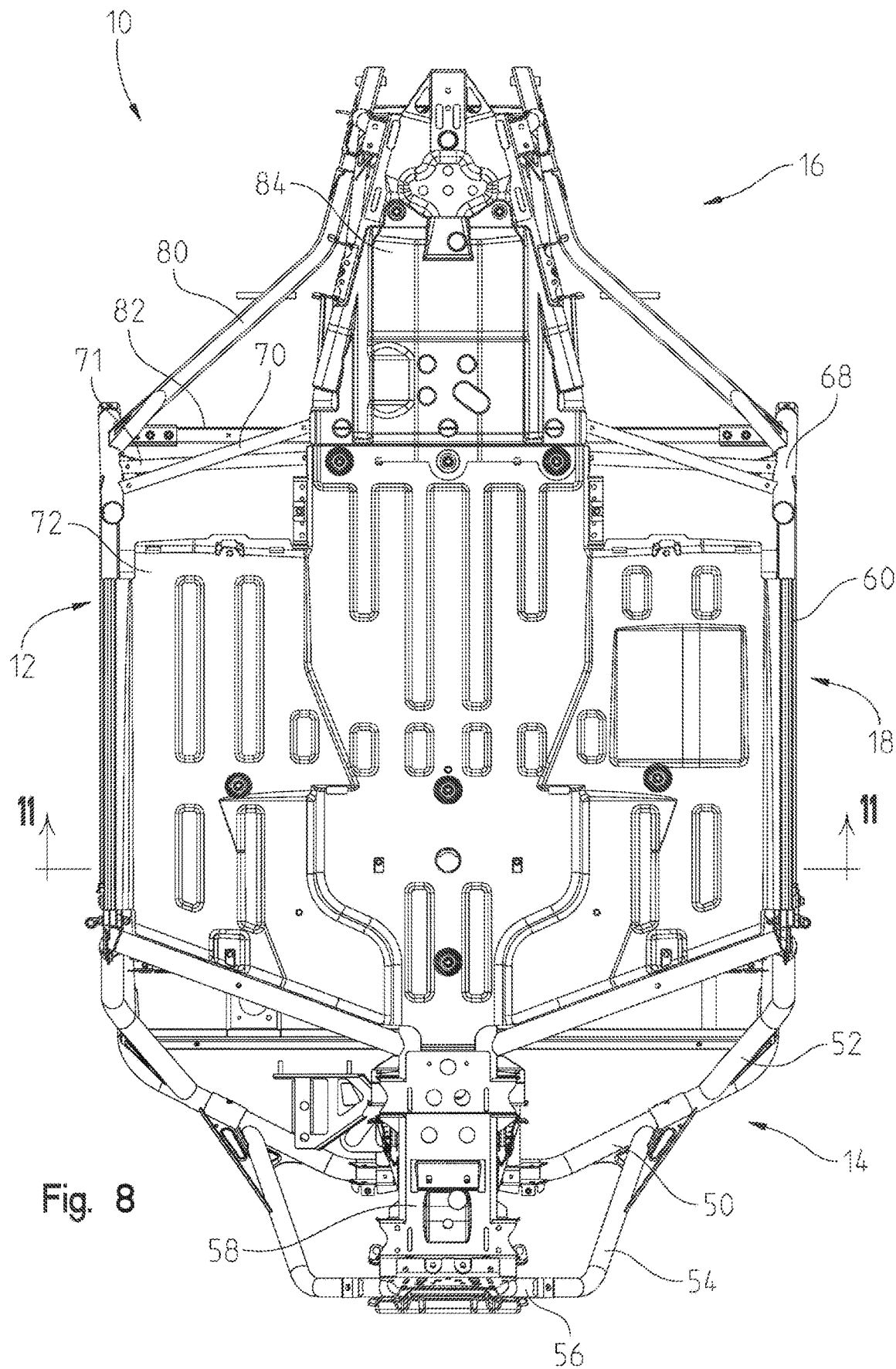
FIG. 8 is a bottom view of a lower frame assembly of the vehicle of FIG. 1.
Figure 9:
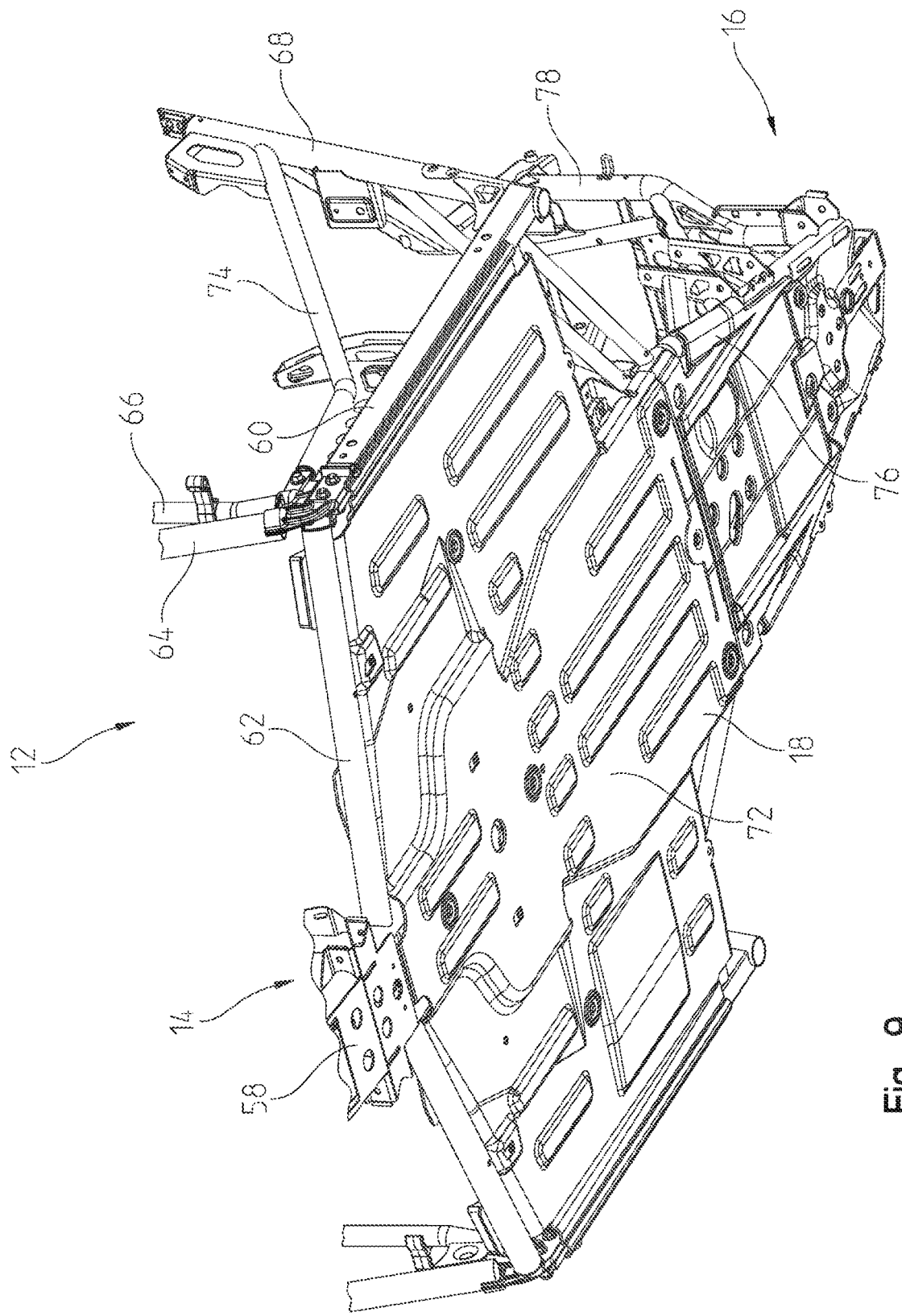
FIG. 9 is a front left perspective view of the lower frame assembly of FIG. 8.
Figure 10:
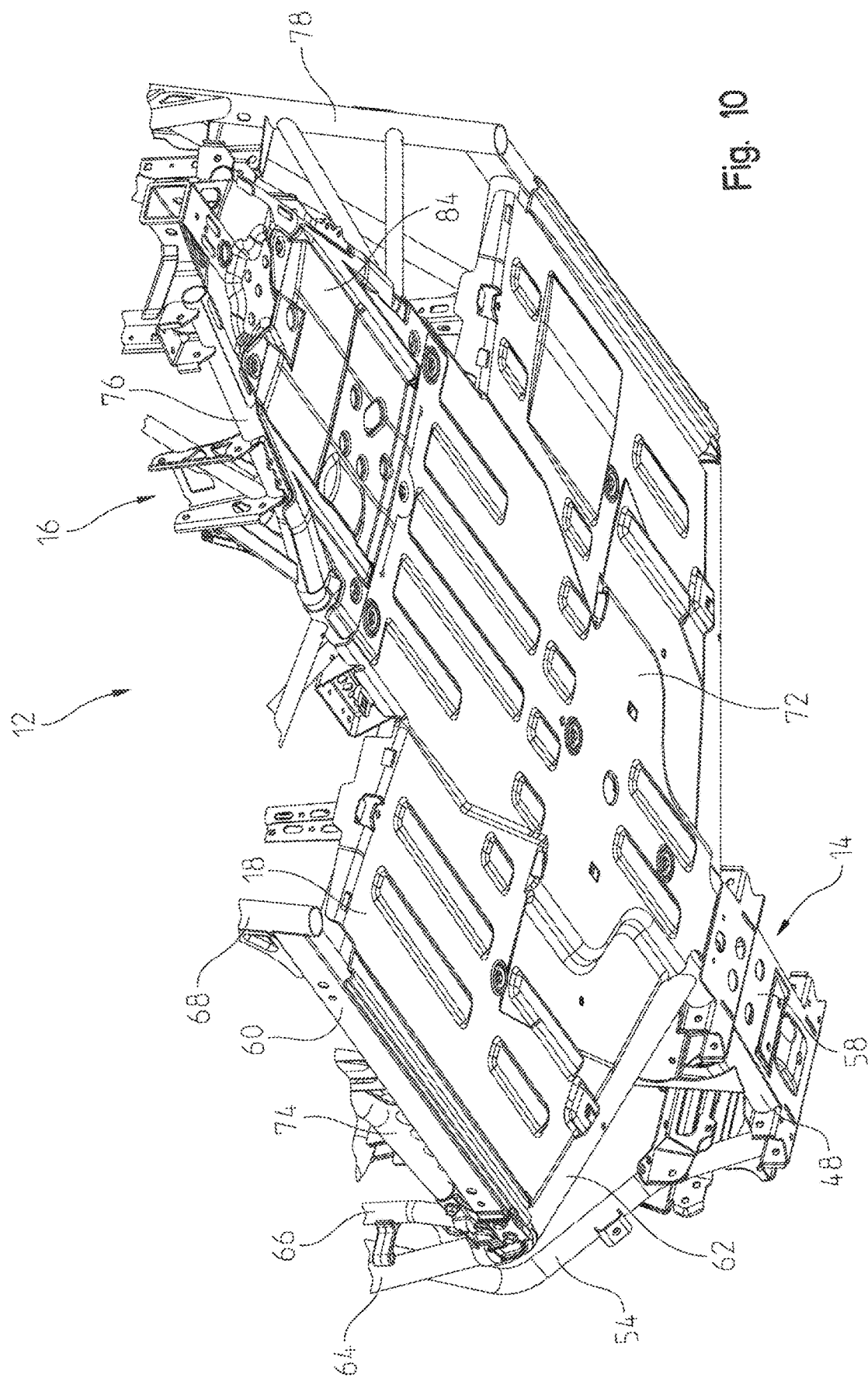
FIG. 10 is a rear left perspective view of the lower frame assembly of FIG. 8.
Figure 11:
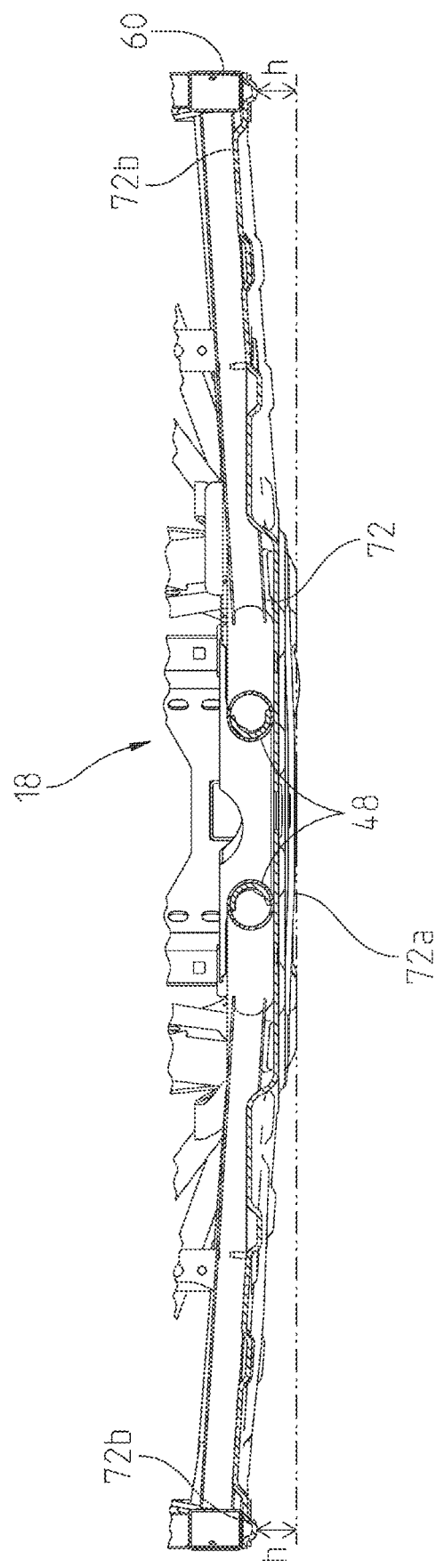
FIG. 11 is a front view of an intermediate portion of the lower frame assembly of FIG. 8, taken along line 11-11 of FIG. 8.

Intermediate frame portion 18 is coupled to front frame portion 14 and includes longitudinal members 60, lateral members 62 coupled to longitudinal members 60, a first upstanding member 64 coupled to longitudinal members 60, a second upstanding member coupled to longitudinal members 60, a third upstanding member 68 coupled to longitudinal member 60, and a diagonal member 74 coupled to upstanding members 64, 66, and 68. Intermediate frame portion 18 also includes a plurality of diagonal braces 70, 71 coupled to third upstanding member 68. Additionally, intermediate frame portion 18 includes a plate or base member 72 which defines a skid plate and is positioned below at least operator area 34. As shown in FIGS. 8 and 11, plate 72 of intermediate frame portion 18 extends laterally along the full lateral width of vehicle 2. A center portion 72a of plate 72 is recessed relative to right and left side portions 72b of plate 72. As such, center portion 72a is closer to ground surface G than left and right side portions 72b. By configuring plate 72 with the recessed center portion 72a relative to right and left side portions 72b, vehicle 2 has increased clearance along the sides thereof.

Rear frame portion 16 is coupled to intermediate frame portion 18 and includes lower longitudinal members 76, upstanding members 78, lateral members 82, and upper longitudinal members 80. Rear frame portion 16 also includes a plate 84 which may be integral with or separate from plate 72. Plate 84 supports a portion of a powertrain assembly 292 of vehicle 2. Additional details of frame assembly 10 may be disclosed in U.S. patent application Ser. No. 14/477,589, filed on Sep. 4, 2014, and entitled "SIDE-BY-SIDE VEHICLE", the complete disclosure of which is expressly incorporated by reference herein.

Figure 12:
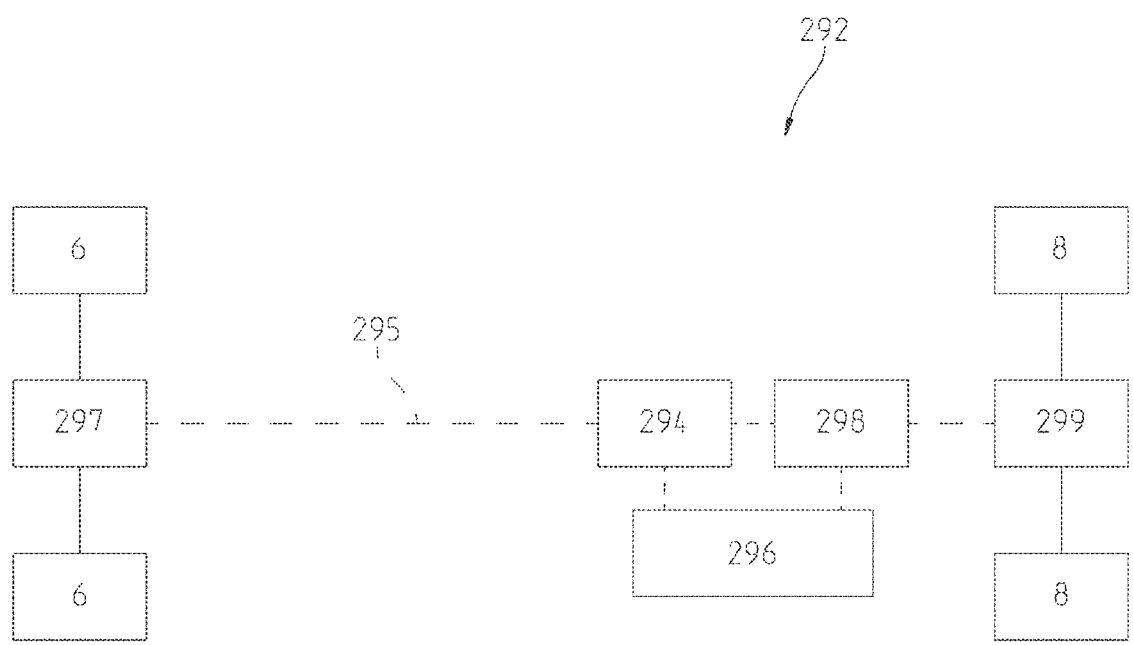
FIG. 12 is a diagrammatic view of a powertrain assembly of the vehicle of FIG. 1.
Figure 32:
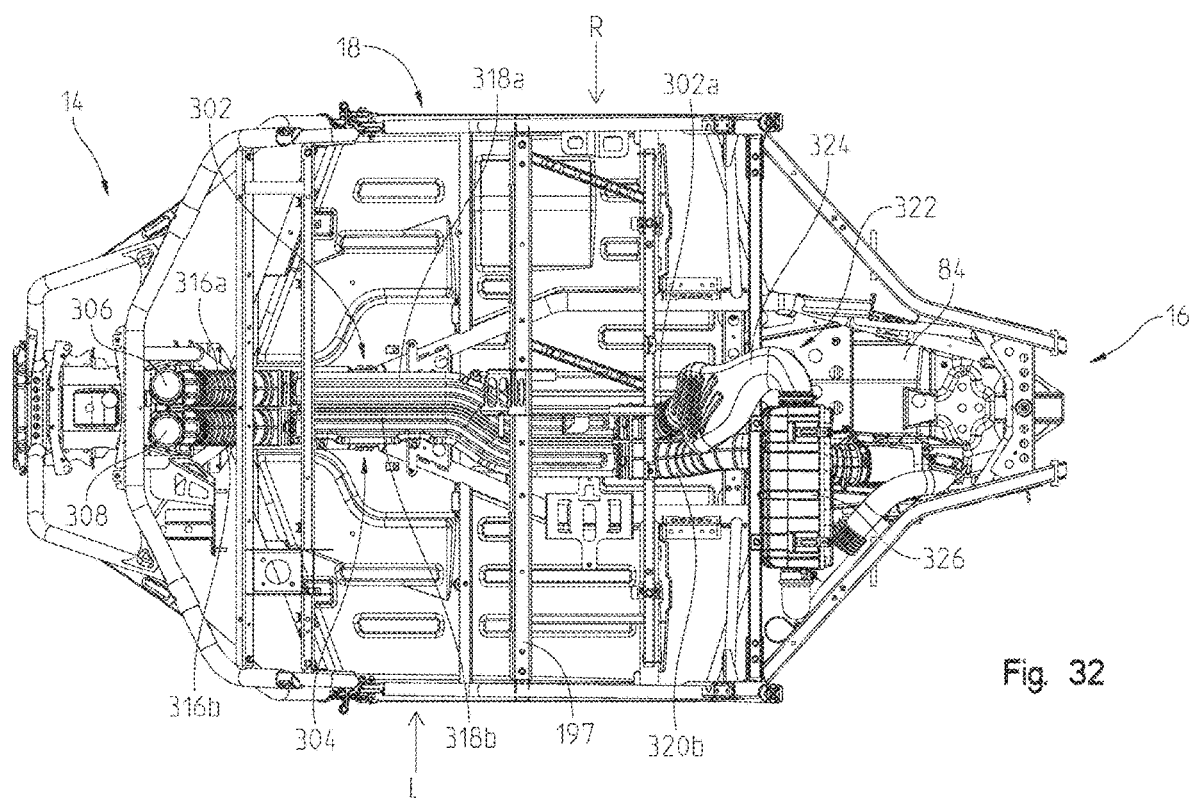
FIG. 32 is a top view of the lower frame assembly and the air intake assembly of FIG. 27.

Referring to FIG. 12, powertrain assembly 292 includes at least an engine 294 (FIG. 29), a continuously variable transmission ("CVT") 296 (FIG. 27), a shiftable transmission 298 (FIG. 2), front differential 297, a rear differential 299, and a drive shaft 295. CVT 296 is operably coupled to engine 294 and shiftable transmission 298 to drive front wheels 6 and/or rear wheels 8 through front and rear differentials 297, 299, respectively. As shown in FIG. 32, plate 84 of rear frame portion 16 is positioned rearward of seat frame 197 and, therefore, is positioned rearward of a forward most edge 43a of seat bottom 42 (FIG. 20). As such, engine 294 and CVT 296 are positioned rearward of forward most edge 43a of seat bottom 42.

Figure 6:
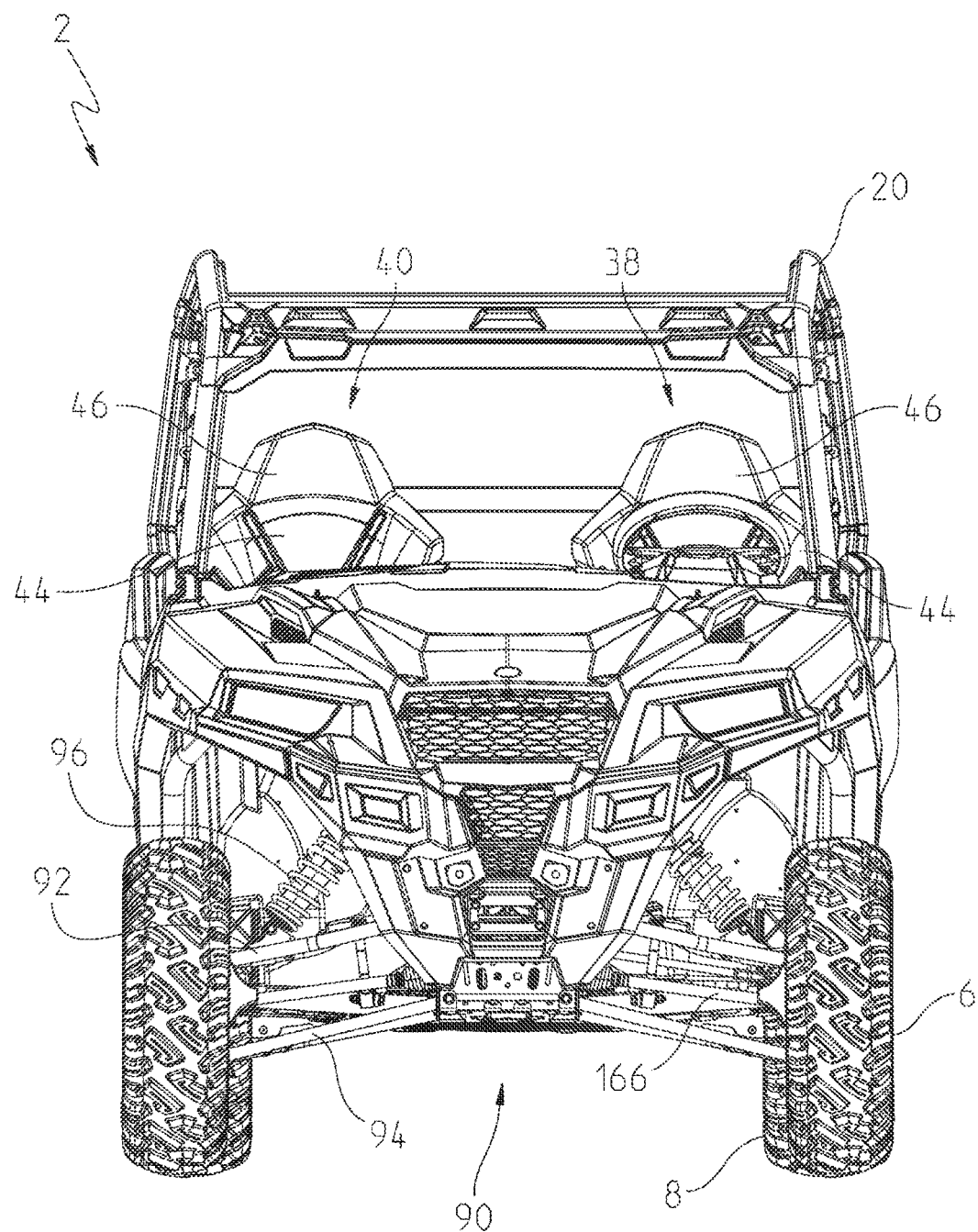
FIG. 6 is a front view of the vehicle of FIG. 1.
Figure 13B:
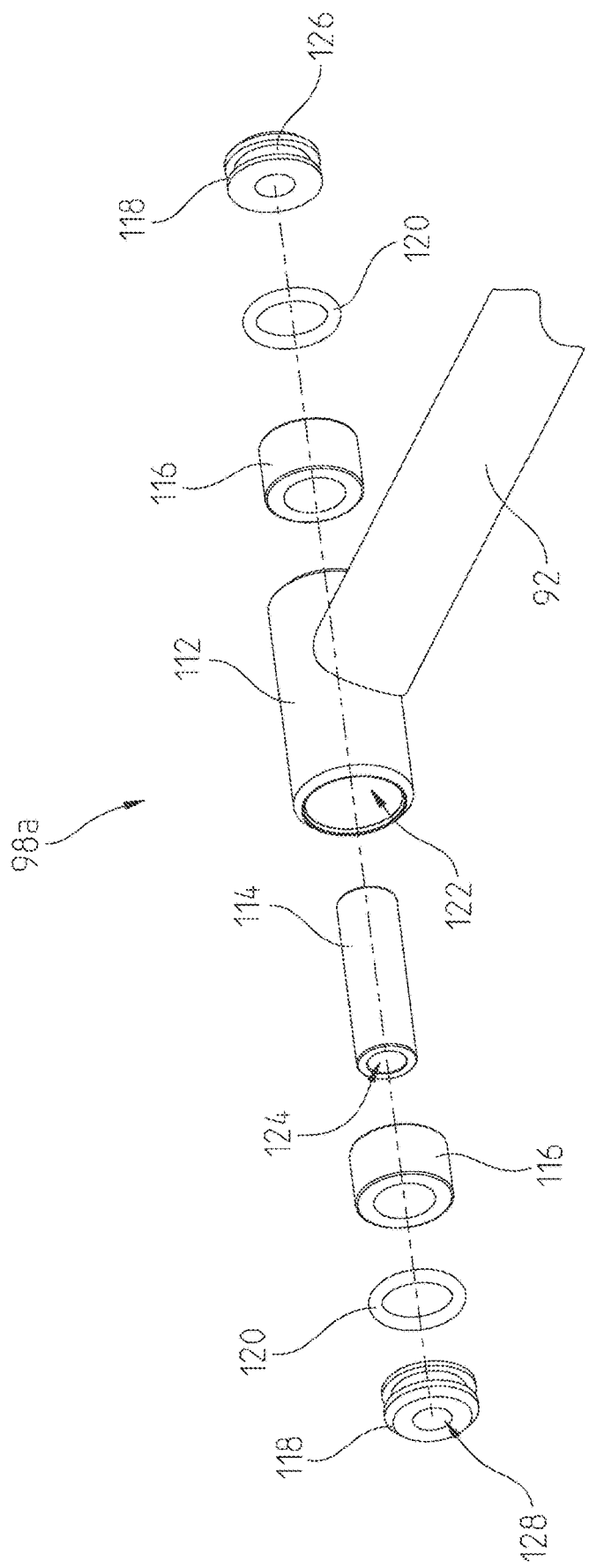
FIG. 13B is an exploded view of a suspension mount of the front suspension assembly of FIG. 13A.
Figure 13C:
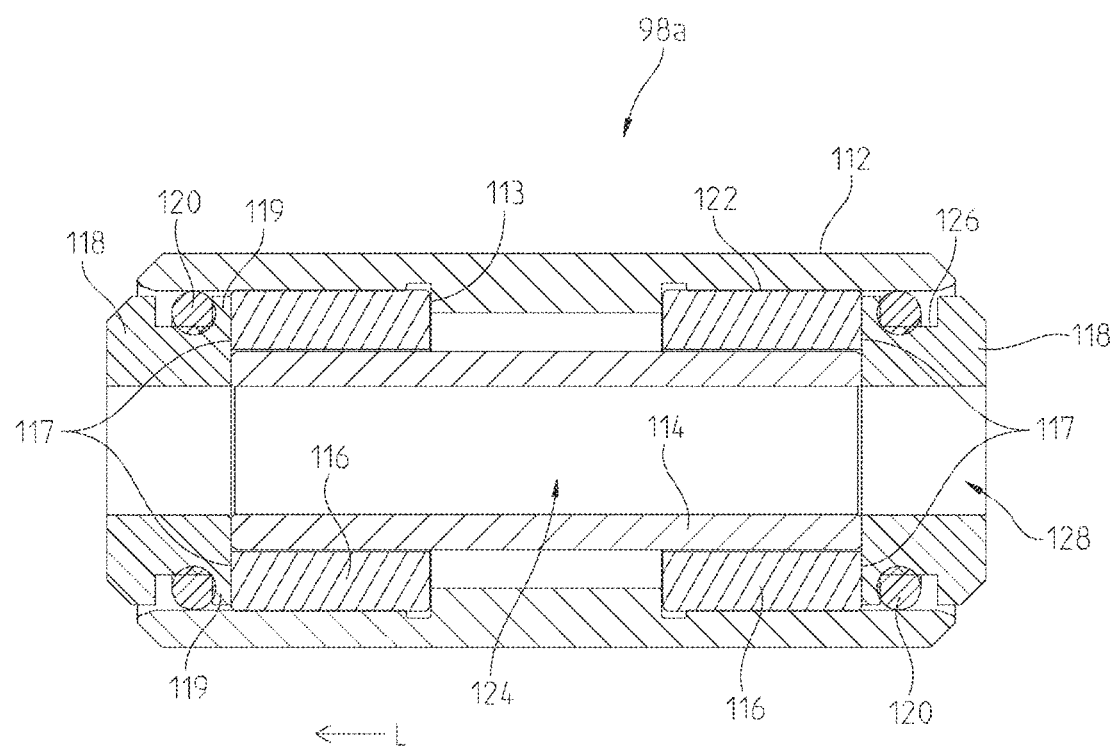
FIG. 13C is a cross-sectional view of the suspension mount of FIG. 13A, taken along line 13C-13C of FIG. 13A.

Referring to FIGS. 13A-13C, vehicle 2 includes a front suspension assembly 90. Front suspension assembly 90 includes upper control arms 92, lower control arms 94, and linear force elements, illustratively, shock absorbers 96 (FIG. 6). Upper control arms 92 include inner mounting members 98a, 98b for coupling to front frame portion 14 of lower frame assembly 12 and an outer mounting member 102 for coupling to a knuckle 104 of a wheel hub assembly 106. Lower control arms 94 include inner mounting members 108a, 108b for coupling to front frame portion 14 of lower frame assembly 12 and an outer mounting member 110 for also coupling to knuckle 104 of wheel hub assembly 106.

As shown in FIGS. 13B and 13C, mounting member 98a of upper control arm 92 may include an outer member 112, an inner member 114, bearing members 116, end caps 118, and seals 120. In one embodiment, inner member 114 may be hardened during formation thereof such that inner member 114 is comprised of a hardened metallic material. Illustratively, inner member 114 is received within outer member 112 and has a length less than that of outer member. Additionally, the length of inner member 114 and the length of bearing members 116 define the tolerance of mounting member 98a. Each bearing member 116 is positioned intermediate the inner surface of outer member 112 and the outer surface of inner member 114, and is positioned adjacent each end portion of inner member 114. More particularly, in one embodiment, the inner surface of outer member 112 includes recesses 122 and each recess 122 receives a portion of one of bearing members 116. Bearing members 116 are received within recess 122 and contact a shoulder 113 of the inner surface of outer member 112. Shoulder 113 may be machined into outer member 112, thereby making outer member 112 simple to manufacture. Bearing members 116 permit movement of outer member 112 relative to inner member 114 without the need for any grease or additional lubrication. Therefore, mounting member 98a may be greaseless while still permitting movement of outer member 112 relative to bearing member 116. For example, bearing member 116 may be comprised of a material containing Nylon 6/6 with glass fiber, PTFE, and silicone which allows for lubrication without grease. The Nylon 6/6 with glass fiber, PTFE, and silicone may be present in any amount within the material comprising bearing member 116. In one embodiment, bearing member 116 provides a self-lubricating surface for movement of outer member 112 relative to inner member 114 because of the addition of PTFE.

To seal the internal volume of outer member 112 from water, debris, dust, and other liquid or particulate matter, which may increase the friction between bearing member 116 and outer member 112, end caps 118 may be sealingly received within the end portions of outer member 112. Illustratively, end caps 118 may be positioned adjacent the end portions of inner member 114. End caps 118 each include a recess 126 for receiving seals 120, which, illustratively, are o-rings. In this way, end caps 118 and seals 120 seal the internal volume of outer member 112 to prevent dust, debris, water, or other matter from entering the internal volume of outer member 112 which may affect the movement of outer member 112 relative to inner member 114 during operation of vehicle 2. Additionally, as shown in FIG. 13C, seals 120 are fully positioned within outer member 112 and inward of the outer end of end cap 118 such that contaminating matter (e.g., dust, liquids) does not contact seal 120. In this way, seal 120 is not exposed to any liquids, dust, or other matter which may work its way inside outer member 112 and increase friction between bearing member 116 and outer member 112. Seals 120 also may be embedded with a wax material to increase resistance to wear.

Additionally, seals 120 are axially adjacent thrust surfaces 117 of mounting member 98a. More particularly, an axial load may be exerted on mounting member 98a in the direction L (FIG. 13C) during operation of vehicle 2 such that interface between bearing members 116 and end caps 118 defines thrust surfaces 117 of mounting members 98a. As shown in FIG. 13C, seals 120 are axially spaced apart from thrust surfaces 117 by lips 119 of end caps 118, however, seals 120 are axially aligned with thrust surfaces 117 and are not positioned radially inward or radially outward from thrust surfaces 117. By axially aligning seals 120 with thrust surfaces 117, the likelihood of water and debris contacting bearing members 116 in an axial direction of mounting member 98a is reduced. Additionally, inner member 114 and outer member 116 seal the radial surfaces of bearing members 116 from water and debris.

End caps 118 each include an aperture or channel 128 which aligns with an inner channel 124 of inner member 114. Additionally, the diameter of channel 128 is approximately the same as the diameter of inner channel 124. A fastener (not shown) is received through inner channel 124 and channel 128 for coupling upper control arm 92 to lower frame assembly 12.

Figure 7:
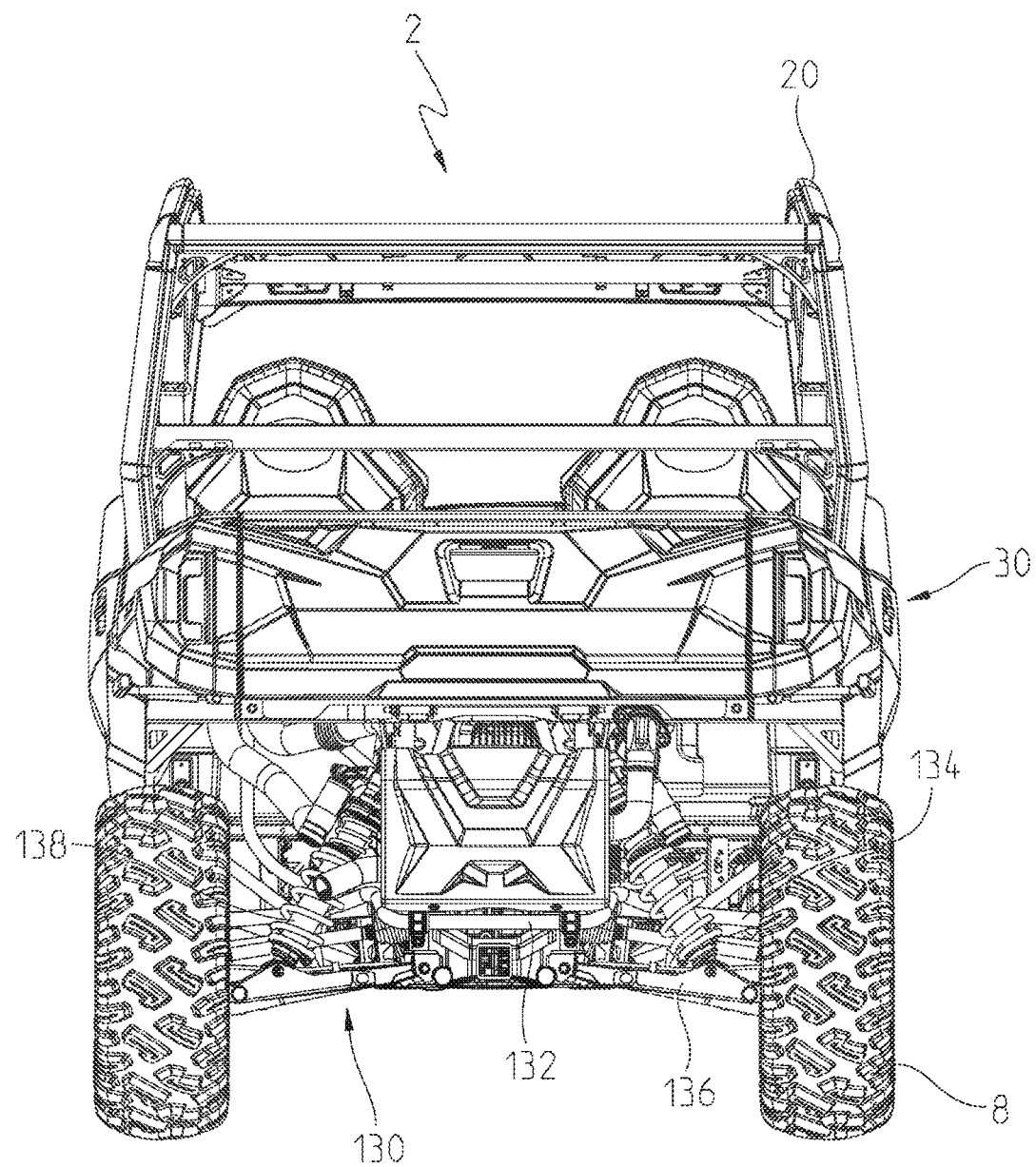
FIG. 7 is a rear view of the vehicle of FIG. 1.

Vehicle 2 also includes a rear suspension assembly 130, as shown in FIG. 7. Rear suspension assembly 130 may include a sway bar 132, an upper suspension member 134, a lower suspension member 136, and a linear force element, illustratively, a shock absorber 138. Upper and lower suspension members 134, 136 may be mounted to rear frame portion 16 of lower frame assembly 12 with mounting members (not shown) similar to mounting members 98a of front suspension assembly 90.

Figure 14:
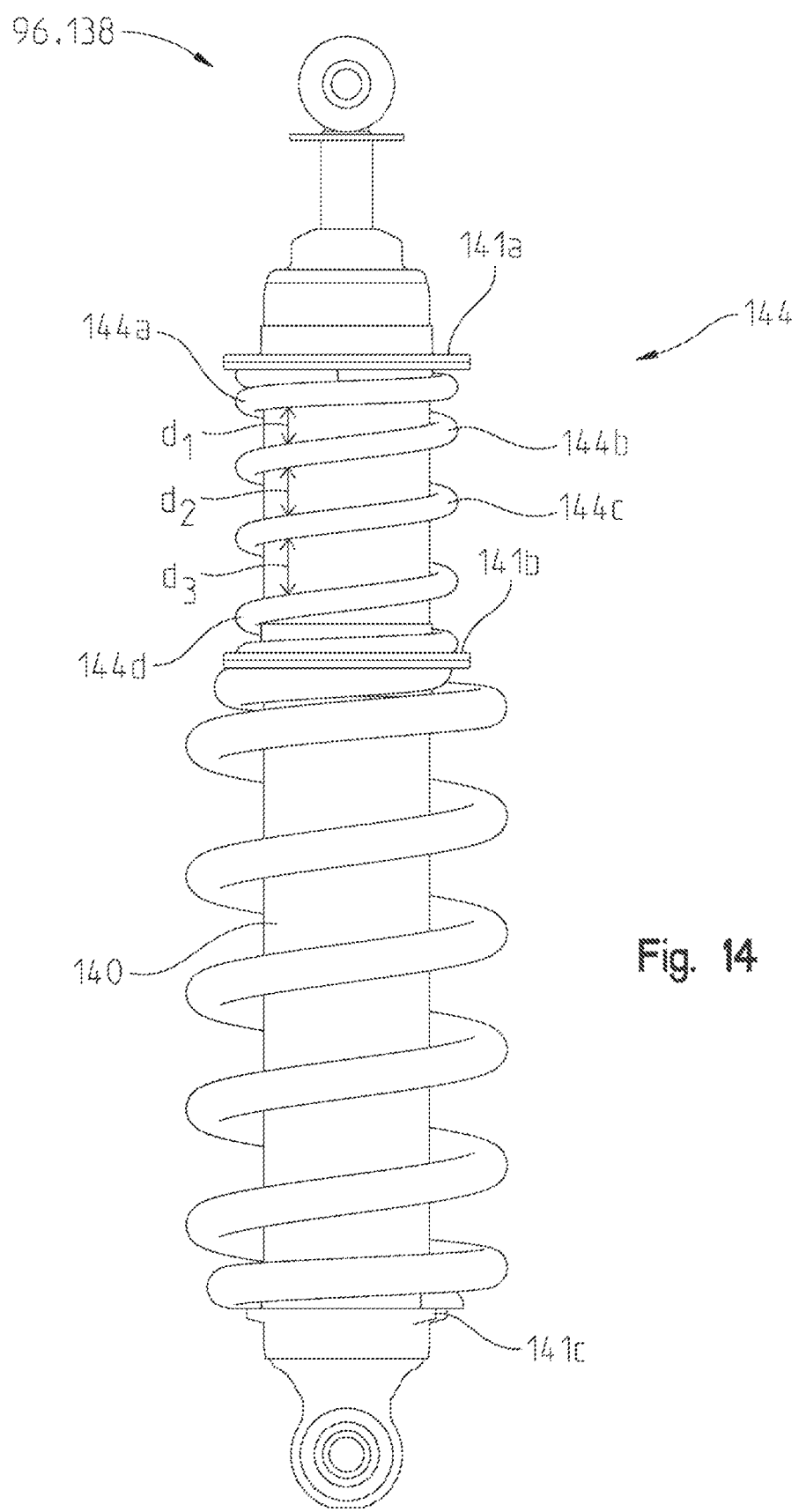
FIG. 14 is a front view of a shock absorber of the vehicle of FIG. 1 in an extended position.
Figure 15:
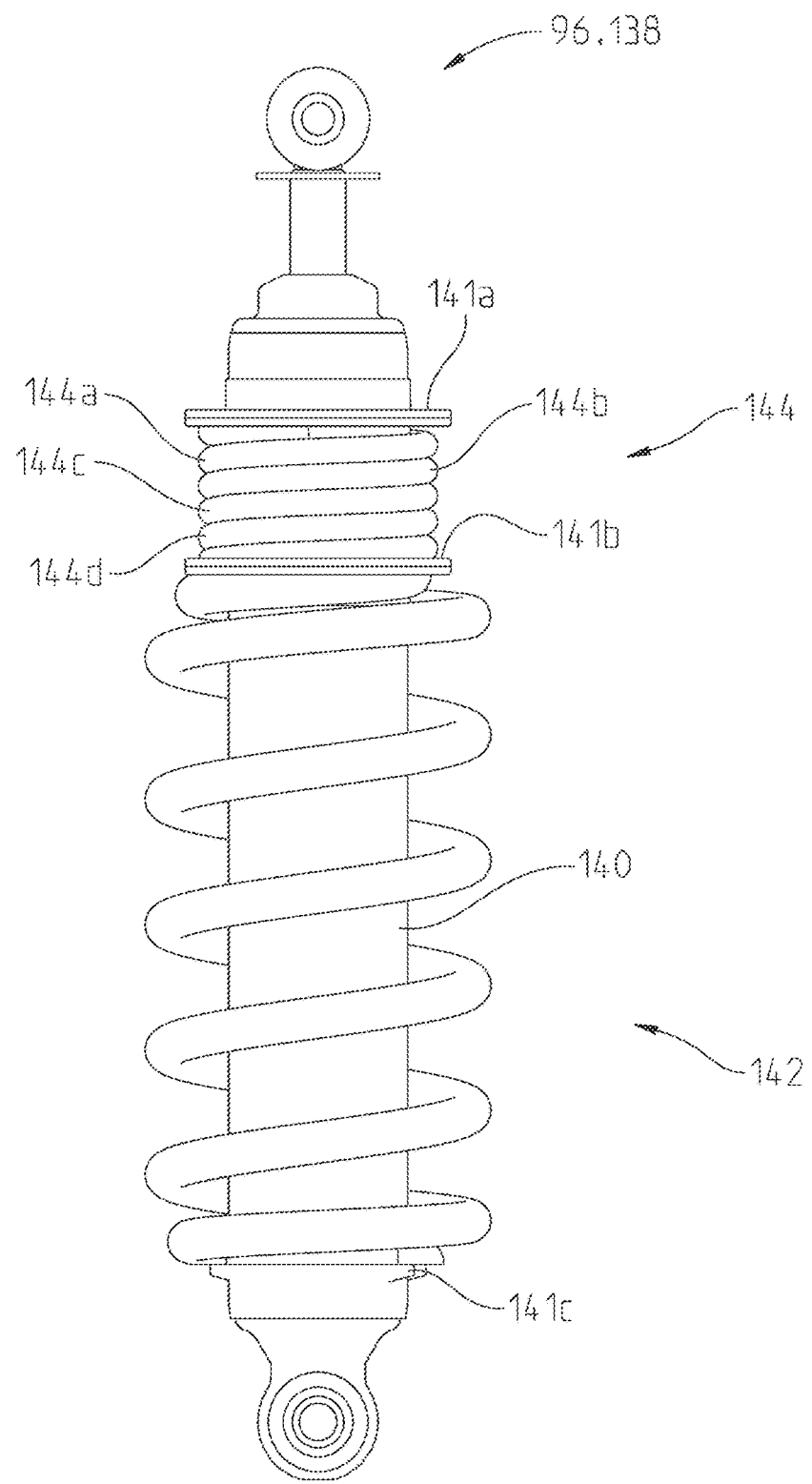
FIG. 15 is a front view of the shock absorber of FIG. 14 in a compressed position.

Additionally, both front shock absorbers 96 and rear shock absorbers 138 may be hydraulic or pneumatic shocks with a single spring or coil. Alternatively, shock absorbers 96, 138 may be hydraulic or pneumatic shocks with progressive-coil tender springs, as shown in FIGS. 14 and 15. When shock absorbers 96, 138 include progressive-coil tender springs, the suspension travel may have an auxiliary spring rate to keep the main spring from becoming loose when at full suspension extension. Additionally, a progressive-coil tender spring may be used in suspension tuning to maintain a soft spring rate in certain riding events while allowing for a transition to the stiffer main spring during other riding events.

Illustratively, shock absorbers 96, 138 include a hydraulic or pneumatic cylinder 140, a main or primary spring 142, and an auxiliary or secondary spring illustratively shown as a progressive-coil tender spring 144. Springs 142, 144 generally surround cylinder 140 and tender spring 144 is positioned in series with main spring 142. Tender spring 144 also may have a length which is less than the length of main spring 142 when both tender spring 144 and main spring 142 are in the extended position shown in FIG. 14. Tender spring 144 may be coupled to cylinder 140 with a first coupler 141a and a second coupler 141b. Additionally, main spring 142 may be coupled to cylinder 140 with second coupler 141b and a third coupler 141c. Couplers 141a, 141b, 141c may be adjustable along the length of cylinder 140 such that the couplers 141a, 141b, 141c may be used to adjust the length of springs 142, 144.

Illustrative tender spring 144 has first, second, third, and fourth coils 144a, 144b, 144c, 144d, however, tender spring 144 may have any number of coils. Tender spring 144 is a progressively wound spring such that the pitch of first, second, third, and fourth coils 144a, 144b, 144c, 144d of tender spring 144 is different throughout the length of tender spring 144. Additionally, the distance between adjacent coils 144a, 144b, 144c, 144d varies such that a distance $d_1$ between first coil 144a and second coil 144b is less than a distance $d_2$ between second coil 144b and third coil 144c. A distance $d_3$ between third coil 144c and fourth coil 144d is greater than distance $d_2$. In this way, when tender spring 144 is compressed towards the position of FIG. 15, each individual coil 144a, 144b, 144c, 144d lays on top of the coil below one at a time. By varying the distance between each of coils 144a, 144b, 144c, 144d, noise is minimized or eliminated when tender spring 144 collapses to the compressed position of FIG. 15 because there is a gradual collapse of tender spring 144 rather than all coils 144a, 144b, 144c, 144d collapsing simultaneously, which may cause spring "chatter" or a "clap" noise. In one embodiment, suspension travel between the extended position of FIG. 14 and the compressed position of FIG. 15 may be approximately 12 inches. However, suspension travel may be more or less than 12 inches in alternative embodiments. Additional details of front suspension assembly 90 and/or rear suspension assembly 130 may be disclosed in U.S. patent application Ser. No. 14/477,589, filed on Sep. 4, 2014, and entitled "SIDE-BY-SIDE VEHICLE", the complete disclosure of which is expressly incorporated by reference herein.

Referring to FIGS. 16-20C, a plurality of body panels of body 32 may extend into operator area 34. For example, body 32 may include inner panels 450, a center console 452 positioned between inner panels 450, a floorboard 454, outer panels 462, and a dashboard assembly 150. Inner panels 450, outer panels 462, and center console 452 may be positioned laterally along seats 48, 40, floorboard 454 may be positioned below seats 38, 40, and dashboard assembly 150 is positioned forward of seats 38, 40. Floorboard assembly may include a dead pedal 456 for the operator to rest his/her left foot on during operation of vehicle 2. A throttle pedal 458 and a brake pedal 460 are both positioned towards centerline $C_L$ from dead pedal 456 such that throttle pedal 458 and brake pedal 460 are positioned intermediate dead pedal 456 and inner panels 450.

Figure 16:
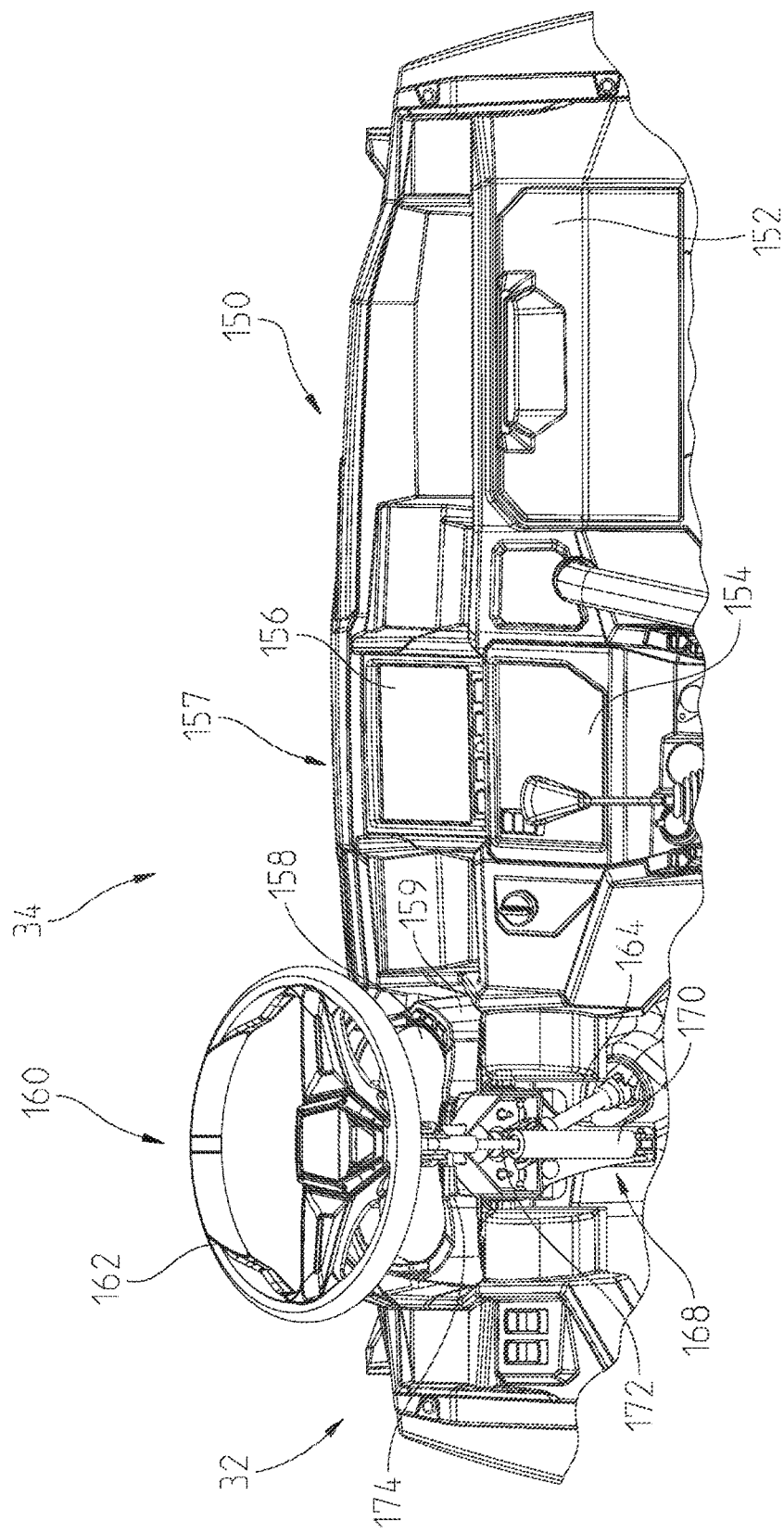
FIG. 16 is a forward-facing view of a portion of an operator area of the vehicle of FIG. 1, showing a dashboard assembly and a portion of a steering assembly.

As shown in FIG. 16, dashboard assembly 150 includes a plurality of storage areas 152, 154. Additionally, dashboard assembly 150 may include a plurality of displays, such as a display 156 positioned generally in the middle of dashboard assembly 150 and a gauge 158 positioned forward of operator seat 38. Alternatively, display 156 may be removed from dashboard assembly 150 to expose an additional storage area for cargo within operator area 34. As shown in FIG. 16, display 156, or the storage area concealed by display 156, are positioned below upper surface 151 of dashboard assembly 150. Display 156 may be configured for GPS, entertainment, information about vehicle parameters, terrain data, and any other features and information related to vehicle 2.

Gauge 158 is configured to display various dynamic vehicle parameters to the operator, such as speed, fuel level, engine temperature, rpm, and other data. Illustratively, gauge 158 is positioned below an upper surface 151 of dashboard assembly 150. Additionally, gauge 158 is forward of a portion of a steering assembly 160, which includes at least a steering wheel 162, a steering column 163, a steering shaft 164, tie rods 166 (FIG. 6), and a tilt assembly 168. Tilt assembly 168 includes a hydraulic or pneumatic shock 170, a piston 172 configured for reciprocal movement within shock 170, and a lever 174 which actuates movement of piston 172 within shock 170. In one embodiment, steering assembly 160 may be a sub-assembly configured to couple with vehicle 2 as a fully-assembled unit, rather than requiring each individual component of steering assembly 160 to be coupled to vehicle 2 one at a time.

Figure 17A:
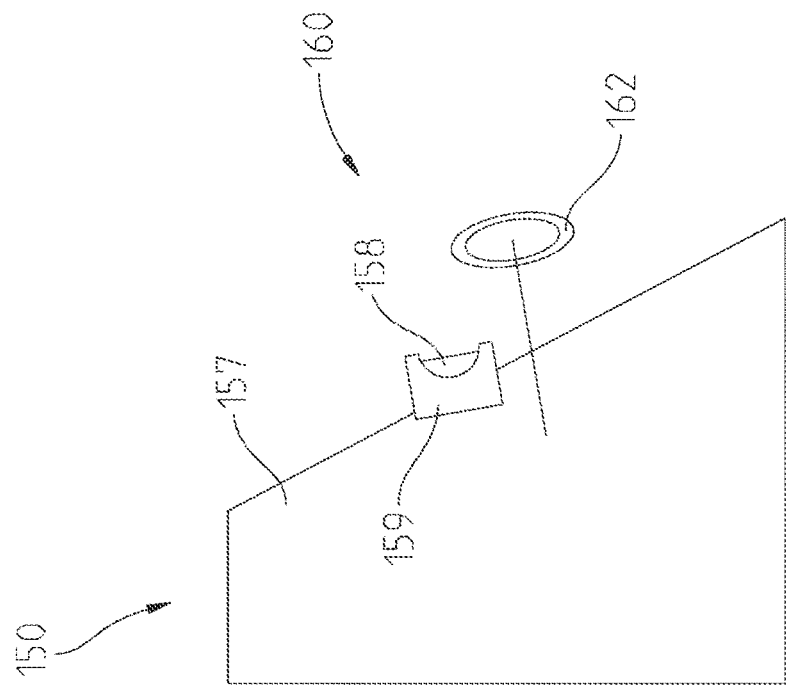
FIG. 17A is a schematic side view of the dashboard assembly and the steering assembly of FIG. 16, with a movable portion of the dashboard assembly in a raised position.
Figure 17B:
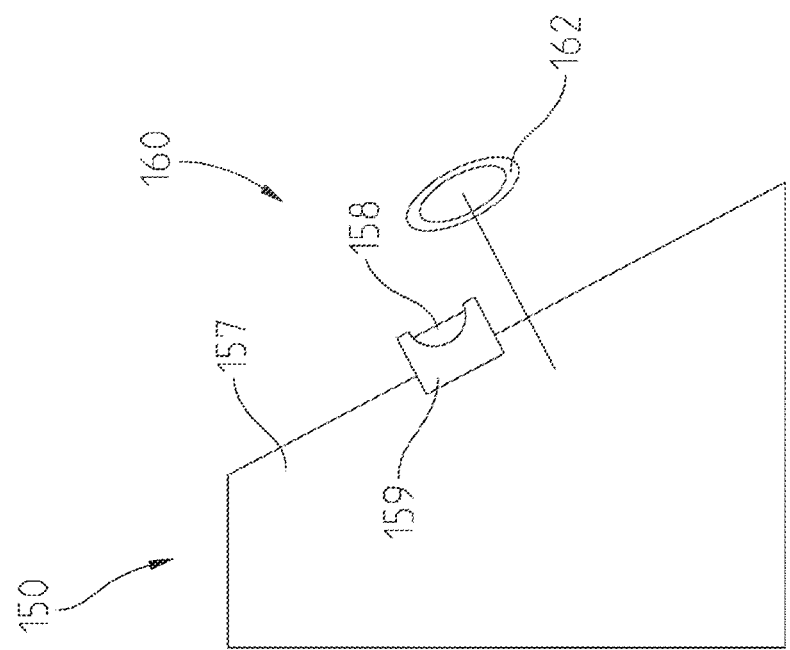
FIG. 17B is a schematic side view of the dashboard assembly and the steering assembly of FIG. 16, with a movable portion of the dashboard assembly in a lowered position.

Referring to FIGS. 17A and 17B, dashboard assembly 150 includes a stationary portion 157 and a movable portion, illustratively a bezel 159. Stationary portion 157 is defined at an upper end by upper surface 151 of dashboard assembly 150. More particularly, an upper surface of gauge 158 and an upper surface of bezel 159 are positioned below upper surface 151 of dashboard assembly 150. The movable portion, defined by bezel 159, supports gauge 158 and is configured to move between a raised and a lowered position. As such, because at least a top portion and a bottom portion of gauge 158 are supported by bezel 159, gauge 158 moves with bezel 159 between the raised and lowered positions. Additionally, bezel 159 and gauge 158 move within dashboard assembly 150 and are positioned below upper surface 151 of dashboard assembly 150 in both the raised and lowered positions.

Figure 17C:
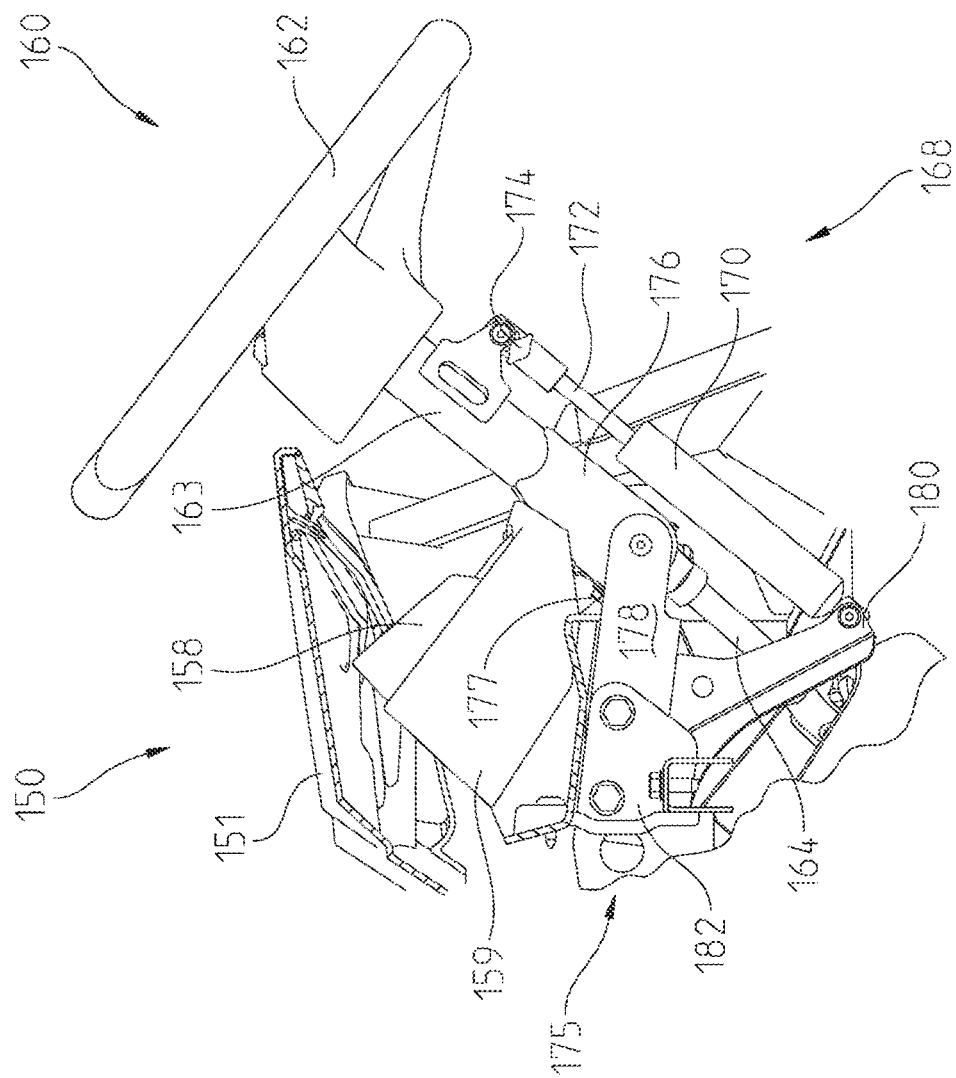
FIG. 17C is a side view of a portion of the steering assembly and a gauge of the dashboard assembly of FIG. 16 in a raised position.
Figure 17D:
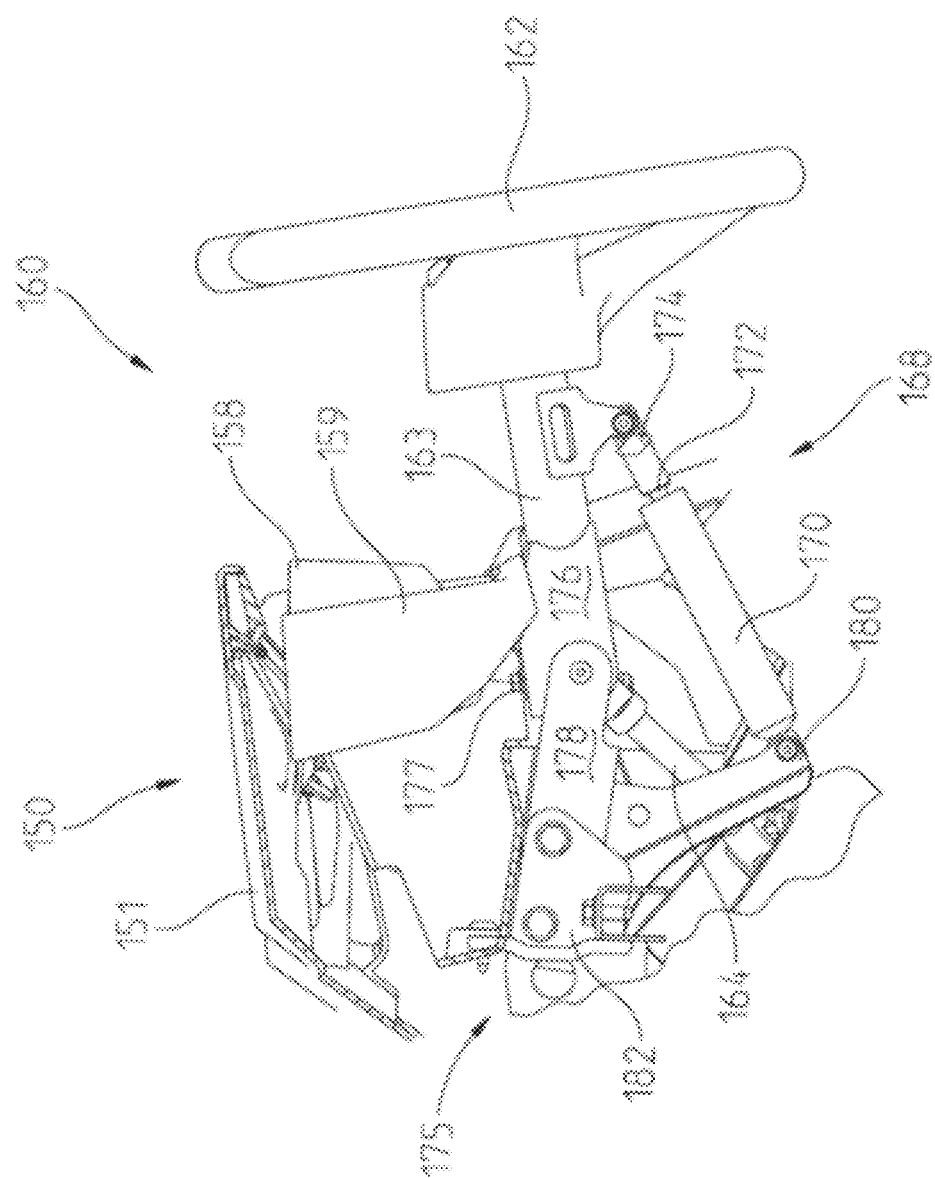
FIG. 17D is a side view of the portion of the steering assembly and the gauge of FIG. 16 in a lowered position.

More particularly, and referring to FIGS. 17D and 17C, gauge 158 is configured to move with steering wheel 162 when tilt assembly 168 is actuated to adjust the position of steering wheel 162 for the operator. More particularly, gauge 158 is supported within bezel 159 of dashboard assembly 150 which is coupled to steering column 163 through a bracket assembly 175. For example, as shown in FIGS. 17C and 17D, gauge 158 is coupled to steering column 163 through a bracket 176 of bracket assembly 175 and is fixed thereto with a fastener 177. Additionally, bracket 176 is pivotably coupled to a brace 178 which is supported by frame assembly 10 and is coupled to tilt assembly 168 through support members 180, 182. Illustratively, a lower end of support member 180 is pivotably coupled to shock 170 of tilt assembly 168 and an upper end of support member 180 is coupled to support member 182. In this way, the position and orientation of gauge 158 is fixed relative to steering wheel 162 such that when tilt assembly 168 allows steering wheel 162 to move between a raised position (FIG. 17C) and a lowered position (FIG. 17D), gauge 158 also moves with steering wheel 162 to maintain its position and orientation relative to steering wheel 162. As such, the operator's view of gauge 158 is not blocked or obstructed by the position of steering wheel 162. Additionally, the operator's line of sight out of the front of vehicle 2 is not obstructed by gauge 158 or steering wheel 162 because both are positioned below upper surface 151 of dashboard assembly 150.

Figure 18:
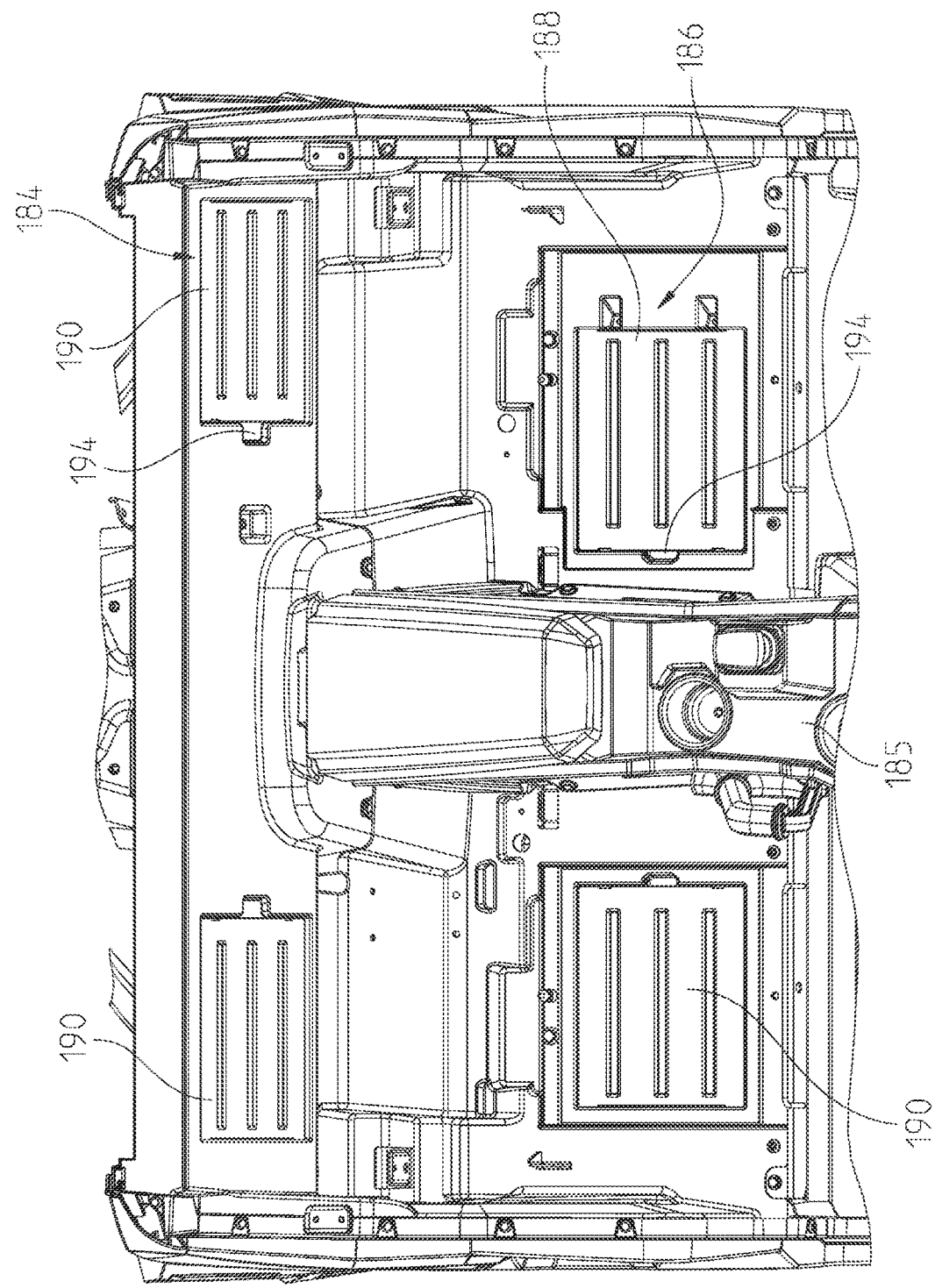
FIG. 18 is a top view of a portion of the operator area of the vehicle of FIG. 1, showing locations of a plurality of covered storage areas.

Referring to FIGS. 18 and 19, body 32 of vehicle also includes additionally storage areas 184, 186 within operator area 34. More particularly, storage areas 184 may be positioned rearward of seats 38, 40 and include panels or doors 190 which are sealed against body 32 of vehicle 2. Storage areas 184 may contain an engine control unit ("ECU") (not shown) or an open volume for cargo or personal effects of either the operator or a passenger. One side of panels 190 is adjacent a recess 194 for opening panel 190 when accessing storage areas 184.

Additionally, storage areas 186 also are positioned within operator area 34 and are positioned on either side of a center console 185 and below operator seat 38 and passenger seat 40. Storage areas 186 may contain batteries (not shown) for vehicle 2, the fuel tank (not shown) of vehicle 2, or an open volume for cargo or personal effects of the operator and/or passenger. Similar to panels 190, storage areas 186 include panels or doors 188 which also abut recess 194. In one embodiment, panels 190 are generally identical to panels 188. Recess 194 assists the operator or passenger when opening or closing panel 190. As with panel 190, panels 188 also may seal against body 32 when in the closed position. In one embodiment, panel 190 is provided for both storage areas 184, 186. Alternatively, panel 190 is provided for storage areas 184 rearward of seats 38, 40 and also for storage area 186 positioned below passenger seat 40 while panel 188 is provided for storage area 186 below operator seat 38.

Figure 20A:
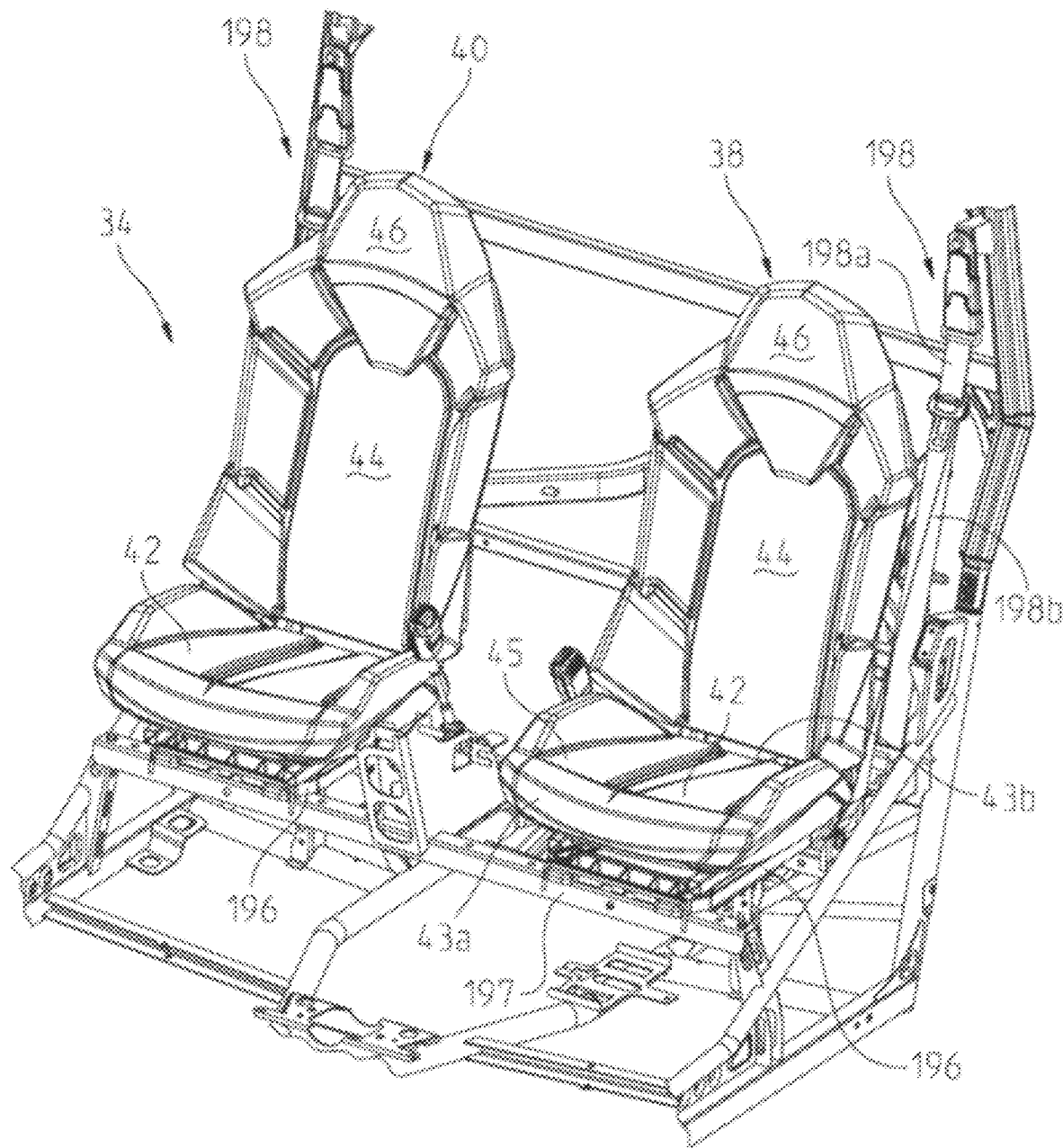
FIG. 20A is a front left perspective view of a portion of the operator area of the vehicle of FIG. 1, showing an operator seat and a passenger seat.

Referring to FIG. 20A, operator seat 38 and passenger seat 40 may be in a side-by-side configuration within operator area 34 and supported by a seat frame 197 of lower frame assembly 12. Alternatively, seats 38, 40 may be in a fore and aft configuration such that passenger seat 40 is positioned rearward of operator seat 38. Seats 38, 40 each include a seat bottom 42, a seat back 44 positioned above seat bottom 42, and a head rest 46 positioned above seat bottom 42 and seat back 44 for at least the operator and a passenger. Seat bottom 42 may be separate from seat back 44, however, head rest 46 may be integrally formed with seat back 44. Alternatively, head rest 46 may be separate from seat back 44. In a further embodiment, seat bottom 42, seat back 44, and head rest 46 all may be coupled together or integrally formed together.

Seat bottoms 42 include forward most edge 43a, a rearward most edge 43b, and a seating surface 45 which are all supported above seat frame 197. Seat bottoms 42 may be coupled to a seat slider assembly 196 such that at least seat bottoms 42 slide in a fore and aft direction relative to seat frame 197. In one embodiment, seat backs 44 are coupled to seat bottoms 42 such that seat backs 44 move with seat bottoms 42 when seat slider assembly 196 is actuated. Additionally, each seat 38, 40 may include a seat belt assembly 198 which may include a shoulder strap 198a and a lap restraint 198b to secure the operator and the passenger within operator area 34 when vehicle 2 is operating.

Figure 20B:
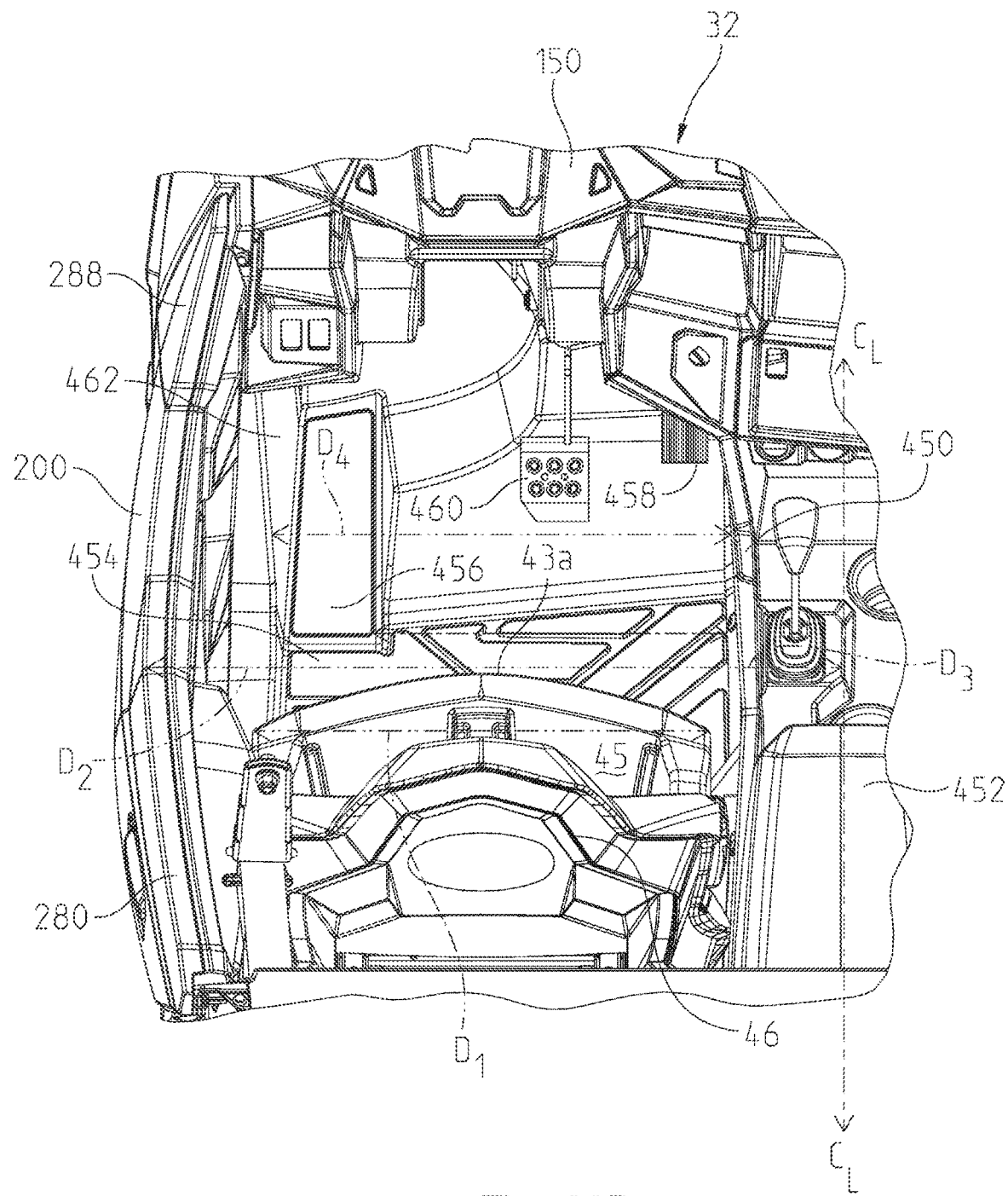
FIG. 20B is a top rear view of a portion of the operator area of the vehicle of FIG. 1, with the steering assembly removed.
Figure 20C:
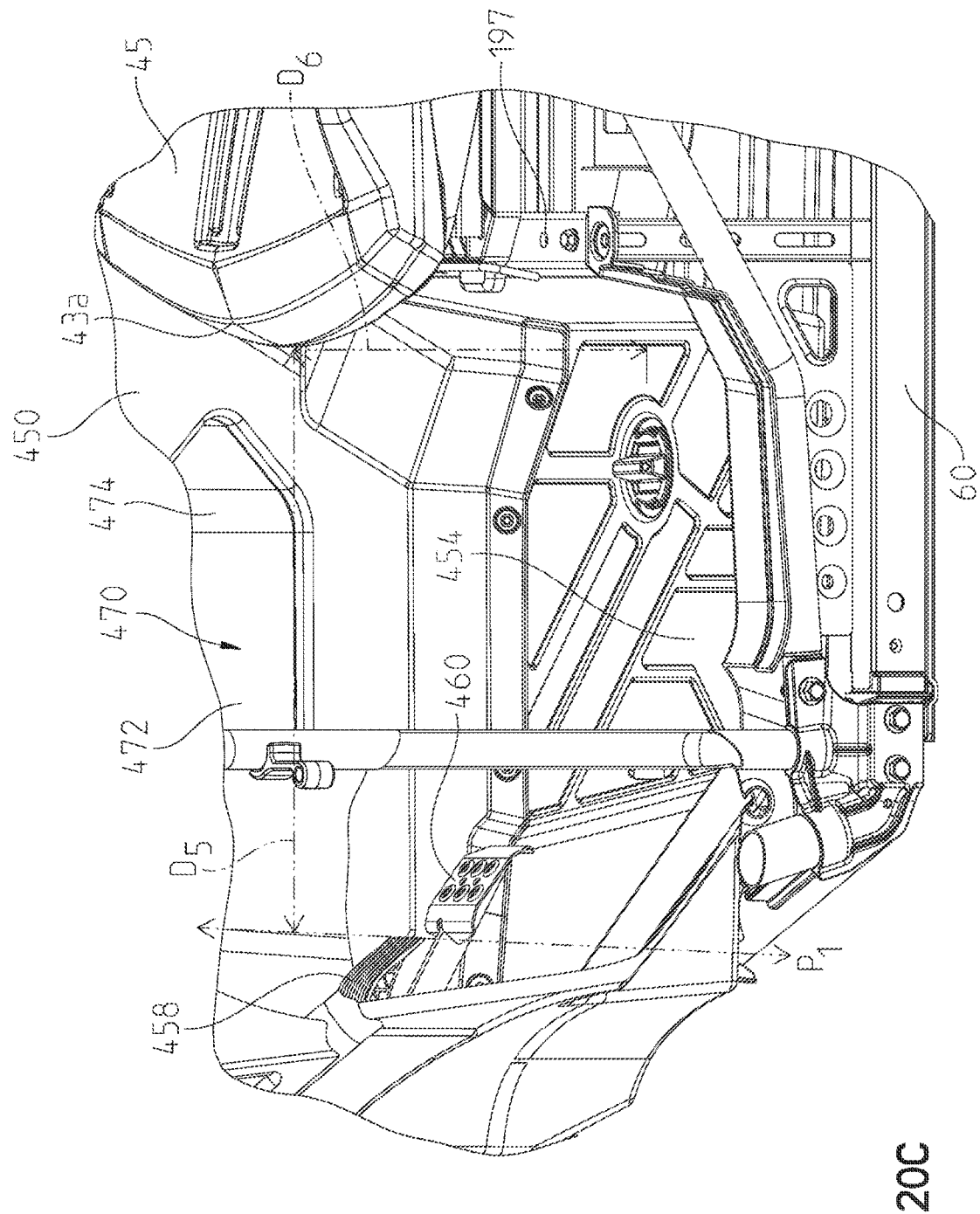
FIG. 20C is a left side view of a portion of the operator area of FIG. 20B.

Referring to FIGS. 20B and 20C, the position of seats 38, 40 allows for additional leg, hip, and elbow room for the operator and/or passenger. For example, in one embodiment, a lateral distance $D_1$ defines a hip width of seat bottoms 42 and may be approximately 18-25 inches and, illustratively, is approximately 21.7 inches. Additionally, a lateral distance $D_2$ between longitudinal centerline $C_L$ and doors 200 defines the elbow room for the operator and/or passenger and may be approximately 25-30 inches and, illustratively, is approximately 28 inches. Referring still to FIG. 20B, a lateral distance $D_3$ between inner panel 450 and outer panel 462 defines the operator's legroom and may be approximately 16-30 inches and, illustratively, may be approximately 20 inches. A lateral distance $D_4$ between inner panel 450 and the lower, inner corner of dead pedal 456 defines the operator's pedal input legroom and may be approximately 10-20 inches and, illustratively, may be approximately 16 inches. Referring to FIG. 20C, the longitudinal and vertical position of operator seat 38 also affects the operator's legroom such that a longitudinal distance $D_5$ extends between a vertical plane $P_1$ which includes the front edge of throttle pedal 458 and front edge 43a of seat bottom 42 may be approximately 20-30 inches and, illustratively, may be approximately 25 inches. Also, a distance $D_6$ defines the vertical legroom for the operator and extends between front edge 43a of seat bottom 42 and floorboard 454. Distance $D_6$ may be approximately 20-30 inches and, illustratively, may be approximately 16.6 inches.

Also shown in FIG. 20C is an opening 470 in body 32 and, more particularly, in inner panel 450, which extends between the operator side and the passenger side of operator area 34. Opening 470 is positioned forward and inward of seats 38, 40 and rearward of pedals 458, 460. Additionally, opening 470 is forward of and below center console 452 and above floorboard 454. Opening 470 is bounded by body panels, such as a floor panel 472, a rear panel 474, a front panel (not shown) generally opposite rear panel 474, and an upper panel (not shown) generally opposite floor panel 472. Any of floor panel 472, rear panel 474, the front panel, and/or the upper panel may include a removable access cover (not shown) which may be removed to expose additional components of vehicle 2. By removing the access cover, other components of vehicle 2 (e.g., drive shaft 295) may be serviced. Additionally, nets or cover members may be movably coupled to inner panels 450 to retain cargo within opening 470. In addition to cargo, opening 470 is configured to receive accessories for vehicle 2, such as a subwoofer, speaker, audio components, or any other vehicle accessory. Furthermore, air vents, a baffle, or other air flow member may be included within floor panel 472, rear panel 474, the front panel, and/or the upper panel of opening 470 and/or may be positioned adjacent opening 470 to direct air flow through a lower portion of operator area 34.

As shown in FIGS. 21-26, vehicle 2 also may include doors 200 for partially enclosing operator area 34. Doors 200 are supported by intermediate frame portion 18 of lower frame assembly 12 and are pivotably coupled thereto. More particularly, doors 200 are pivotably coupled to upstanding members 66 of intermediate frame portion 18 of lower frame assembly 12 through a plurality of hinges 202. In this way, doors 200 pivot about upstanding members 66 when moving between a closed position and an open position to allow ingress and egress from operator area 34.

Figure 22:
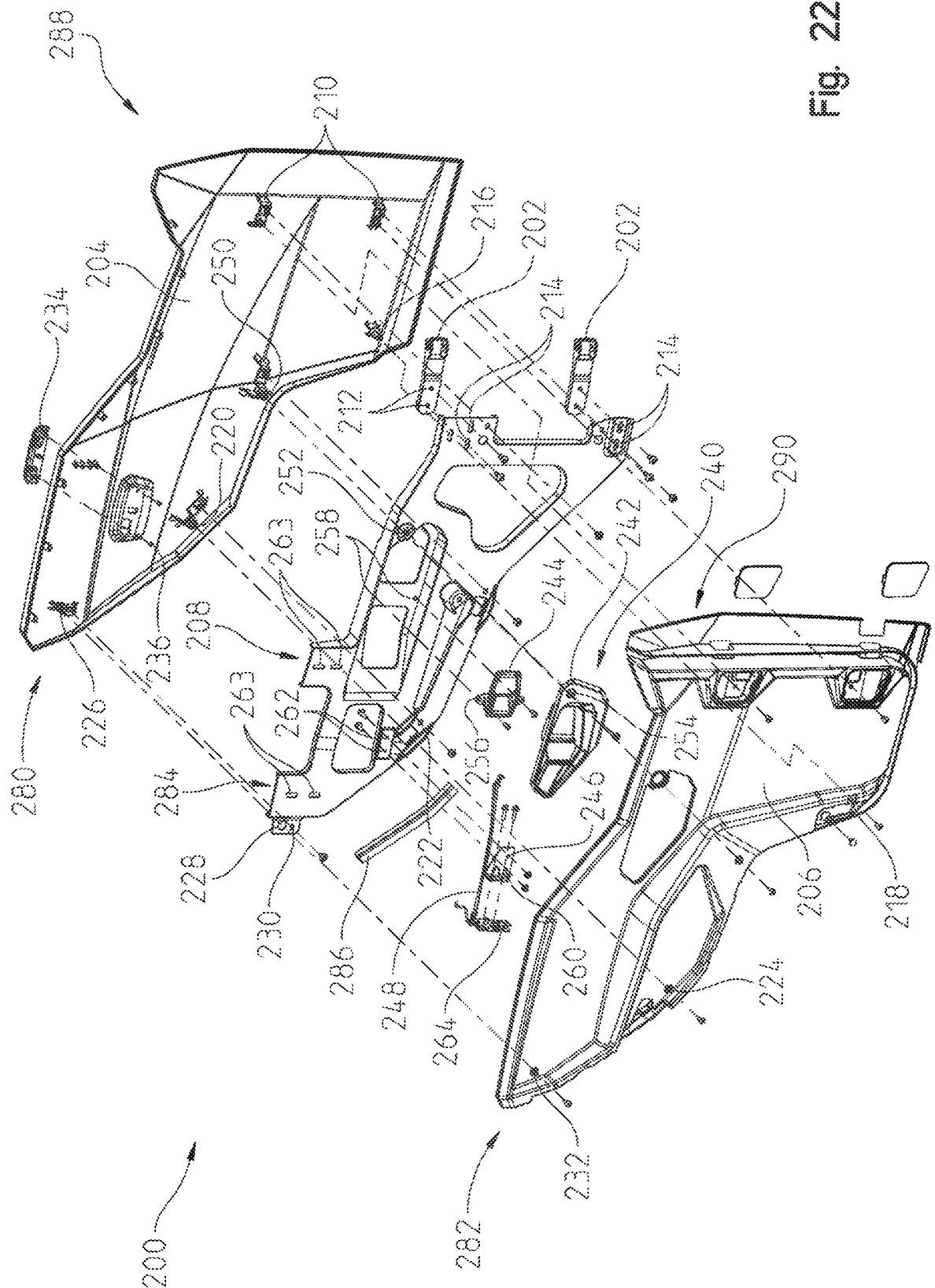
FIG. 22 is an exploded view of the door assembly of FIG. 21.

As shown in FIG. 22, doors 200 include an outer panel 204, an inner panel 206, and a door frame assembly 208 positioned therebetween. Outer panel 204 and inner panel 206 may be comprised of a polymeric material while door frame assembly 208 may be comprised of a metallic material (e.g., steel, aluminum). Door frame assembly 208 may be die cast, rather than stamped, during formation thereof. Inner panel 206 may include pockets or storage compartments (not shown) for maps, route information, or other items brought into vehicle 2 by the operator and/or passenger. Doors 200 also may have a contour which bows or extends outwardly from vehicle 2 to increase the operator space within operator area 34. Additional details related to the contour of doors 200 may be found in U.S. patent application Ser. No. 14/434,685, filed on Apr. 9, 2015, and entitled "SIDE-BY-SIDE VEHICLE", the complete disclosure of which is expressly incorporated by reference herein.

An inner surface of outer panel 204 includes a plurality of brackets for supporting various components of doors 200. More particularly, brackets 210 on outer panel 204 align with apertures 212 on hinges 202 and apertures 214 on door frame assembly 208 to couple hinges 202 to door frame assembly 208 and outer panel 204. Additionally, a bracket 216 on outer panel 204 aligns with an aperture 218 on the outer surface of inner panel 206 to couple inner panel 206 to outer panel 204. Outer panel 204 is also coupled to door frame assembly 208 and inner panel 206 through a bracket 220 on the inner surface of outer panel 204. More particularly, as shown in FIG. 22, bracket 220 aligns with an aperture 222 on door frame assembly 208 and an aperture 224 on inner panel 206 for coupling together outer panel 204, inner panel 206, and door frame assembly 208. Similarly, a bracket 226 on the inner surface of outer panel 204 aligns with an aperture 228 and an aperture 230 on door frame assembly 208 and aligns with an aperture 232 on inner panel 206 to also couple together outer panel 204, inner panel 206, and door frame assembly 208.

Figure 24:
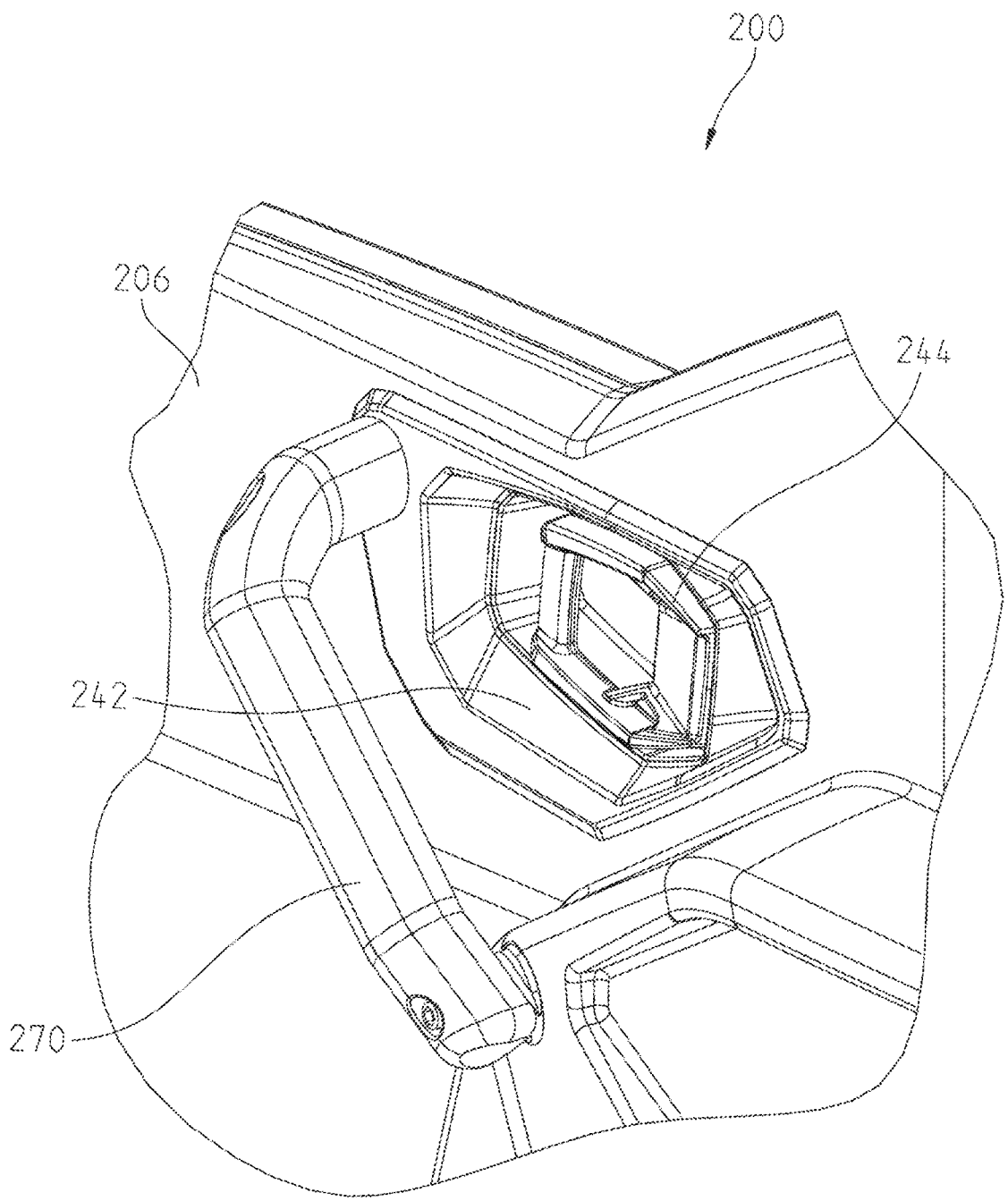
FIG. 24 is a front right perspective view of a grab handle of the door assembly of FIG. 21.

Doors 200 also include an outer handle or latch 234 which is operably coupled to outer panel 204 with fasteners 236. When entering vehicle 2, the operator or passenger may pull on outer handle 234 to release a latch mechanism of doors 200 to open doors 200. A latch assembly 240 also may be coupled to door frame assembly 208 and inner panel 206 to facilitate opening the doors when the operator and/or passenger are exiting vehicle 2. Latch assembly 240 includes an inner handle or latch 242, a latching member 244, a tension or spring assembly 248 operably coupled to inner handle 242 and latching member 244, and a bracket 246 for supporting spring assembly 248. To support latch assembly 240 on doors 200, a bracket 250 on the inner surface of outer panel 204 aligns with an aperture 252 on door frame assembly 208 and an aperture 254 on inner handle 242 and a fastener is received therethrough. Latching member 244 is supported on door frame assembly 208 with fasteners received through apertures 256 on latching member 244 and apertures 258 on door frame assembly 208. In one embodiment, as shown in FIG. 24, a grab bar 270 is coupled to at least inner panel 206 of doors 200 and may be coupled or adjacent to inner handle 242 and latching member 244. Spring assembly 248 is coupled to door frame assembly 208 with fasteners received through apertures 260 on bracket 246 which are aligned with apertures 262 on door frame assembly 208 assembly. As such, spring assembly 248 is fully concealed between door frame assembly 208 and inner panel 206 such that spring assembly 248 is not visible to the operator, the passenger, or anyone outside of vehicle 2.

Figure 21:
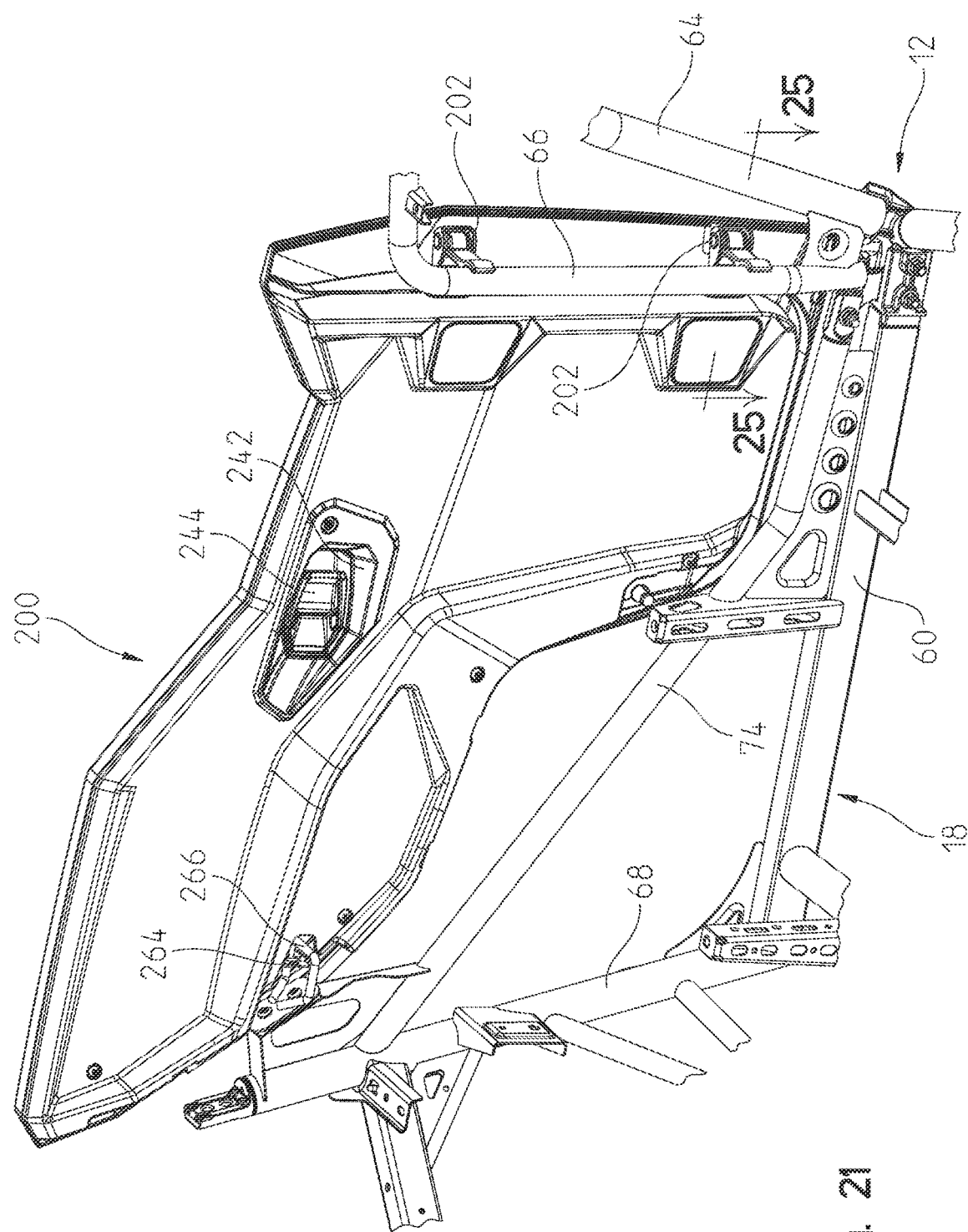
FIG. 21 is a right perspective view of a door assembly of the vehicle of FIG. 1.
Figure 23:
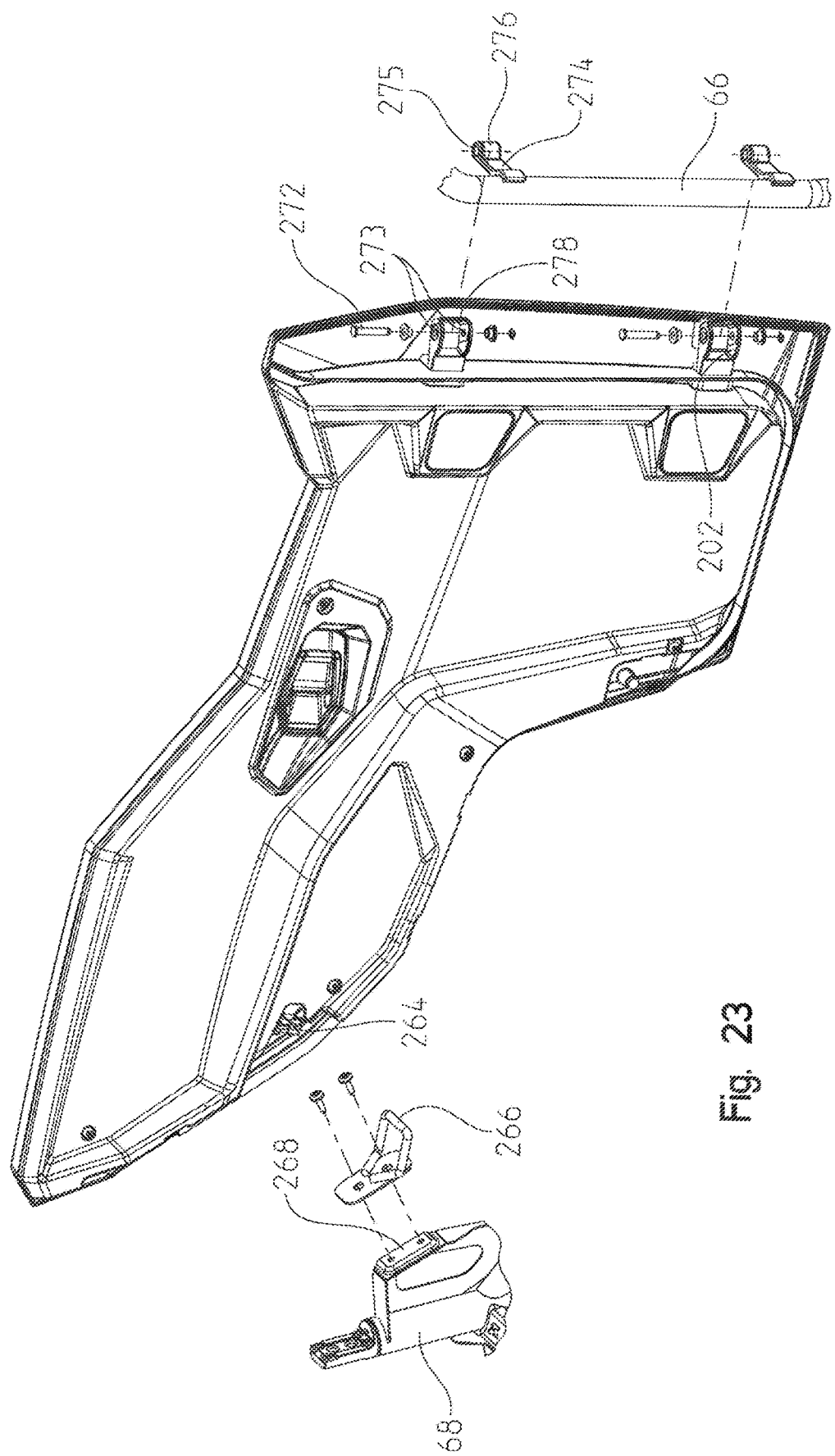
FIG. 23 is an exploded view of the door assembly of FIG. 21, including a latch assembly and a hinge assembly.

Spring assembly 248 is movably coupled to inner handle 242 and latching member 244 such that when the operator or passenger pulls on inner handle 242, spring assembly 248 releases and doors 200 are able to open. As shown in FIGS. 21-23, spring assembly 248 also includes a catch member 264 which is configured to receive and release a latch 266 coupled to third upstanding member 68 through a bracket 268. More particularly, catch member 264 may be a detent member configured to receive latch 266 to secure door 200 in the closed position during operation of vehicle 2. However, when the operator or passenger opens doors 200, the operator or passenger pulls on inner handle 242 which causes catch member 264 to release latch 266, thereby allowing doors 200 to pivot to the open position. Similarly, when the operator or passenger opens door 200 with outer handle 234, catch member 264 releases latch 266 to allow ingress into operator area 34.

Figure 25:
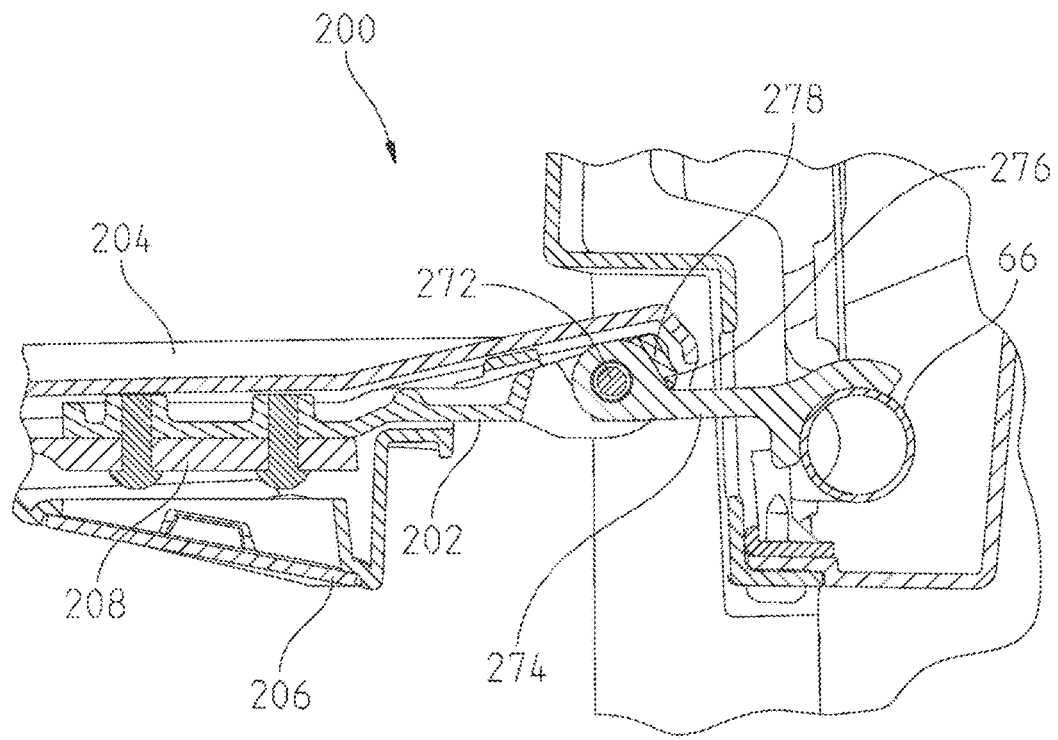
FIG. 25 is a cross-sectional view of the hinge assembly of FIG. 23 with the door assembly in an open position, taken along line 25-25 of FIG. 21.
Figure 26A:
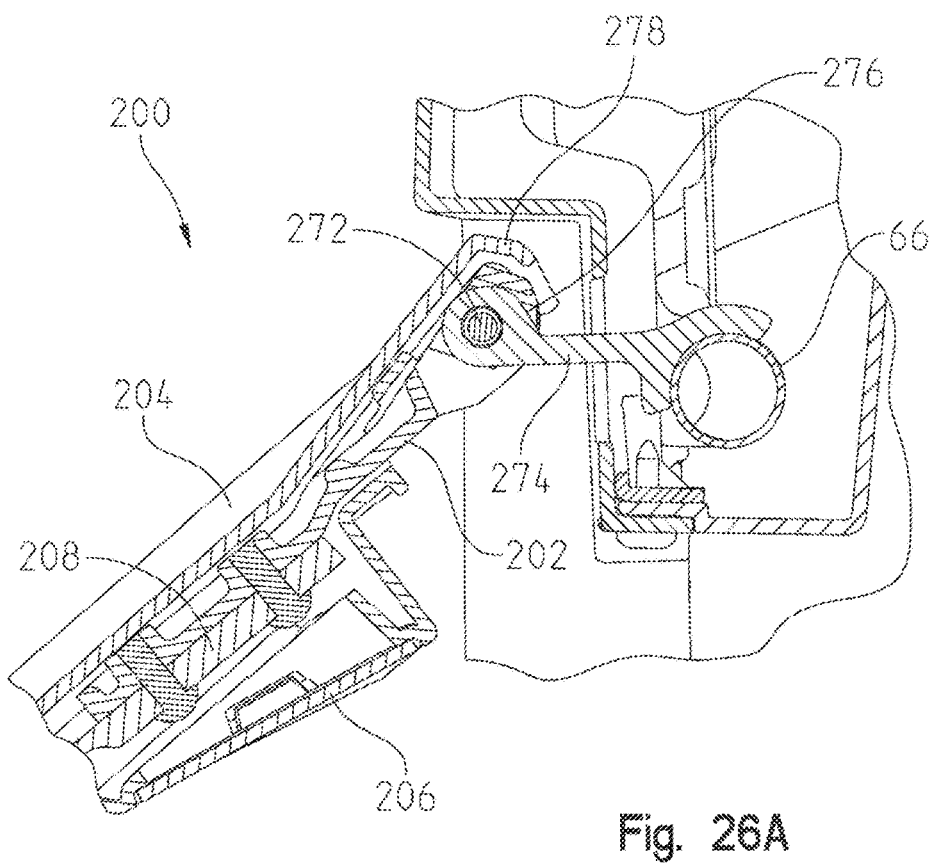
FIG. 26A is a cross-sectional view of the hinge assembly of FIG. 23 with the door assembly in a partially closed position.
Figure 26B:
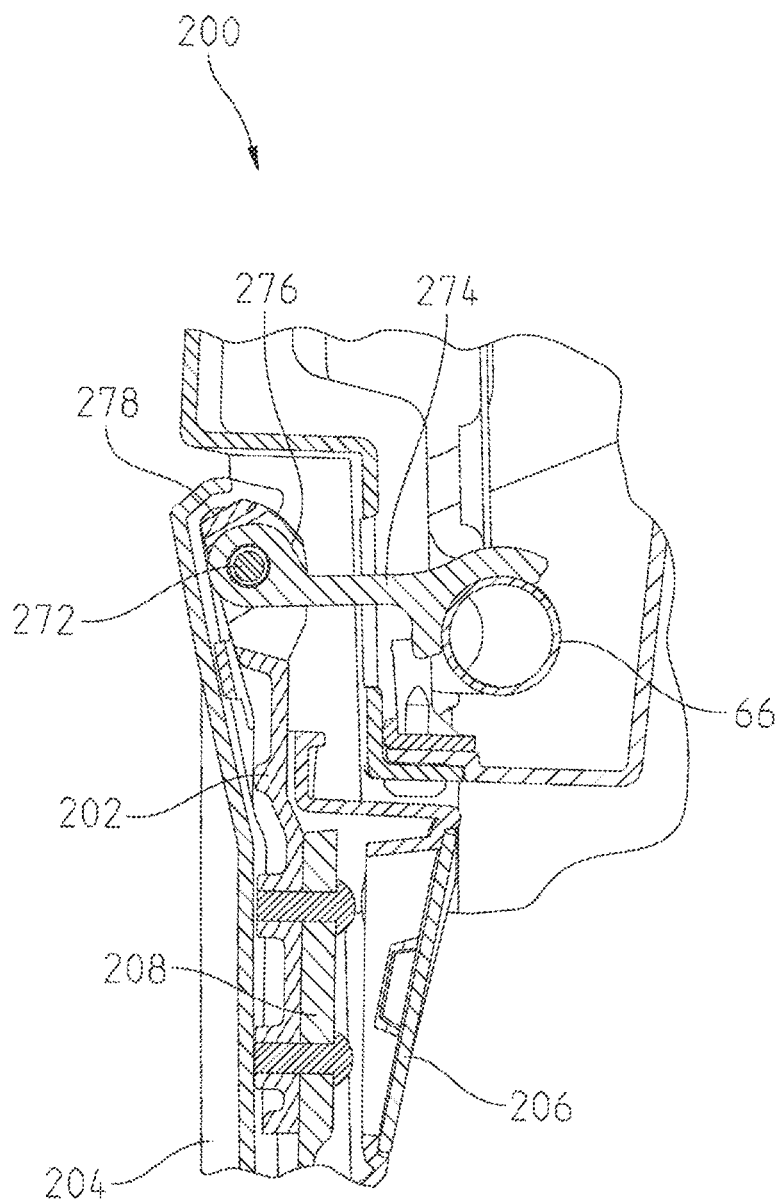
FIG. 26B is a cross-sectional view of the hinge assembly of FIG. 23 with the door assembly in a closed position.

Additionally, when opening and closing doors 200, outer panel 204, inner panel 206, and door frame assembly 208 are fixed relative to each other and pivot together about upstanding member 66 through hinges 202. As shown in FIG. 21, hinges 202 are concealed because hinges 202 are positioned along the inner surface of outer panel 204 such that hinges 202 are not visible from the outside of vehicle 2. More particularly, as shown in FIGS. 25-26B, hinges 202 are concealed when doors 200 are in the open position (FIG. 25), the partially closed position (FIG. 26A), and the fully closed position (FIG. 26B). Hinges 202 are pivotably coupled to arms 274 on upstanding members 66. In one embodiment, hinges 202 are removably coupled to arms 274 with a fastener 272. Illustratively, fastener 272 is received vertically through vertically-oriented apertures 273 of hinges 202 and a vertically-oriented channel 275 of arms 274. Arms 274 may be removably or permanently coupled to upstanding members 66. Arms 274 include an engagement surface 276 for engaging a stop surface 278 on hinges 202 when doors 200 are in the open position (FIG. 25). As such, when doors 200 are open, engagement surface 276 is in contact with stop surface 278 to which prevents over-rotation of doors 200. Conversely, when closing doors 200, engagements surface 276 is spaced apart from stop surface 278 and is not in contact therewith. As such, doors 200 pivot freely to the closed position (FIG. 26B). A seal 286 (FIG. 22) may be coupled to a portion of doors 200 such that doors 200 seal against body 32 of vehicle 2.

Furthermore, as shown in FIGS. 1-4, doors 200 have a longitudinal width $W_D$ which is approximately equal to a longitudinal width Wo of an opening between front and rear upstanding members 22, 24. As such, in one embodiment, doors 200 generally extend completely across the longitudinal opening of operator area 34. As shown in FIGS. 1-4 and 22, an upper portion 280 of outer panel 204, an upper portion 282 of inner panel 206, and an upper portion 284 of door frame assembly 208 each extends upwardly from outer handle 234 and latching assembly 240 such that doors 200 contact a portion of rear upstanding members 24. Illustratively, upper portions 280, 282, 284 are positioned below head rests 46 and are adjacent seat backs 44 but extend into upper frame assembly 20 and are positioned above an upper surface of rear cargo area 30. As such, doors 200 are positioned within a bolster area of lower frame assembly 12 adjacent seat backs 44 such that additional frame members are not required in that area. More particularly, and as shown in FIG. 3, upper portion 280 of doors 200 is positioned at approximately the shoulder height of the operator and the passenger to extend along the entire body below the head of the operator and/or the passenger. Additionally, the height of a forward portion of doors 200, defined by a forward portion 288 of outer panel 204 and a forward portion 290 of inner panel 206, is approximately the same as the height of upper portions 280, 282, 284, relative to longitudinal member 60 and ground surface G when in the position shown in FIG. 3. For example, in one embodiment, a height $H_1$ from the bottom surface of longitudinal member 60 to upper portion 280 of door 200 may be approximately 32-38 inches and, illustratively, may be approximately 35 inches. Conversely, the height of a portion of doors intermediate forward portions 288, 290 and upper portions 280, 282, 284 may be less than the height of forward portions 288, 290 and upper portions 280, 282, 284, relative to longitudinal member 60 and ground surface G when in the position shown in FIG. 3, thereby increasing the operator's line of sight over doors 200.

Upper portion 284 of door frame assembly 208 may be configured as an accessory mount. For example, while illustrative doors 200 are shown as half-doors, an upper portion of doors 200 may be coupled to upper portion 284 of door frame assembly 208 to define a full-door for vehicle 2. More particularly, upper portion 284 of door frame assembly 208 includes a plurality of slots or apertures 263 which are configured to receive fasteners for coupling an accessory to doors 200, such as a hard plastic upper door, a canvas upper door, fabric side nets, or any other accessory configured for attachment to doors 200. Alternatively, the upper door or any other accessory may be coupled to upper portions 280, 282 of outer and inner panels 204, 206, rather than coupled to door frame assembly 208.

Figure 33:
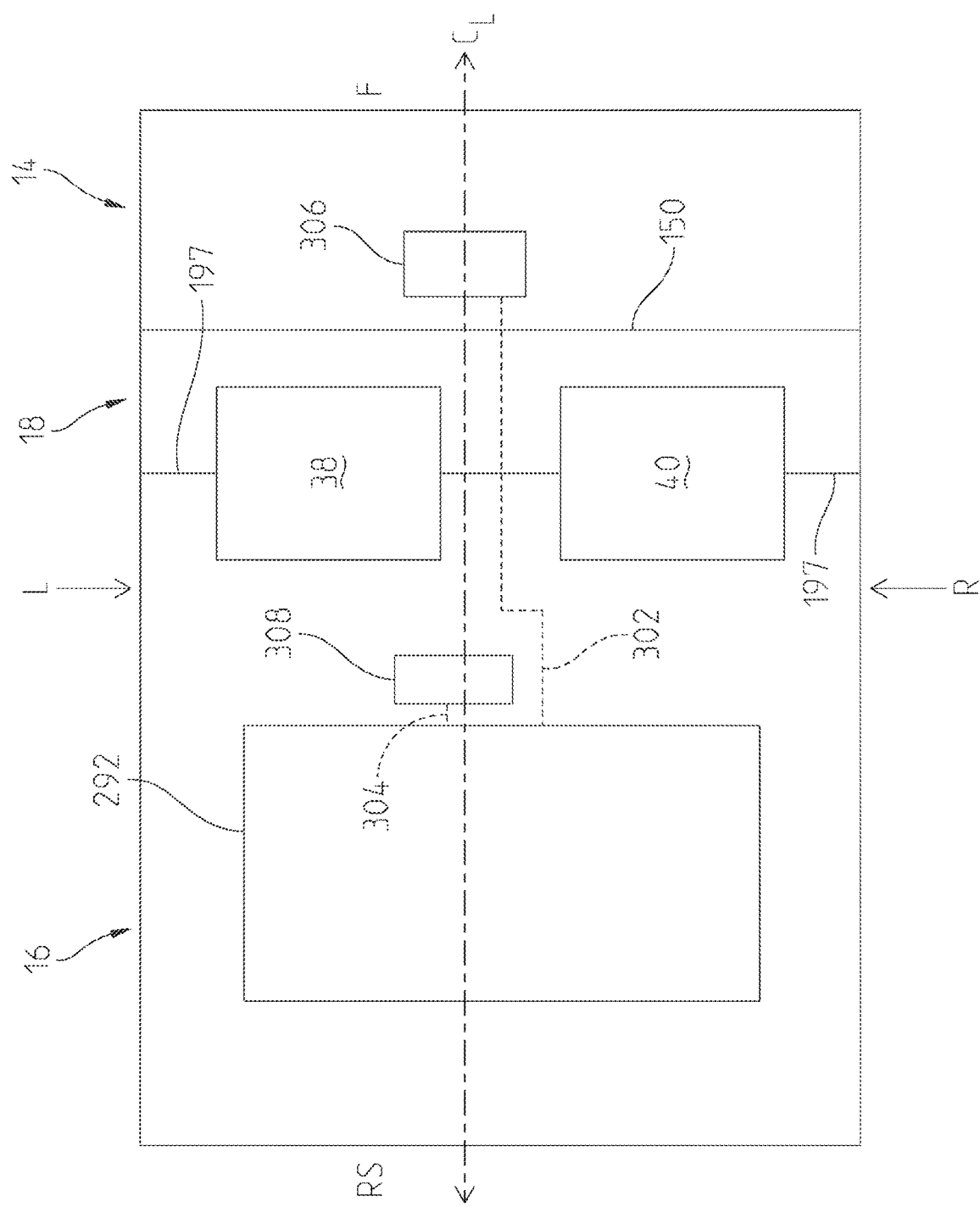
FIG. 33 is a schematic top view of the vehicle of FIG. 1, illustrating an alternative configuration of the air intake assembly of FIG. 32.

Referring to FIGS. 27-37, vehicle 2 further includes an air intake assembly 300. Air intake assembly 300 includes a first conduit 302 and a second conduit 304. First and second conduits 302, 304 are fluidly coupled to at least one application device of vehicle 2, for example powertrain assembly 292 of vehicle 2. More particularly, in one embodiment, first conduit 302 defines a first flow path fluidly coupled to engine 294 and second conduit 304 defines a second flow path fluidly coupled to CVT 296. First and second conduits 302, 304 each include an air inlet 306, 308, respectively. Air inlets 306, 308 each have an air opening or intake 310, 312, respectively, which may be angled relative to each other or parallel to each other. For example, in one embodiment, air intakes 310, 312 are angled relative to each other such that air intake 312 may generally face an operator side or a left side L of vehicle 2 and air intake 310 may generally face a passenger side or right side R of vehicle 2 (FIG. 33). Illustratively, air intake 310 may be angled toward right side R at approximately 45° from centerline $C_L$ and air intake 312 may be angled toward left side L at approximately 45° from centerline $C_L$. However, in a further embodiment, air intake 312 may be oriented at any angle relative to air intake 310. Alternatively, air intakes 310, 312 may be parallel to each other such that each air intake 310, 312 receives air from the same direction and from the same side of vehicle 2. For example, both air intakes 310, 312 may face towards right R, left side L, a front side F, or a rear side RS of vehicle 2 to pull air into first and second conduits 302, 304.

Figure 28:
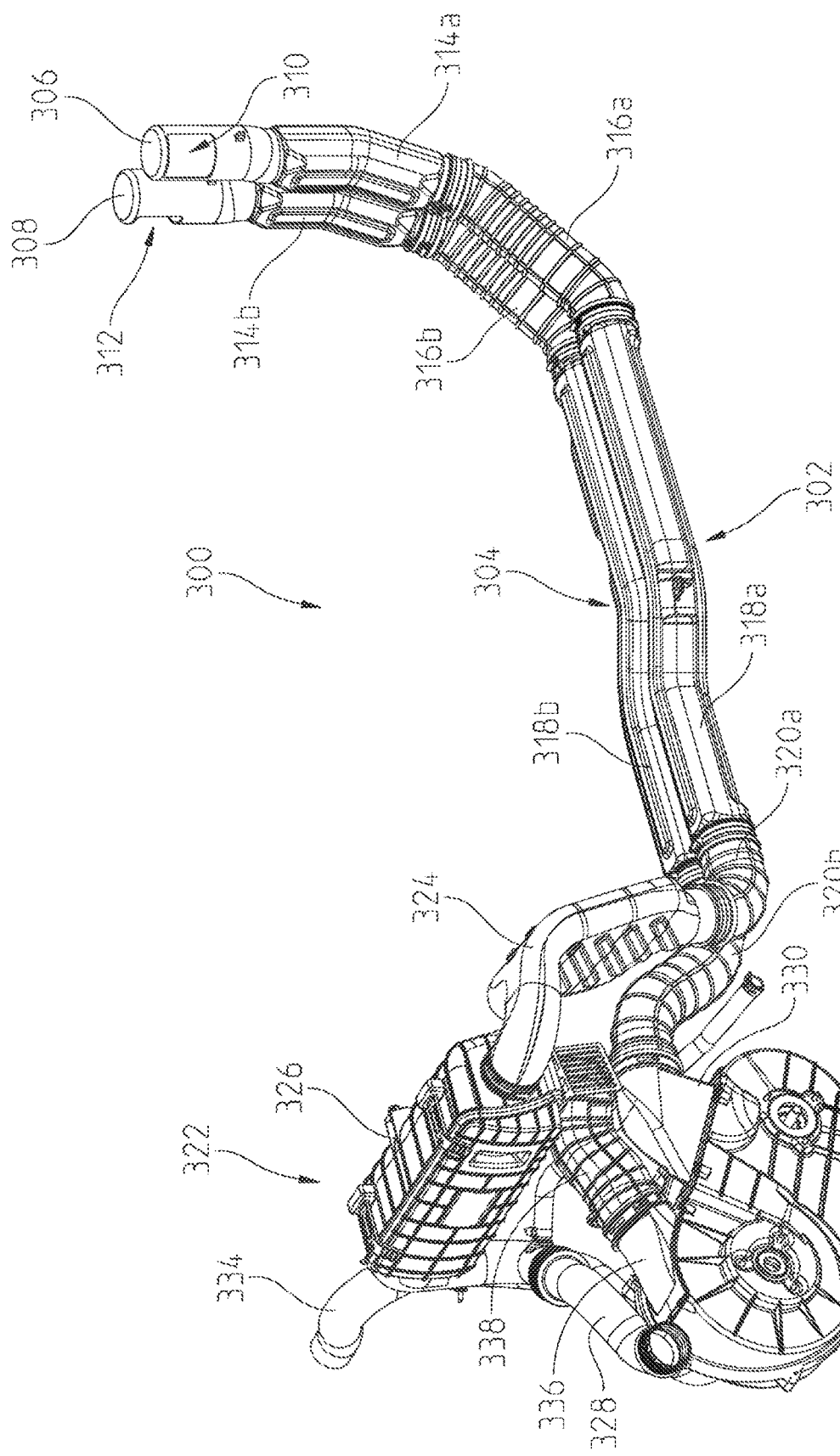
FIG. 28 is a rear right perspective view of the air intake assembly of FIG. 27.

Referring to FIGS. 27 and 28, first and second conduits 302, 304 each may include a single or unitary member extending between air inlets 306, 308 and the at least one application device (e.g., powertrain assembly 292). Alternatively, as shown in FIGS. 27 and 28, first and second conduits 302, 304 may be comprised of multiple members fluidly coupled together and extending between air inlets 306, 308 and the application device. For example, illustrative first conduit 302 includes a first member 314a, a second member 316a, a third member 318a, and a fourth member 320a, and illustrative second conduit 304 includes a first member 314b, a second member 316b, a third member 318b, and a fourth member 320b. Fourth members 320a, 320b define the outlets of first and second air conduits 302, 304, respectively, and the outlets are positioned rearward of seat frame 197. Additionally, at least one of the outlets defined by fourth members 320a, 320b is positioned rearward of rearward most edge 43b of seat bottom 42. As shown in at least FIG. 32, the outlet defined by fourth member 320a is positioned in a generally vertical direction and may be angled relative to the directions of first and second intakes 310, 312 and the outlet defined by fourth member 320b is positioned in a generally rearward direction and may be angled relative to the directions of first and second intakes 310, 312.

Illustratively, first and third members 314a, 314b, 318a, 318b may be rigid housing members comprised of a rigid polymeric or metallic material while second and fourth members 316a, 316b, 320a, 320b may be flexible housing members comprised a flexible polymeric material. In one embodiment, first and third members 314a, 314b, 318a, 318b are formed through a blow-molding process and second and fourth members 316a, 316b, 320a, 320b are formed through an injection molding process.

As shown in FIGS. 27 and 28, first air conduit 302 is fluidly coupled to an airbox assembly 322 of vehicle 2, which includes a chamber 324, a housing 326, and a conduit 328. Chamber 324 is configured as a tuning chamber to adjust the noise from the air flowing through first air conduit 302 and into housing 326. Chamber 324 is fluidly coupled to housing 326 which includes a filter therein for filtering debris, contaminants, particulates, and other matter from the air flowing from first air conduit 302 and into engine 294 through conduit 328. More particularly, conduit 328 is fluidly coupled to an intake manifold 332 of engine 294, as shown in FIG. 29, for passing filtered air into engine 294 for combustion therein.

Referring to FIGS. 27-31, second air conduit 304 is fluidly coupled to CVT 296 and, more particularly, is coupled to intake port 330 of CVT 296. CVT 296 also may receive a secondary source of air from an auxiliary conduit 334. Auxiliary conduit 334 is fluidly coupled to one of the clutches of CVT 296 and provides cooling air to CVT 296. Air from both second air conduit 304 and auxiliary conduit 334 is exhausted through an exhaust port 336 and an exhaust conduit 338 which faces either right side R or left side L of vehicle 2. Alternatively, exhaust conduit 338 may face rear side RS of vehicle 2 to expel air from CVT 296.

Figure 29:
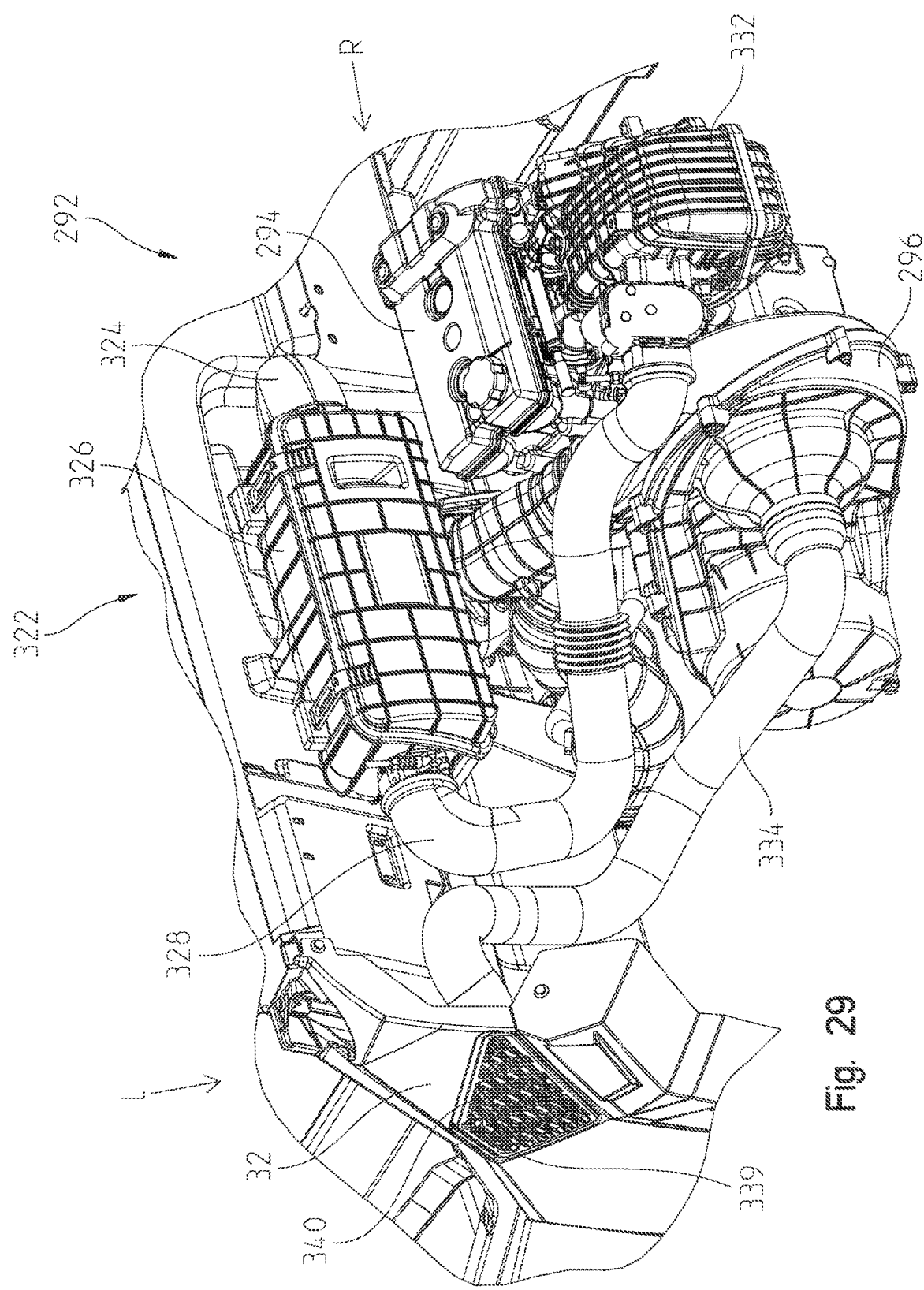
FIG. 29 is a rear left perspective view of a portion of the air intake assembly of FIG. 28 and a portion of a powertrain assembly of the vehicle of FIG. 1.
Figure 30:
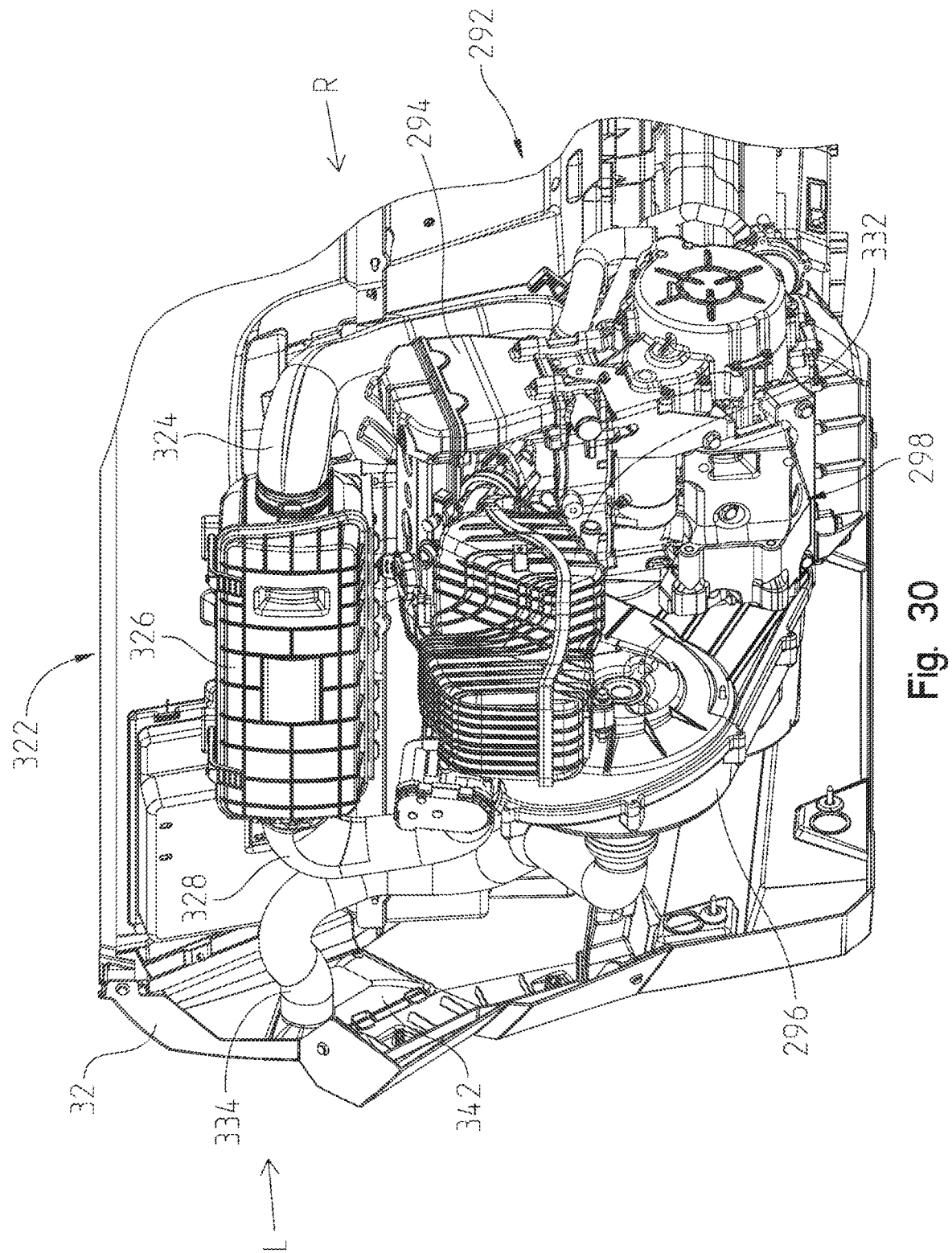
FIG. 30 is a rear right perspective view of the air intake assembly and the powertrain assembly of FIG. 29.
Figure 31:
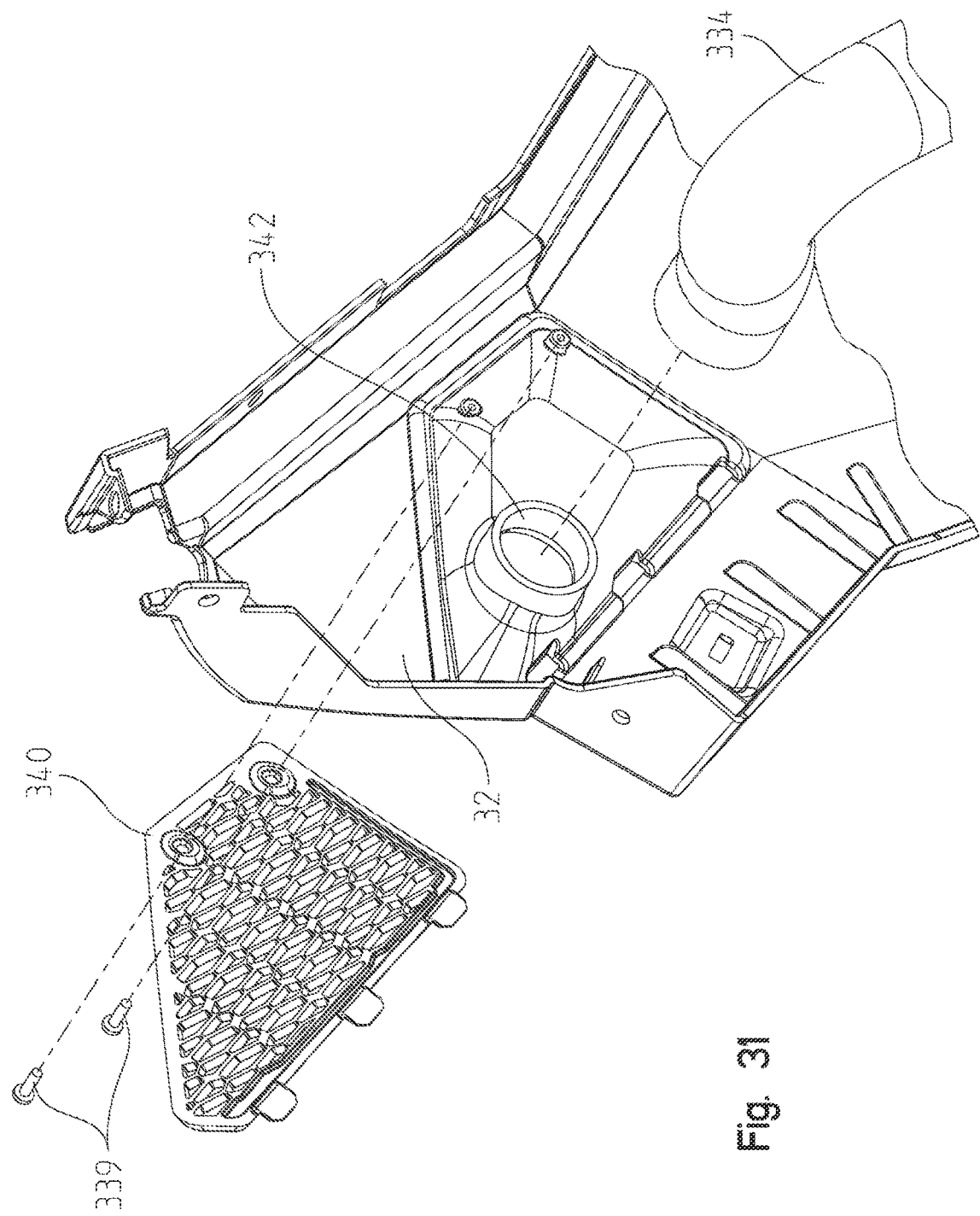
FIG. 31 is an exploded view of a filter, intake port, and an auxiliary conduit for a continuously variable transmission of the powertrain assembly of FIG. 30.

As shown in FIGS. 29-31, auxiliary conduit 334 may receive ambient air from either right side R or left side L of vehicle 2. More particularly, auxiliary conduit extends between CVT 296 and an intake port 342 supported by body 32 of vehicle 2. A screen or filter 340 may positioned outwardly from intake port 342 and supported by body 32. Screen 340 prevents debris, contaminants, and other matter (e.g., stones) from entering CVT 296. In one embodiment, screen 340 is flush with body 32 and coupled thereto with fasteners 339. In this way, CVT 296 receives cooling air from two distinct sources of air—second air conduit 304 and auxiliary conduit 334—each positioned at different locations within vehicle 2. Illustratively, CVT 296 receives a first flow of air from air inlet 312 forward of operator area 34 and a second flow of air from a location rearward of air inlet 312. In particular, air inlet 312 is positioned forward of forward most edge 43a of seat bottom 42 and intake port 342 is positioned rearward of forward most edge 43a. Therefore, should either of these air sources become clogged or otherwise have a decreased air flow, the other conduit continues to provide cooling air to CVT 296. Additional details of CVT 296 may be disclosed in U.S. patent application Ser. No. 14/475,385, filed on Sep. 2, 2014, and entitled "CONTINUOUSLY VARIABLE TRANSMISSION", the complete disclosure of which is expressly incorporated by reference herein.

Referring to FIGS. 32-37, in one embodiment, powertrain assembly 292 is supported above plate 72 and/or plate 84 and is positioned generally rearward of seats 38, 40 in operator area 34. However, a portion of air intake assembly 300 may be supported by front frame portion 14 such that first and second air conduits 302, 304 extend from front frame portion 13, through intermediate frame portion 18, and into rear frame portion 16. For example, as shown in FIG. 32, air inlets 306, 308, first members 314a, 314b, and at least a portion of second members 316a, 316b may be positioned within front frame portion 14. Additionally, a portion of second members 316a, 316b, third members 318a, 318b, and fourth members 320a, 320b extend through intermediate frame portion 18. Chamber 324 of airbox assembly 322 also may be positioned within intermediate frame portion 18. Fourth member 320b may extend into rear frame portion 16 to couple with intake port 330 of CVT 296, which is rearward of intermediate frame portion 18. To limit interference with components within operator area 34, first and second air conduits 302, 304 extend through intermediate frame portion 18 at a position adjacent plate 72 and below seat frame 197.

Alternatively, air intake assembly 300 may be supported by only rear frame portion 16 or intermediate frame portion 18. Additionally, as shown in the illustrative embodiment of FIG. 33, first air inlet 306 may be supported by front frame portion 14 while second air inlet 308 may be supported by rear frame portion 16. As such, first air conduit 302 extends from front frame portion 14 to rear frame portion 16 while second air conduit 304 is positioned at rear frame portion 16 only. Furthermore, while the illustrative embodiment of FIG. 33 discloses both first and second air inlets 306, 308 positioned along longitudinal centerline $C_L$ of vehicle 2, first and/or second air inlets 306, 308 may be positioned along right side R and/or left side L of vehicle 2, or along any portion of vehicle 2 between front frame portion 14 and rear frame portion 16 and between right side R and left side L. For example, as shown in FIG. 33, the configuration of vehicle 2 may define an envelope when viewed from above which includes right side R, left side L, front side F, and rear side RS, and first and second air inlets 306, 308 may face right side R, left side L, front side F, and/or rear side RS.

Figure 36:
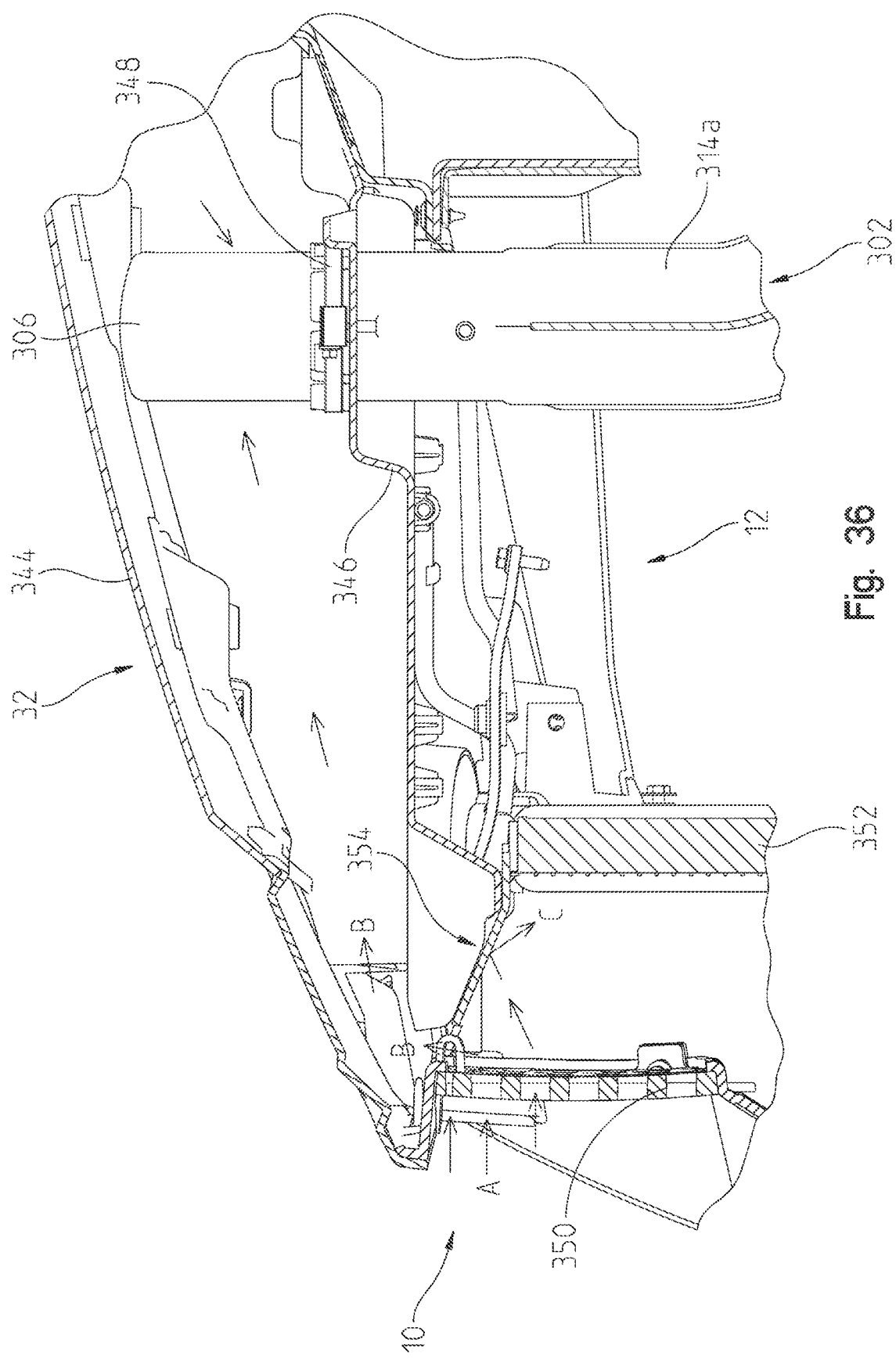
FIG. 36 is a cross-sectional view of a front end of the vehicle of FIG. 1 showing one of the air inlets positioned under a hood of the vehicle, taken along line 36-36 of FIG. 34.

Referring to FIGS. 32 and 34-37, when air intake assembly 300 is configured as shown in FIG. 32 such that first and second air conduits 302, 304 extend from front frame portion 14 to rear frame portion 16, first and second air inlets 306, 308 may be supported below a hood 344 of body 32 (FIG. 36). By coupling first and second air inlets 306, 308 to body member 346, first and second air inlets 306, 308 are positioned forward of forward most edge 43a of seat bottom 42 and also are positioned vertically above seating surface 45 of seat bottom 42. In one embodiment, first and second air inlets 306, 308 may extend through openings in a body member 346, illustratively a hood liner, positioned below hood 344 and extend upwardly therefrom. Additionally, an upper end of first members 314a, 314b also may extend upwardly through the openings in body member 346 to couple with the lower ends of first and second air inlets 306, 308. Collars 348 may be provided around the upper ends of first members 314a, 314b to couple the lower ends of first and second air inlets 306, 308 thereto. In this way, first and second air inlets 306, 308 are supported above body member 346 but are not directly coupled thereto, which may reduce the number of components under hood 344 that are needed for supporting first and second air inlets 306, 308 on front frame portion 14. Additionally, collars 348 may couple first members 314a, 314b to second members 316a, 316b, second members 316a, 316b to third members 318a, 318b, and/or third members 318a, 318b to fourth members 320a, 320b.

Figure 34:
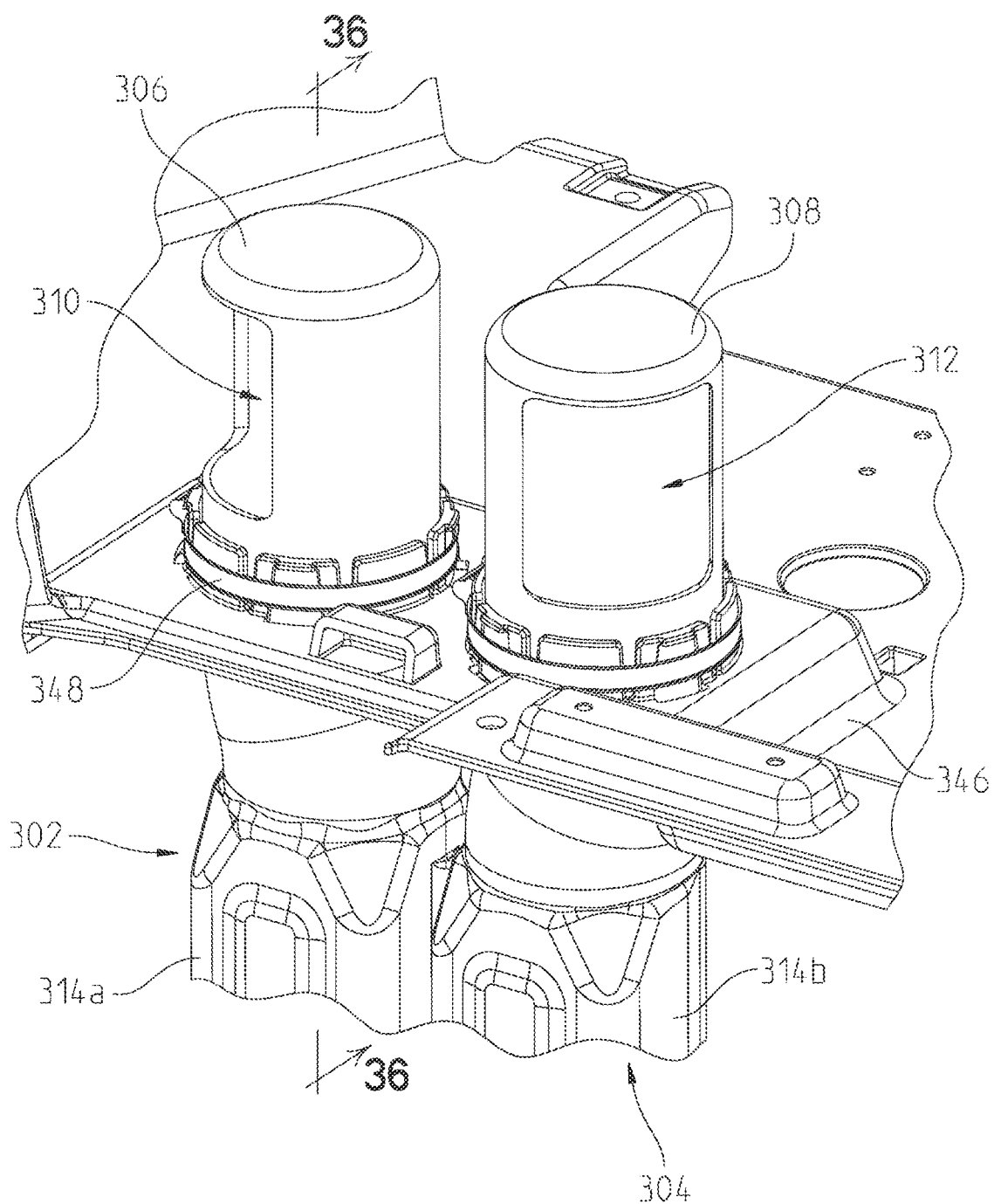
FIG. 34 is a rear perspective view of air inlets of the air intake assembly of FIG. 32.
Figure 35:
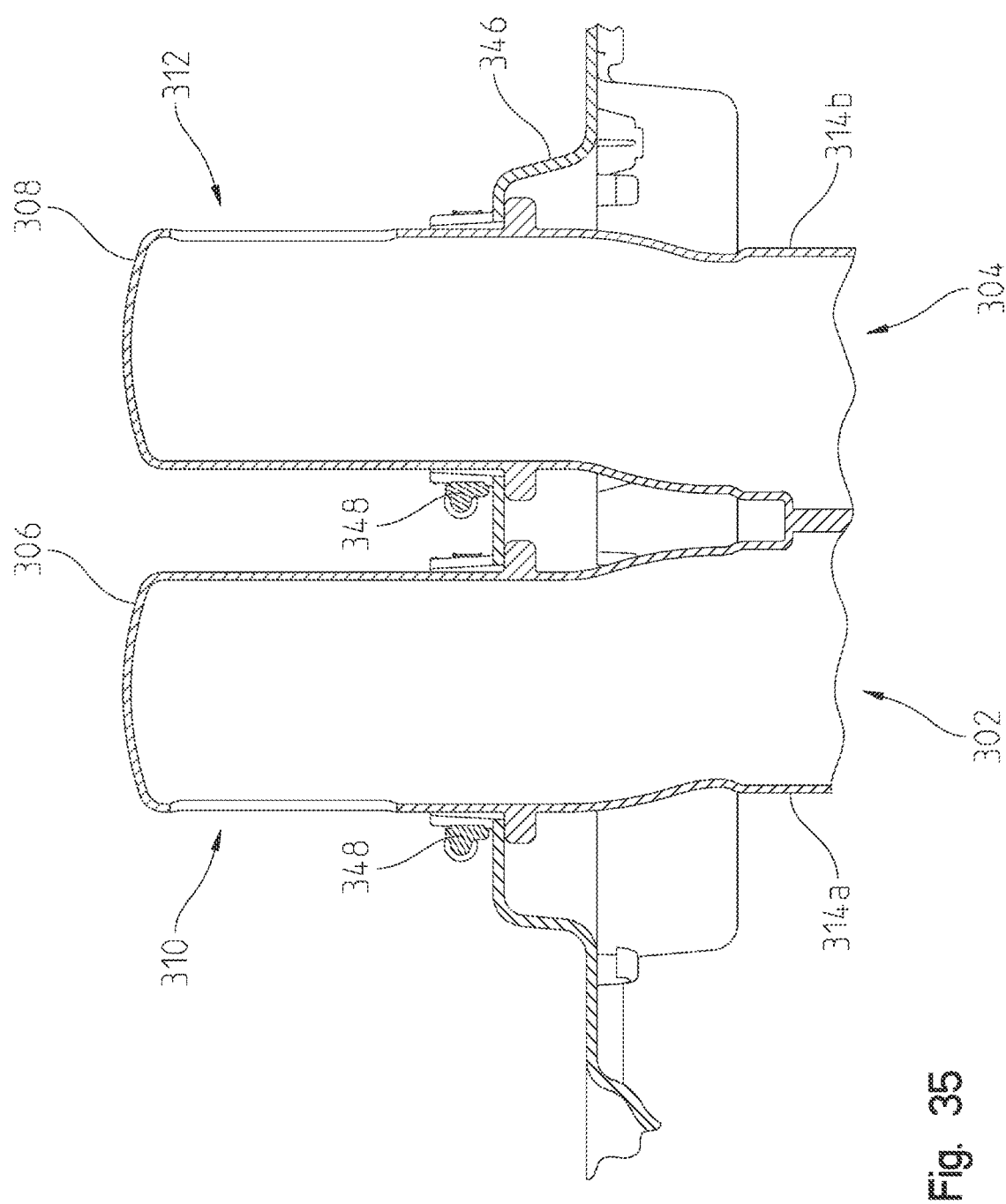
FIG. 35 is a cross-sectional view of the air inlets of FIG. 34.

Additionally, as shown in FIG. 34, air intakes 310, 312 may be angled away from each other such that first air intake 310 is angled toward right side R of vehicle 2 and second air intake 312 is angled toward left side L of vehicle 2. In one embodiment, first air inlet 310 is angled approximately 45° from longitudinal centerline $C_L$ and toward right side R while second air inlet 312 is angled approximately 45° from longitudinal centerline $C_L$ and toward left side L. Alternatively, as disclosed herein, first and second air intakes 310, 312 may be parallel to each other or may be angled relative to each other at any orientation between left side L and right side L of vehicle 2. By angling first and second air inlets 310, 312, the intake of water, dust, or debris may be minimized.

Referring to FIG. 36, during operation of vehicle 2, ambient air flows into air intake assembly 300 to provide combustion air to engine 294 and cooling air to CVT 296. More particularly, ambient air A is received at front side F (FIG. 33) of vehicle 2 and initially flows through a grille 350 supported by body 32. After ambient air A passes through grille 350, the air flow divides into two separate air paths, where one air path B flows toward air inlets 306, 308 and another air path C flows toward radiator 352. Air path C may be cooling air for engine 294 which flows through a radiator 352 before reaching engine 294.

Because body member 346 (FIG. 36) has a recess at portion 354 which vertically overlaps a portion of grille 350, air path B is able to flow upwardly over body member 346 and toward air inlets 306, 308. Additionally, other openings (not shown) in hood 344 may also receive air above body member 346 which combines with air path B and flows toward inlets 306, 308. The air path B flows into first and second air inlets 306, 308 and through first and second air conduits 302, 304 toward an application device (e.g., powertrain assembly 292). Additionally, because illustrative air intakes 310, 312 are angled relative to each other, air intakes 310, 312 do not scavenge air from each other such that each air intake 310, 312 receives approximately the same quantity of air therein. Alternatively, air intakes 310, 312 may be sized to receive different quantities of air.

As a portion of air path B flows through first air inlet 306, air flows through first member 314a, through second member 316a, through third member 318a, and through fourth member 320a before flowing into chamber 324 of airbox assembly 322 and flowing through the filter (not shown) within housing 326 and ultimately into manifold 332 of engine 294 through conduit 328. A portion of air path B simultaneously flows through second air inlet 308, into first member 314b, through second member 316b, into third member 318b, and through fourth member 320b before flowing into intake port 330 of CVT 296.

Figure 37:
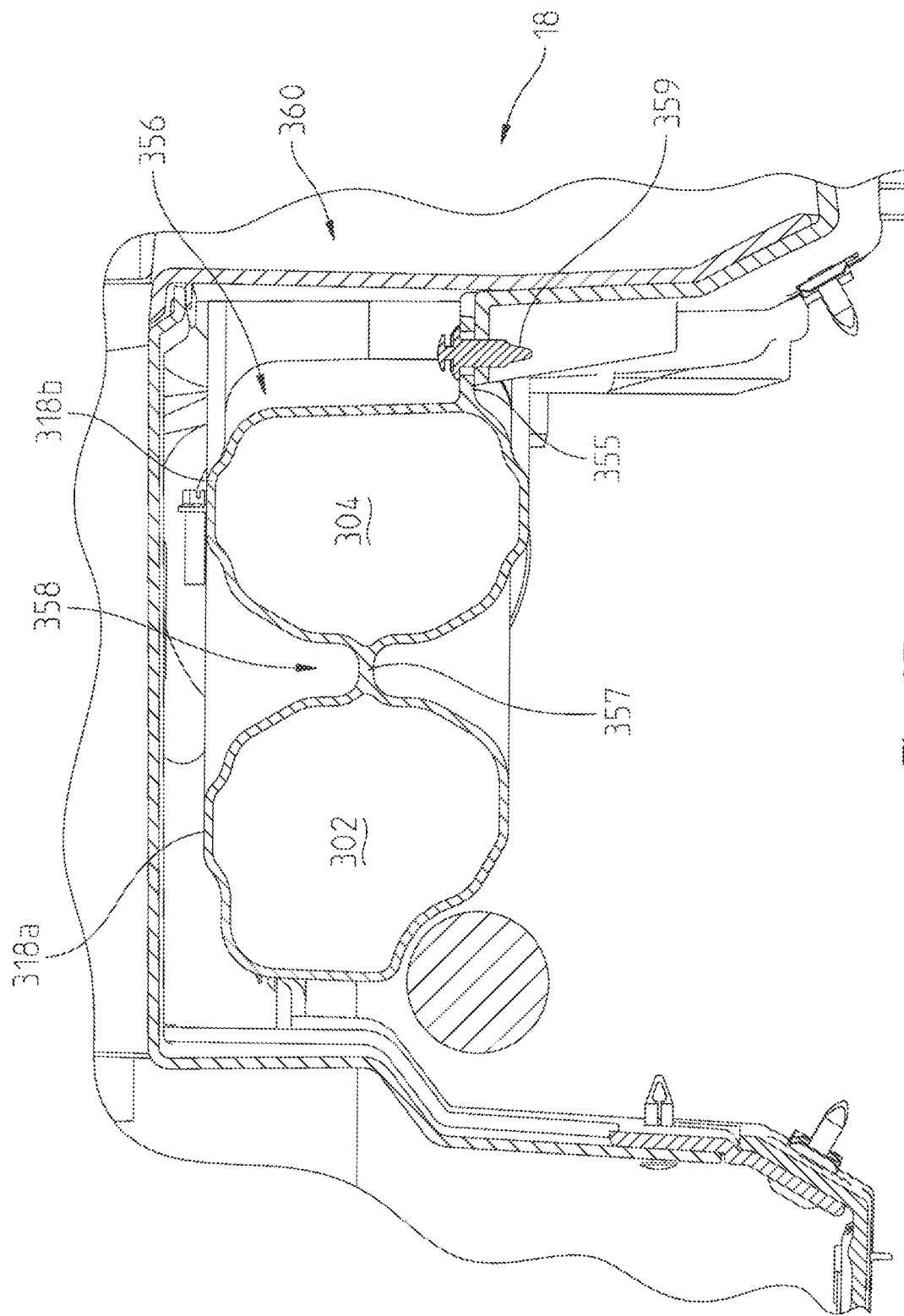
FIG. 37 is a cross-sectional view of a unitary housing member of the air intake assembly of FIG. 27, taken along line 37-37 of FIG. 27.

As shown in FIG. 37, third members 318a, 318b may be integrally formed within a single or unitary housing member 356. Housing member 356 is positioned below seat frame 197 and, therefore, below seat bottoms 42 (FIG. 32). Additionally, housing member 356 may extend generally longitudinally along centerline $C_L$. In one embodiment, housing member 356 may be a blow-molded component defining a portion of both first air conduit 302 and second air conduit 304. Illustratively, housing member 356 includes a wall or separation member 357 positioned intermediate first and second members 318a, 318b which maintains separation between first and second air conduits 302, 304 such that air flowing through first air conduit 302 is not mixed with or scavenged from the air flowing through second air conduit 304. Therefore, by including baffle 357, first and second air conduits 302, 304 are not starved for air and air from one of first and second conduits 302, 304 is not recirculated through the other of first and second conduit 302, 304. Similarly, in one embodiment, first members 314a, 314b also may be contained within a single or unitary housing member and separated by a baffle.

Additionally, baffle 357 and/or other portions of housing member 356 may define a routing tray 358 for supporting a plurality of tubes, conduits, or wires from front frame portion 14 to intermediate frame portion 18 and/or rear frame portion 16. In one embodiment, housing member 356 includes an integral coupling member, illustratively a tab 355, for coupling housing member 356 to a tunnel or floor member 360 of body 32 with a fastener 359. Tunnel member 360 may extend through a portion of operator area 34 and generally conceal portions of air intake assembly 300, drive shaft 295 (FIG. 12), or other components of vehicle 2. Alternatively, fastener 359 may couple housing 356 to a portion of lower frame assembly 12.

Any of inlets 306, 308, first members 314a, 314b, second members 316a, 316b, third members 318a, 318b, and/or fourth members 320a, 320b may include a filter member (not shown) for filtering debris, contaminants, particulates, or other matter from ambient air A entering air intake assembly 300. Additionally, any of inlets 306, 308, first members 314a, 314b, second members 316a, 316b, third members 318a, 318b, and/or fourth members 320a, 320b may include a drain line (not shown) for draining water or other fluids from air intake assembly 300. Also, the size, orientation, or position of any of first members 314a, 314b, second members 316a, 316b, third members 318a, 318b, and/or fourth members 320a, 320b may be adjusted or tuned to accommodate various performance and/or noise requirements.

Figure 38:
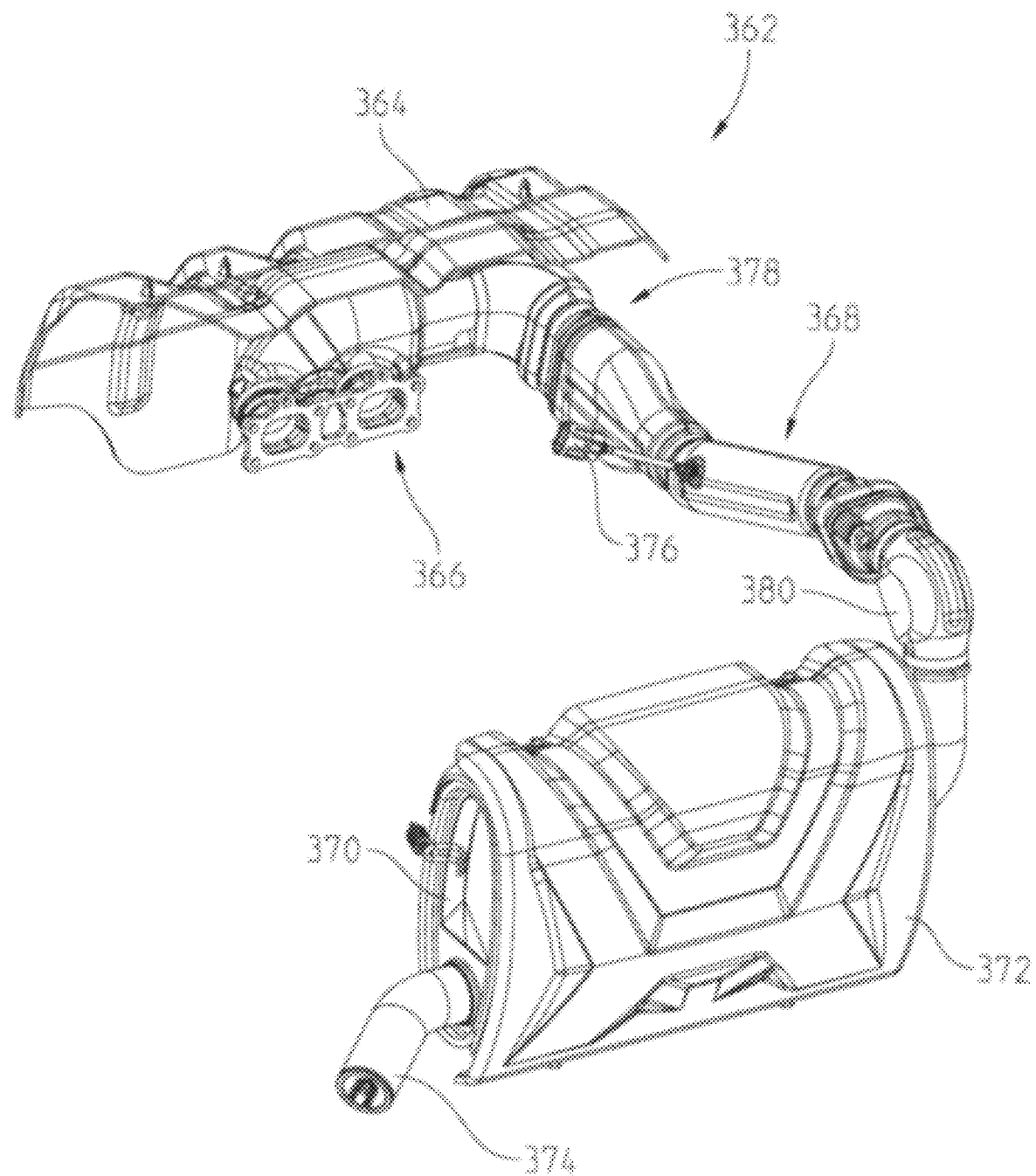
FIG. 38 is a rear left perspective view of an exhaust assembly of the vehicle of FIG. 1.
Figure 39:
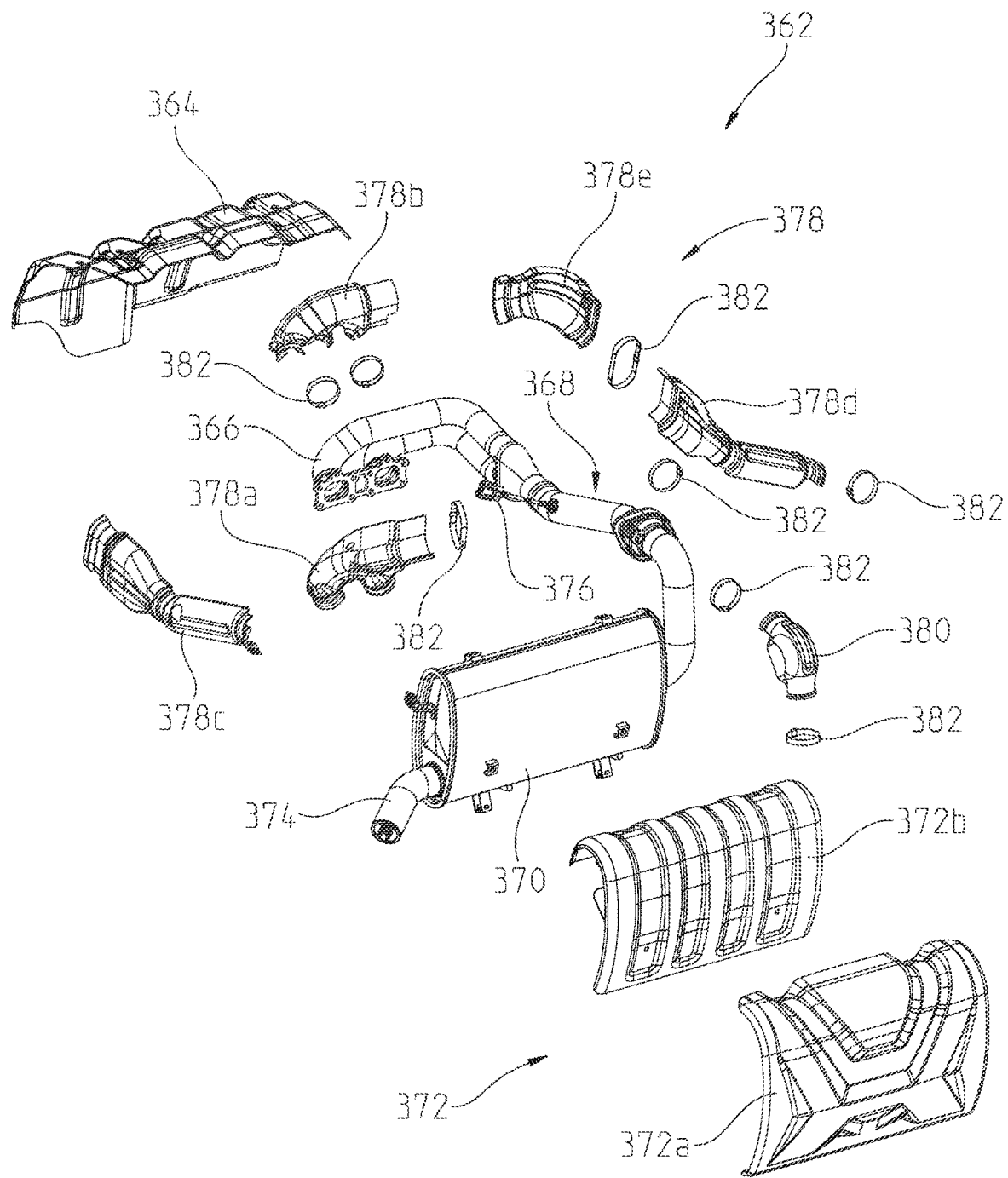
FIG. 39 is an exploded view of the exhaust assembly of FIG. 38.

Referring now to FIGS. 38 and 39, vehicle 2 further includes an exhaust assembly 362. Exhaust assembly 362 includes a first heat shield 364, an exhaust manifold 366, exhaust tubing 368, a muffler or silencer 370, a second heat shield 372, an exhaust pipe or tailpipe 374, a sensor 376, illustratively an oxygen sensor, a third heat shield 378, and a fourth heat shield 380. In one embodiment, first heat shield 364 is positioned forward of exhaust manifold 366 and has a generally concave or semi-circular configuration. Exhaust manifold 366 is generally surrounded by third heat shield 378 defined by members 378a, 378b, 378c, 378d, 378e which are coupled together through collars 382. Third heat shield 378 also surrounds at least a portion of exhaust tubing 368. For example, at least members 378c, 378d generally surround a portion of exhaust tubing 368. Fourth heat shield 380 also surrounds a portion of exhaust tubing 368 and may be coupled to exhaust tubing 368 and/or third heat shield 378 with collars 382.

Second heat shield 372 generally surrounds at least a portion of muffler 370 and includes a first member 372a and a second member 372b. Illustratively, second member 372b is positioned forward of first member 372a such that second member 372b is intermediate the outer surface of muffler 370 and the inner surface of first member 372a. In one embodiment, first and/or second members 372a, 372b of second heat shield 372 may be comprised of a plurality of different layers therein. For example, first and/or second members 372a, 372b of second heat shield 372 may be comprised of six layers of insulating material. By providing first, second, third, and fourth heat shields 364, 372, 378, 380, the heat dissipated by exhaust assembly 362 may not affect other components of vehicle 2.

Referring to FIGS. 40-49, rear cargo area 30 of vehicle 2 is supported on rear frame portion 16 and, more particularly, is supported on upper longitudinal members 80. Rear cargo area 30 includes a cargo box 384, a cargo box frame 386, and a tilt assembly 388 which includes a shock absorber 390 having a pneumatic or hydraulic cylinder 392 and a piston 394. Additionally, tilt assembly 388 includes mounting members 396, pins 398, fasteners 400, and bushings 399. As shown in FIG. 3, rear cargo area 30 is positioned above exhaust assembly 362 and cargo box frame 386 may be generally parallel to upper longitudinal members 80 of rear frame portion 16 when cargo box 384 is in a lowered position.

Figure 40:
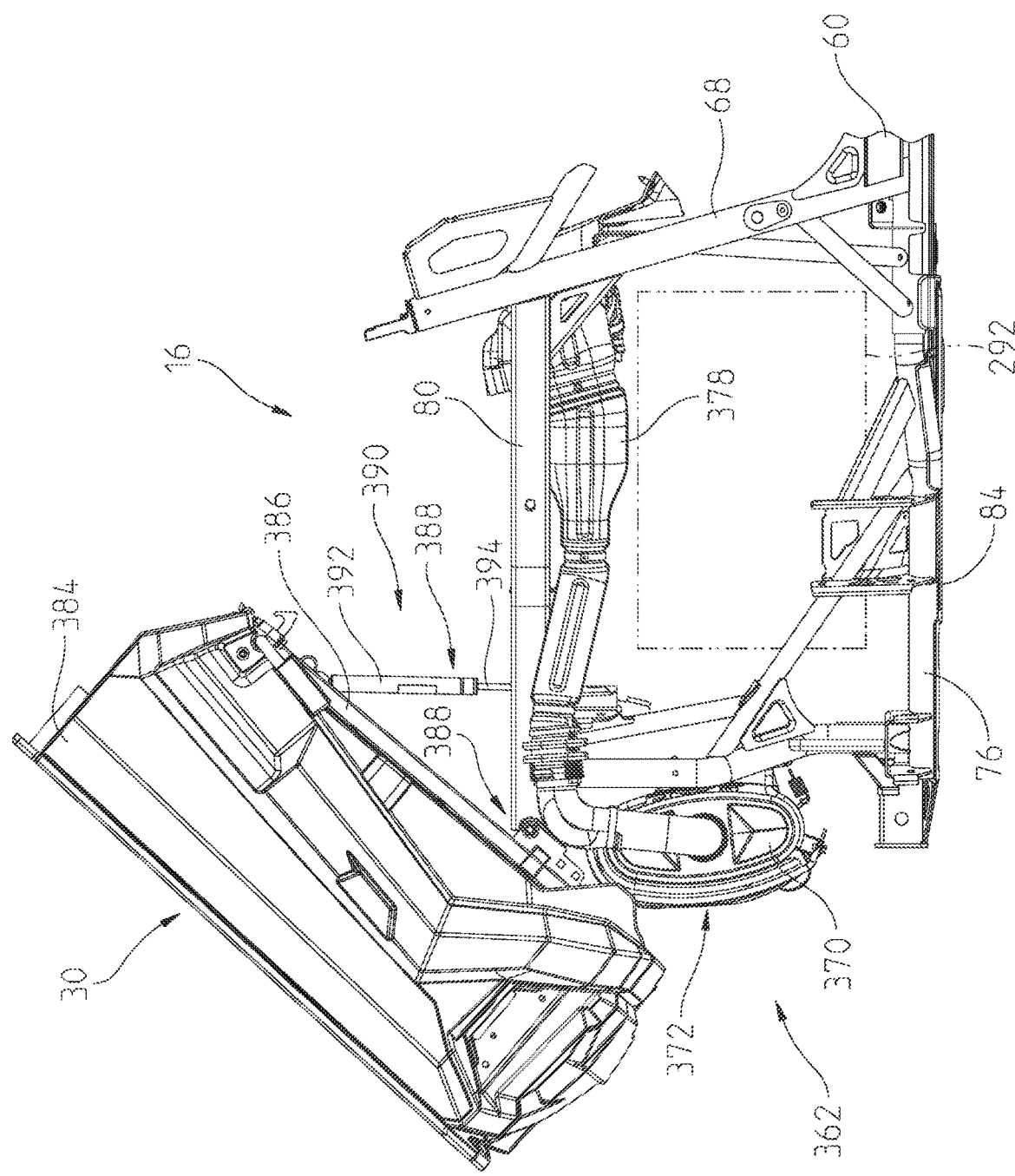
FIG. 40 is a right side view of a rear frame portion of the vehicle of FIG. 1 with a rear cargo area in a raised position.
Figure 41:
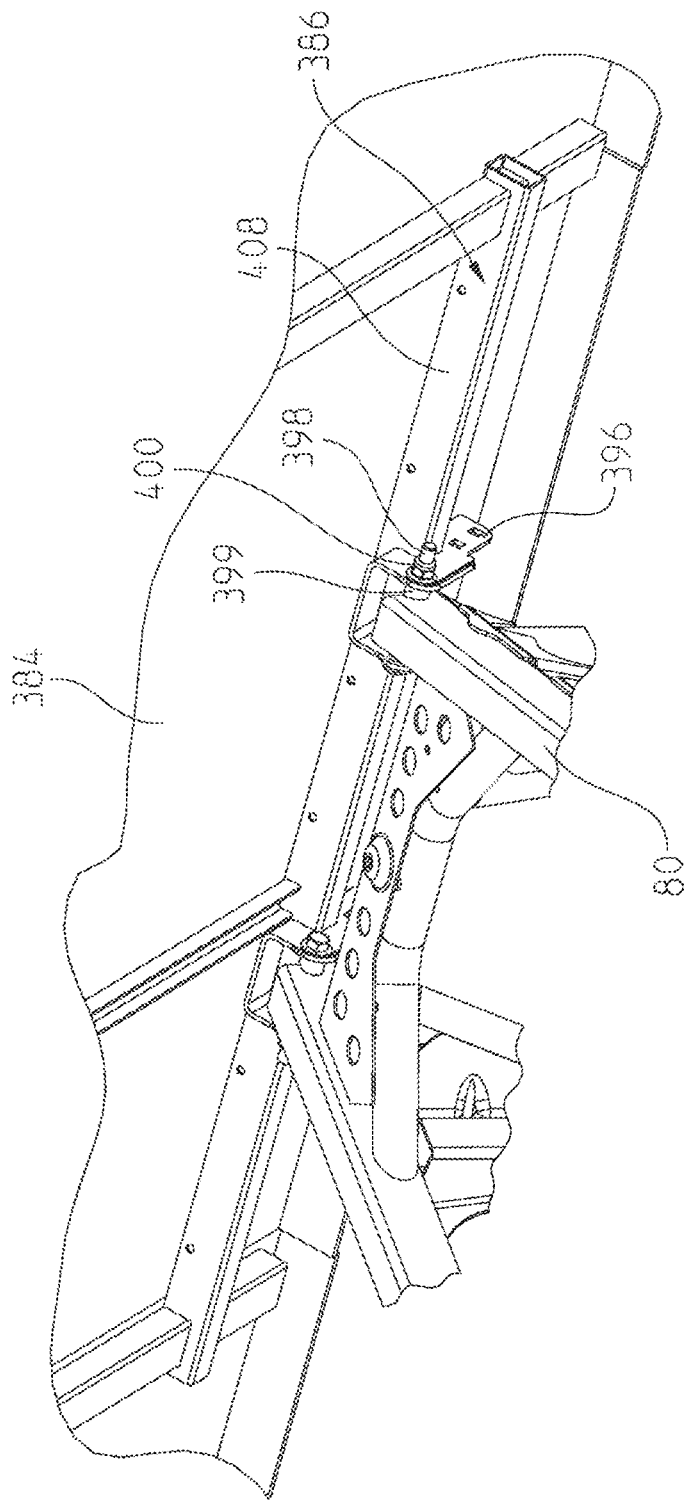
FIG. 41 is a front left perspective view of the rear frame portion and the rear cargo area of FIG. 40.

As shown in FIGS. 40-43B, cargo box 384 is configured to pivot between the lowered position (FIG. 3), in which a cargo surface 422 of cargo box 384 is generally parallel to the ground, and a raised or tilted position (FIG. 40), in which cargo surface 422 is angled relative to the ground. More particularly, cargo box 384 is pivotally coupled to upper longitudinal members 80 with mounting members 396 of tilt assembly 388. Mounting members 396 are coupled to cargo box frame 386 and are configured to receive pins 398 through apertures therein. Pin 398 is received through bushing 399 which is supported on the rearward ends of upper longitudinal members 80 and is secured to bushing 399 and mounting members 396 with fasteners 400. As such, cargo box 384 is configured to pivot about pin 398 between the lowered position and the raised position. As shown in FIGS. 40 and 43, cargo box 384 is configured to pivot above exhaust assembly 362 and, more particularly, to pivot above muffler 370. In particular, the pivot point for cargo box 384, defined by pin 398 and bushing 399, is positioned forward of a mid-line $M_L$ of muffler 370 (FIG. 43B). By positioning the pivot point for cargo box 384 above muffler 370 and forward of mid-line $M_L$, rather than rearward of mid-line $M_L$ of muffler 370, the length of lower frame assembly 12 remains the same and does not need to be extended to accommodate the pivoting movement of cargo box 384. Additionally, as shown in FIG. 40, second heat shield 372 is positioned immediately adjacent muffler 370 such that second heat shield 372 is close to the outer surface of muffler 370. In this way, additional clearance is provided for tilting cargo box 384 without cargo box contacting second heat shield 372.

Figure 47:
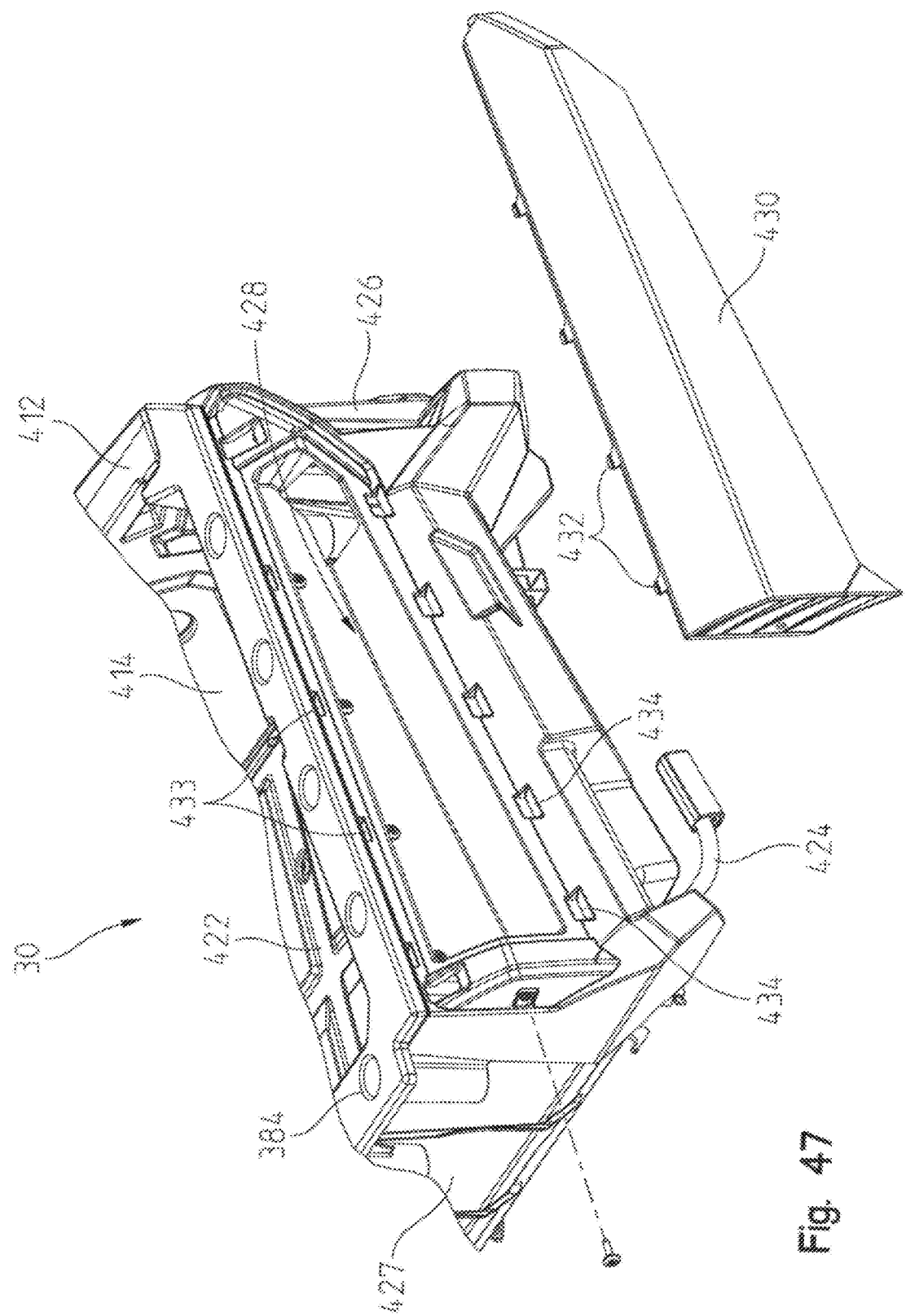
FIG. 47 is an exploded view of a side storage area of the rear cargo area of FIG. 40.

Tilt assembly 388 may prevent cargo box 384 from contacting muffler 370 or another component of exhaust assembly 362 when in the raised position. More particularly, shock absorber 390 may be used to assist in pivoting cargo box 384 between the raised and lowered positions. Illustratively, an upper end of shock absorber 390 is pivotably coupled to cargo box frame 386 with a pin 402 and a lower end of shock absorber 390 is pivotably coupled to a bracket 406 of rear frame portion 16 through a pin 404. In this way, shock absorber 390 is configured to pivot relative to rear frame portion 16 and cargo box frame 386 when raising and lowering cargo box 384. In one embodiment, shock absorber 390 is configured to raise cargo box 384 to a predetermined height and angle to avoid over-pivoting cargo box 384 to a position in which cargo box 384 contacts other components of vehicle 2, for example exhaust assembly 362. Additionally, as shown in FIG. 47, rear cargo area 30 may include a lever 424 to actuate shock absorber 390 when raising and lowering cargo box 384.

Alternatively, if shock absorber 390 is not provided, cargo box 384 is still prevented from over-pivoting to a position in which cargo box 384 contacts a portion of exhaust assembly 362. For example, cargo box frame 386 includes a stop member 408 positioned within a gap 387 defined between a bottom surface 385 of cargo box 384 and an envelope 389 of vehicle including rear frame portion 16 (FIG. 43A). Stop member 408 is configured to contact an engagement surface 410 of upper longitudinal members 80 of rear frame portion 16 when cargo box 384 is in the raised position. As such, the cooperation between stop member 408 and engagement surface 410 provides a hard stop when tilting cargo box 384 such that cargo box 384 does not over-pivot and contact any component of exhaust assembly 362. As such, both with and without shock absorber 390, cargo box 384 remains spaced apart from exhaust assembly 362 when in both the raised and lowered positions. Alternatively, upper longitudinal members 80 may include stop member 408 such that stop member 408 may be configured to contact an engagement surface on cargo box frame 386.

Figure 44:
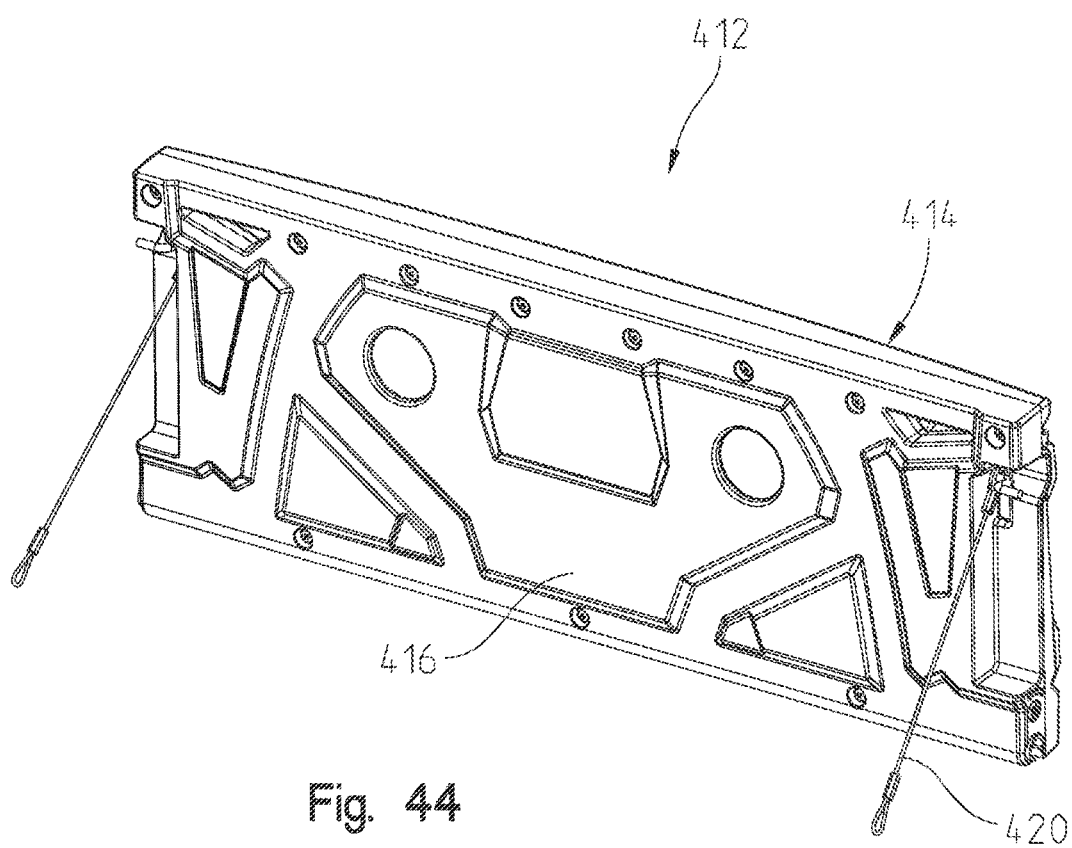
FIG. 44 is a front left perspective view of a tailgate of the rear cargo area of FIG. 40.
Figure 45:
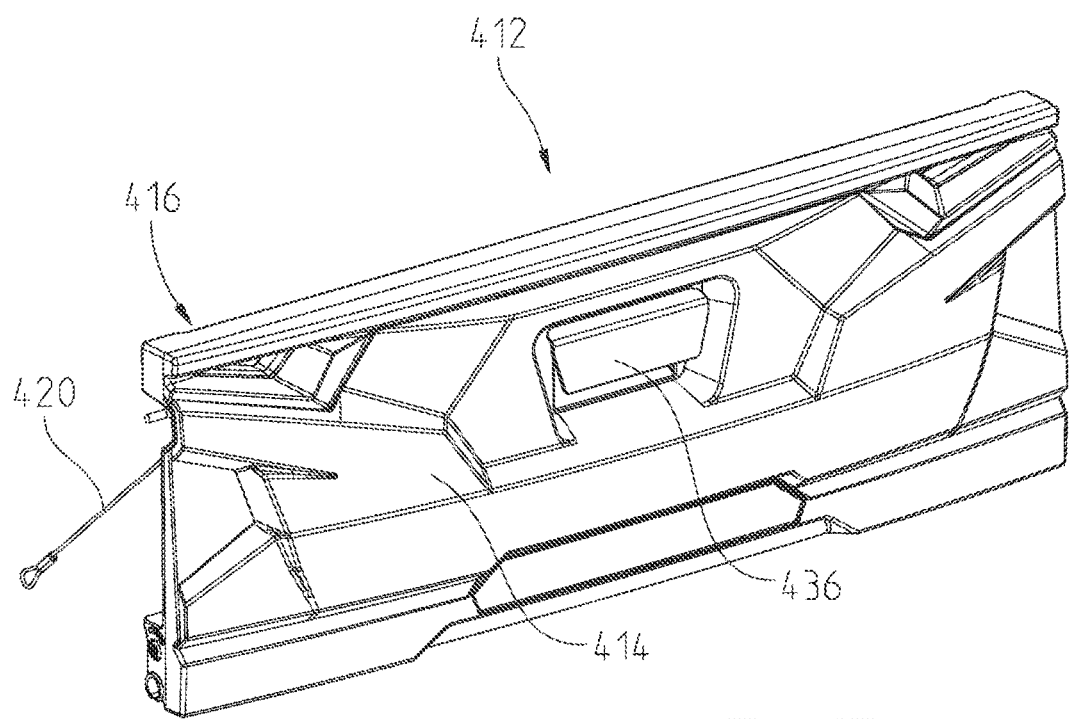
FIG. 45 is a rear left perspective view of the tailgate of FIG. 44.
Figure 46:
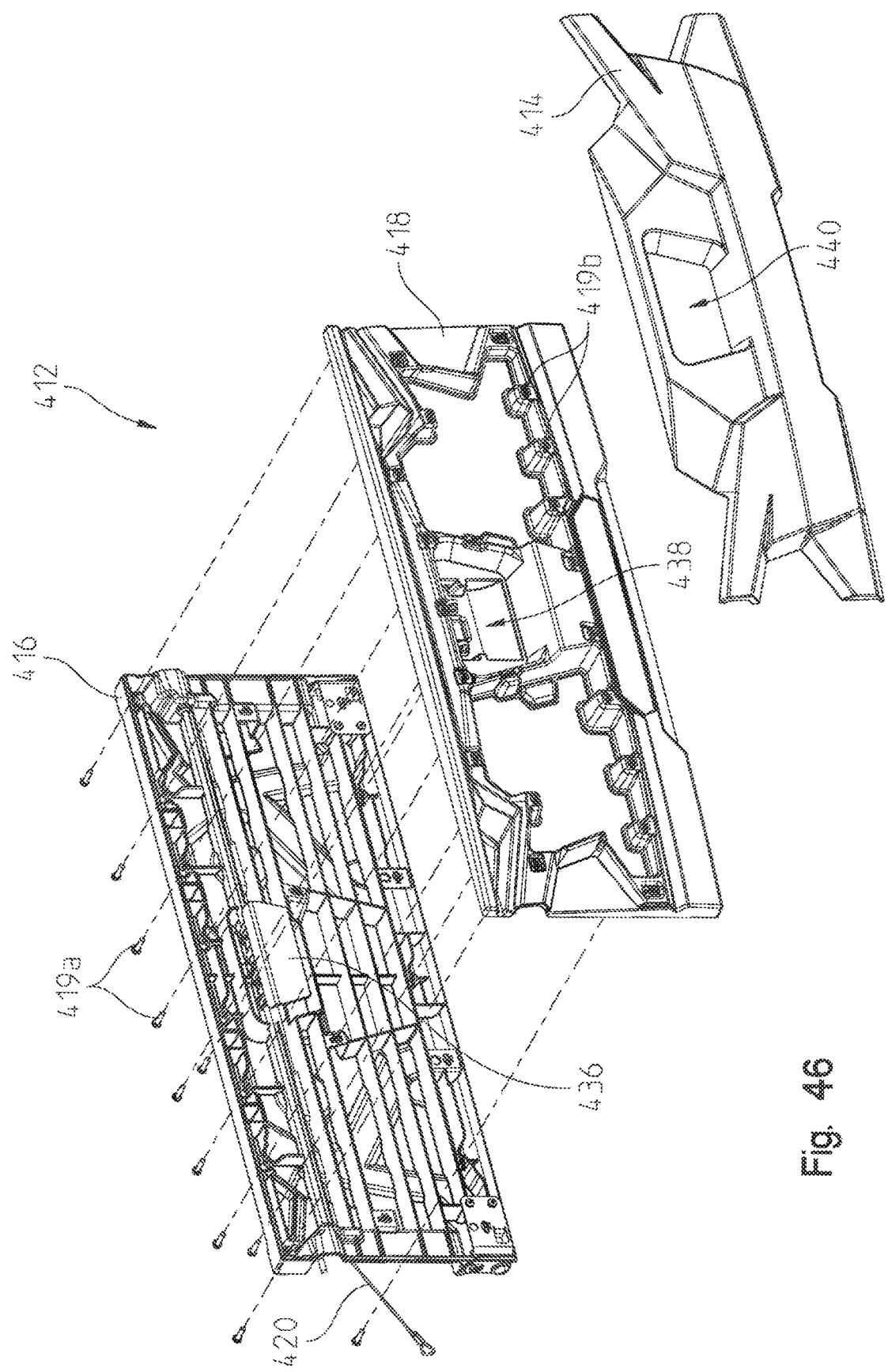
FIG. 46 is an exploded view of the tailgate of FIG. 44.

Referring to FIGS. 44-46, rear cargo area 30 may include a tailgate 412 rotatably coupled to cargo box 384. Illustrative tailgate 412 includes an outer member 414, an inner member 416, and an intermediate member 418 positioned therebetween. Inner and outer members 416, 414 may be comprised of a polymeric material and intermediate member 418 may be comprised of a polymeric and/or metallic material. Outer, inner, and intermediate members 414, 416, 418 are coupled together with a plurality of fasteners 419*a*. Alternatively, inner and intermediate members 416, 418 may be coupled together with fasteners 419*a* and outer member 414 may be configured to snap onto intermediate member 418 through the plurality of friction fit fasteners 419*b*. Outer, inner, and intermediate members 414, 416, 418 are configured to rotate together between a raised and lowered positioned to add or remove cargo from cargo box 384. Straps 420 are coupled to inner member 416 and cargo box 384 to hold tailgate 412 in a predetermined position when rotating to the lowered position. As such, straps 420 allow tailgate 412 to remain in a horizontal configuration when in the lowered position to become an extension of cargo surface 422 (FIG. 47) of cargo box 384, rather than rotating to a position below cargo surface 422 of cargo box 384.

A latching member 436 is operably coupled to inner member 416 and extends through an opening 438 in intermediate member 418 and an opening 440 in outer member 414. Latching member 436 latches and releases tailgate 412 to allow tailgate 412 to pivot between the raised and lowered positions.

Referring to FIG. 47, cargo box 384 also includes side walls 426 positioned generally perpendicular to tailgate 412 and a front wall 427 of cargo box 384. In one embodiment, side walls 426 include at least one storage area 428. Storage area 428 may be integrally formed within side walls 426 and can be used to contain various objects, such as jumper cables, tow ropes, tools, personal effects of the operator and/or passenger, and other item which may be positioned within storage area 428. To contain cargo positioned within storage area 428, a cover 430 may be rotatably coupled to side walls 426. More particularly, cover 430 may include latching members 432 which are received within recesses 433 on side walls 426 when cover 430 is in the raised position and cargo is contained within storage area 428. Additionally, hinge members 434 couple with hinge members (not shown) on cover 430 to allow cover 430 to rotate to between the raised position and a lowered position in which storage area 428 is exposed. Illustratively, because storage areas 428 are integrally formed within side walls 426 of cargo box 384, storage areas 428 are configured to pivot with cargo box 384.

By including storage areas 428 in side walls 426 of cargo box 384, the dimensions of cargo box 384 are not reduced to accommodate the additional storage. For example, cargo box 384 may extend approximately 20-35 inches in the longitudinal direction, approximately 40-50 inches between the inner surfaces of side walls 426 in the lateral direction, approximately 55-65 inches between the outer surfaces of side walls 426 in the lateral direction, and approximately 5-15 inches in the vertical direction. Illustratively, cargo box 384 extends approximately 27 inches in the longitudinal direction, approximately 45 inches between the inner surfaces of side walls 426 in the lateral direction, approximately 60 inches between the outer surfaces of side walls 426 in the lateral direction, and approximately 12 inches in the vertical direction.

Figure 48:
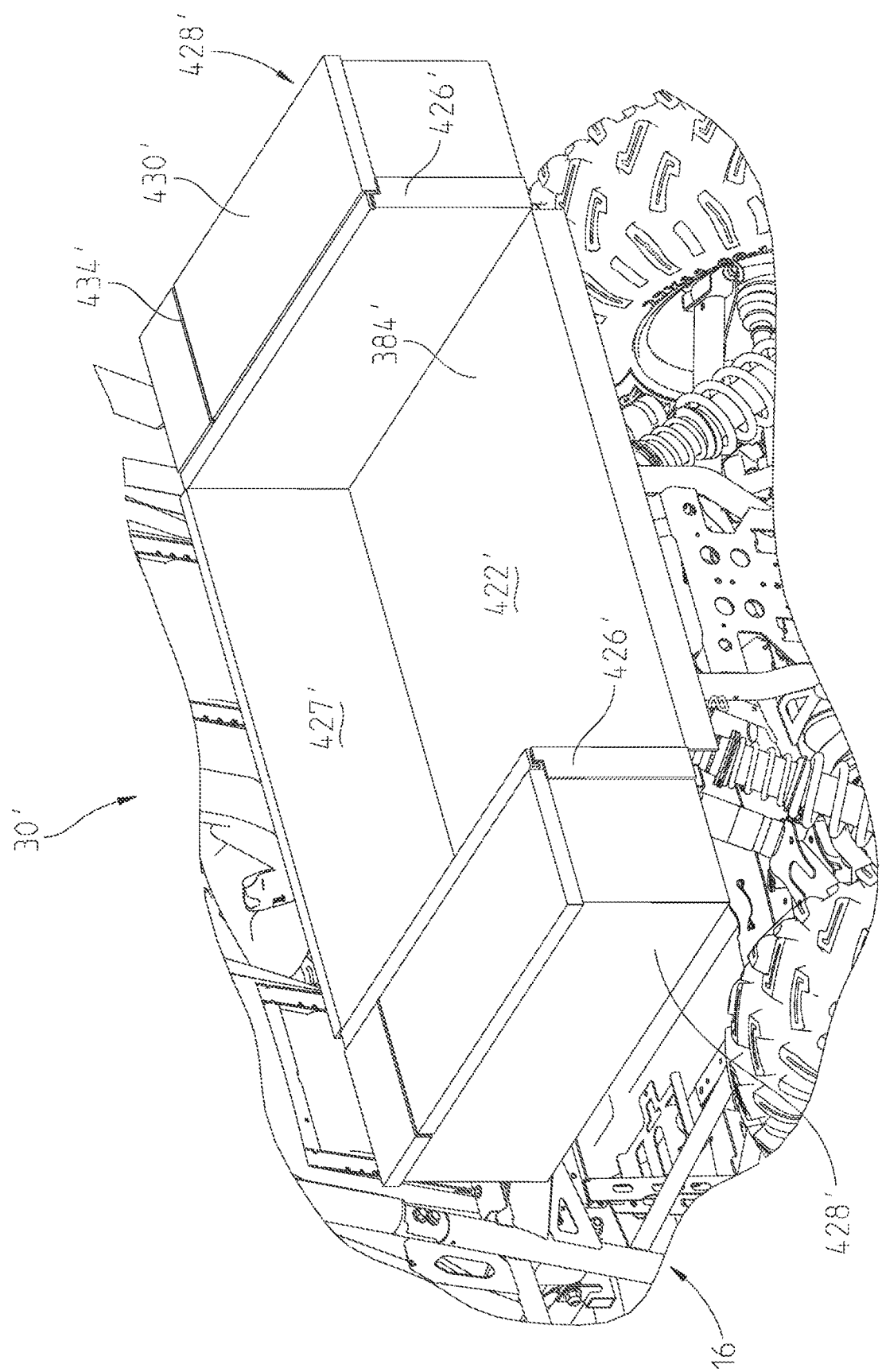
FIG. 48 is a rear left perspective view of an alternative embodiment of the rear cargo area of FIG. 40 in a lowered position.
Figure 49:
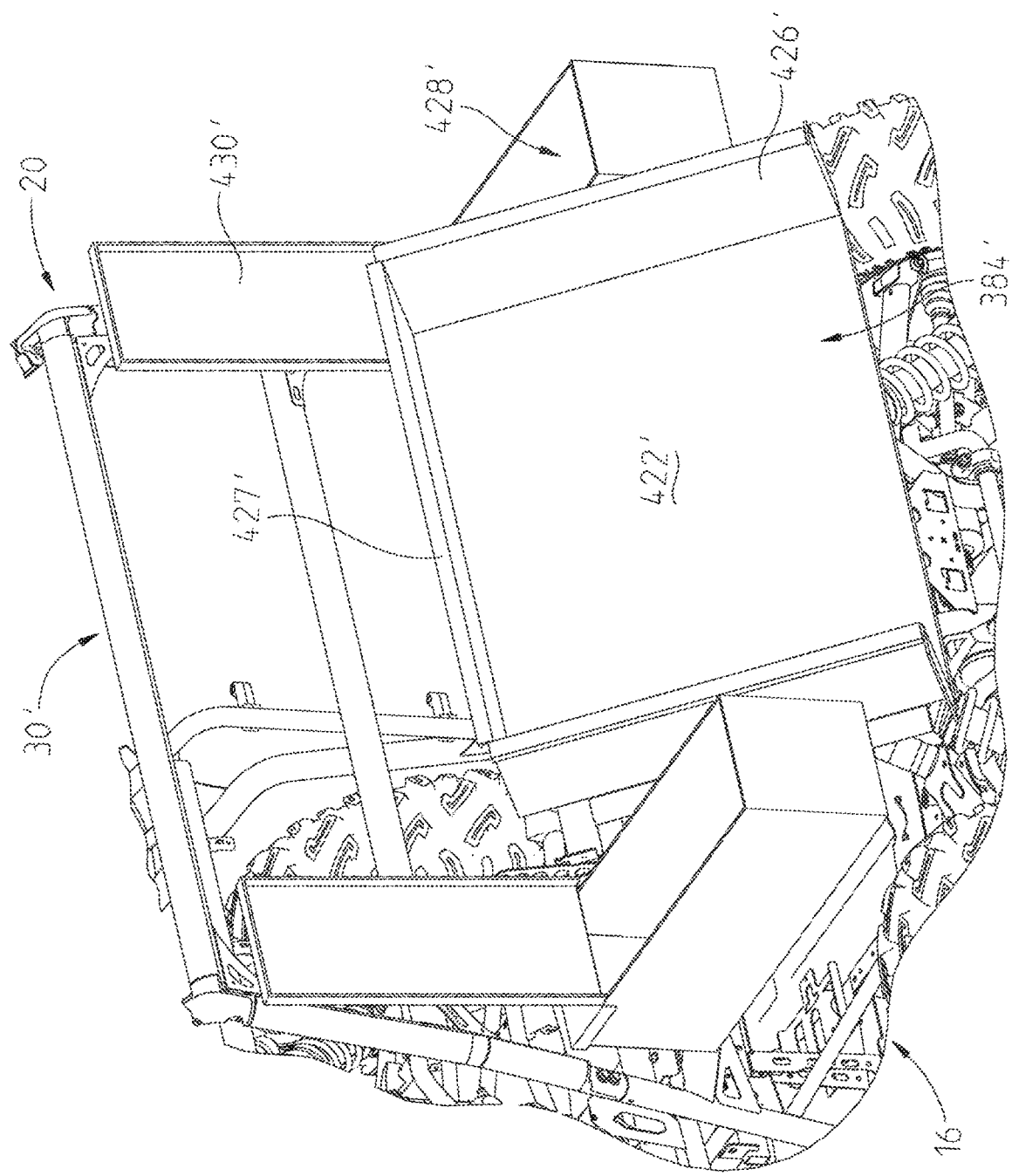
FIG. 49 is a rear left perspective view of the alternative embodiment rear cargo area of FIG. 48 in a raised position.
Figure 50:
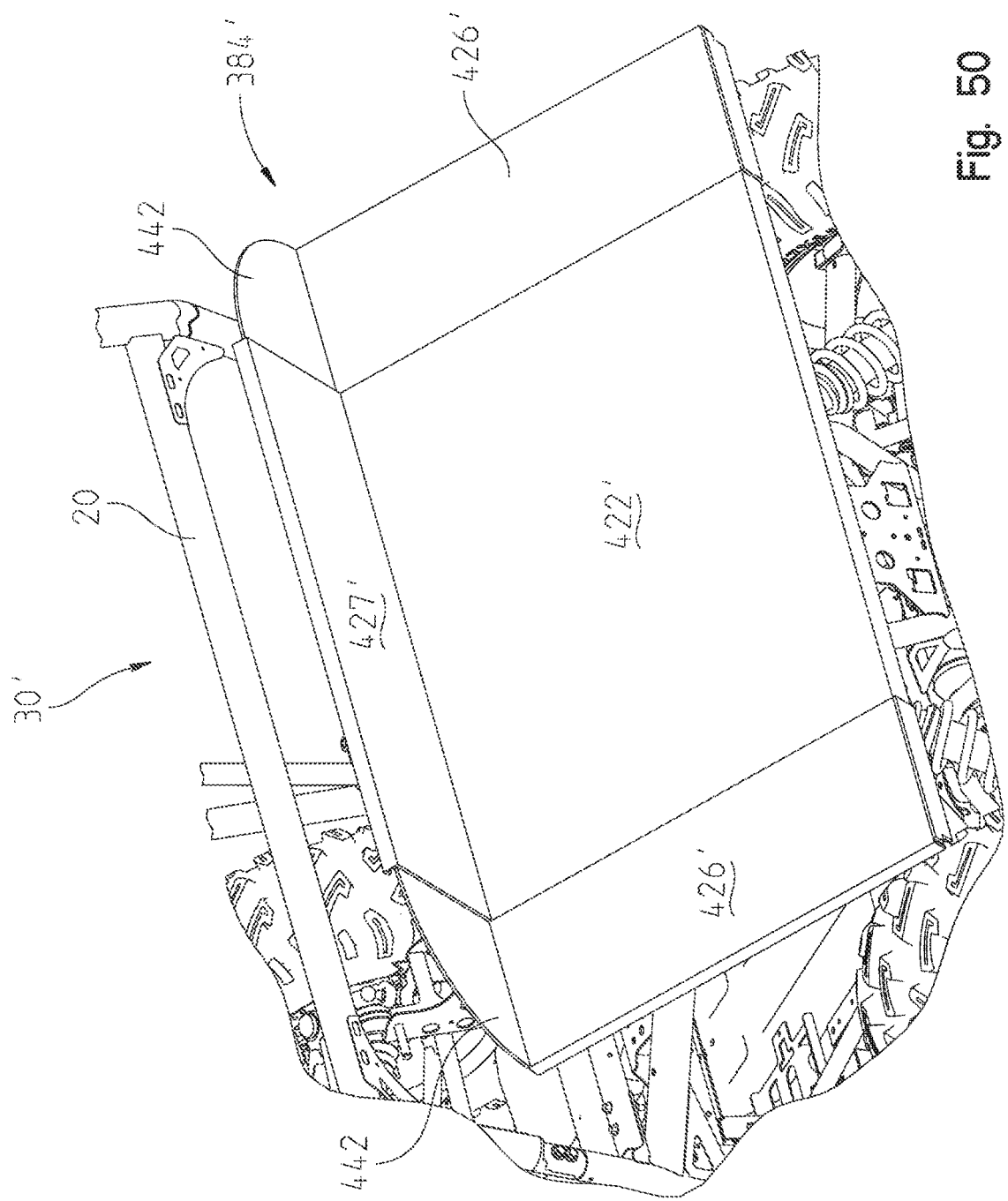
FIG. 50 is a rear left perspective view of the alternative embodiment rear cargo area of FIG. 48 with lateral storage areas removed and side walls of the rear cargo area pivoted to a lowered position.

An alternative embodiment of rear cargo area 30 is shown as a rear cargo area 30' in FIGS. 48-50. Rear cargo area 30' includes a cargo box 384' with a front wall 427', side walls 426', and a cargo surface 422'. Cargo is configured to be positioned on cargo surface 422' and contained between side walls 426' and front wall 427'. Additionally, rear cargo area 30' includes storage areas 428' positioned on one or both lateral sides of cargo box 384' for containing additional cargo in rear cargo area 30'. Storage areas 428' may be removably coupled to rear frame portion 16. Storage areas 428' include covers 430' which are rotatable about hinge members 434' between a raised position in which storage areas 428' are exposed and a lowered position in which cargo is contained within storage areas 428'. Covers 430' are sealed against storage areas 428' such that storage areas 428' define dry storage for rear cargo area 30'.

Cargo surface 422' of cargo box 384' is configured to tilt between a raised and a lowered position. However, storage areas 428' remain stationary relative to cargo surface 422' and lower frame assembly 12 and are not configured to pivot with cargo box 384'. As such, cargo within storage areas 428' remains stationary while cargo within cargo box 384' pivots with cargo box 384'. In this way, cargo box 384' includes a first storage area defined by cargo surface 422' and configured to pivot relative to lower frame assembly 12 and a second cargo area defined by storage areas 428' and fixed to lower frame assembly.

Additionally, and as shown in FIG. 50, because storage areas 428' are removably coupled to rear frame portion 16, side walls 426' of cargo box 384' may be configured to pivot laterally to define a full-size, flat-bed style cargo box. More particularly, side walls 426' include extension portions 442 which are received within the lateral ends of front wall 427' when storage areas 428' are included on vehicle 2. However, when storage areas 428' are removed from vehicle 2, side walls 426' pivot laterally outwardly from front wall 427' to expose extension portions 442 such that extension portions 442 define an extension of front wall 427' and side walls 426' define an extension of cargo surface 422'. When in the extended position shown in FIG. 50, side walls 426' and extension portions 442 are configured to tilt with cargo surface 422' between the raised and lowered position.

In one embodiment, each storage area 428' extends approximately 20-35 inches in the longitudinal direction, approximately 5-12 inches in the lateral direction, and approximately 5-15 inches in the vertical direction. Illustratively, each storage area 428' extends approximately 28 inches in the longitudinal direction, approximately 8.5 inches in the lateral direction, and approximately 10 inches in the vertical direction. Additionally, when storage areas 428' are included on vehicle 2, cargo box 384' extends approximately 20-35 inches in the longitudinal direction, approximately 30-40 inches in the lateral direction, and approximately 5-15 inches in the vertical direction. Illustratively, cargo box 384' extends approximately 28 inches in the longitudinal direction, approximately 36 inches in the lateral direction, and approximately 10 inches in the vertical direction. However, when storage areas 428' are removed and side walls 426' are pivoted to the lowered position such that extension portions 442 are exposed, cargo box 384' may extend approximately 28 inches in the longitudinal direction, approximately 56 inches in the lateral direction, and approximately 10 inches in the vertical direction.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
 a plurality of ground engaging members;
 a frame supported by the plurality of ground engaging members and defining a longitudinal centerline of the utility vehicle;
 an operator seat including a seat bottom and a seat back supported by the frame;
 an engine supported by the frame the engine being positioned rearward of a forward-most edge of the operator seat bottom;
 a continuously variable transmission ("CVT") supported by the frame and positioned rearward of a forward most edge of the operator seat base, the CVT operably coupling the engine to at least one of the plurality of ground engaging members; and
 an air intake system having a first air inlet passage facing a first direction and configured to provide air to an interior of the CVT, and at least a portion of the first air inlet passage being positioned forward of the operator seat, wherein the first direction is angled toward a side of the utility vehicle away from the longitudinal centerline; and the air intake system further comprising a second air inlet passage configured to provide air to the interior of the CVT, and at least a portion of the second air inlet passage being positioned rearward of the operator seat,
 wherein the first air inlet passage is fluidly coupled to a first intake port of the CVT and the second air inlet passage is fluidly coupled to a second intake port of the CVT, the first and second intake ports are positioned on opposing sides of the CVT, and an air outlet port is positioned generally opposite one of the first and second intake ports.

2. The utility vehicle of claim 1, further comprising a passenger seat, the passenger seat positioned laterally adjacent to the operator seat, and the first air inlet passage is defined by a first air inlet conduit positioned laterally between the operator and passenger seats.

3. The utility vehicle of claim 1, further comprising wherein the first air inlet port is located at a position higher than the seat bottom of the operator seat.

4. The utility vehicle of claim 3, wherein the second air inlet port is located at a position higher than the seat bottom of the operator seat.

5. The utility vehicle of claim 4, wherein the first air inlet port and second air inlet port are located at a position higher than the seat bottom of the operator seat.

6. The utility vehicle of claim 1, wherein the air intake system further comprises a CVT air outlet passage having the air outlet port, and the first intake port is generally positioned at a first side of the vehicle, the second air intake port is generally positioned at a second side of the vehicle, and the air outlet port is generally positioned at a third side of the vehicle, wherein the first, second, and third sides are different.

7. The utility vehicle of claim 6, wherein the CVT air outlet passage is positioned rearward of the operator seat.

8. The utility vehicle of claim 7 further comprising wherein the air outlet port, the first air inlet port, and second air inlet port are positioned at a height above a top surface of the CVT.

9. The utility vehicle of claim 1, wherein the air outlet port is generally positioned along a right side of the vehicle.

10. A utility vehicle, comprising:
a plurality of ground engaging members;
a frame supported by the plurality of ground engaging members;
an operator seat including a seat bottom and a seat back supported by the frame;
an engine supported by the frame the engine being positioned rearward of a forward-most edge of the operator seat bottom;
a continuously variable transmission ("CVT") supported by the frame and positioned rearward of a forward most edge of the operator seat base, the CVT operably coupling the engine to at least one of the plurality of ground engaging members;
a first air conduit including a first air inlet port and configured to supply air to an interior of the CVT, wherein the first air inlet port is located at a position higher than the seat bottom of the operator seat;
a second air conduit including a second air inlet port and configured to supply additional air to the interior of the CVT; and
a third air conduit including an outlet port and configured to exhaust air from the interior of the CVT, and at least two of the first, second, and third air conduits are at least partially forward of the engine.

11. The utility vehicle of claim 10, wherein the first port is at a first longitudinal position, the second port is at a second longitudinal position, and the outlet is at a third longitudinal position, and the third longitudinal position is longitudinally intermediate the first and second longitudinal positions.

12. The utility vehicle of claim 10, wherein the outlet port is positioned rearward of the operator seat.

13. The utility vehicle of claim 10, further comprising a passenger seat positioned laterally adjacent to the operator seat, and the first air conduit is positioned laterally between the operator seat and the passenger seat.

14. The utility vehicle of claim 10, wherein the second air inlet port is located at a position higher than the seat bottom of the operator seat.

15. The utility vehicle of claim 10, wherein the outlet port, the first air inlet port, and second air inlet port are positioned at a height above a top surface of the CVT.

16. The utility vehicle of claim 10, wherein the first air inlet faces a first direction, the second air inlet faces a second direction, and the outlet faces a third direction.

17. The utility vehicle of claim 16, wherein the second and third directions are opposite each other.

18. The utility vehicle of claim 16, wherein the first direction is upwardly, the second direction is along a left side of the vehicle, and the third direction is along a right side of the vehicle.

19. A utility vehicle, comprising:
a plurality of ground engaging members;
a frame supported by the plurality of ground engaging members;
an operator seat including a seat bottom and a seat back supported by the frame;
an engine supported by the frame the engine being positioned rearward of a forward-most edge of the operator seat bottom;
a continuously variable transmission ("CVT") supported by the frame and positioned rearward of a forward most edge of the operator seat base, the CVT operably coupling the engine to at least one of the plurality of ground engaging members;
a first air conduit including a first air inlet port configured to receive air, and the first air conduit is fluidly coupled to a first inlet port of the CVT;
a second air conduit including a second air inlet port configured to receive air, and the second air conduit is fluidly coupled to a second inlet port of the CVT; and
a third air conduit including an outlet port, the third air conduit is configured to exhaust air from the interior of the CVT and is fluidly coupled to an exhaust port of the CVT, and one of the first and second air inlet ports is coplanar with the outlet port.

20. The utility vehicle of claim 19, wherein the first air inlet port is located at a position higher than the seat bottom of the operator seat.

21. The utility vehicle of claim 19, wherein the second air inlet port is located at a position higher than the seat bottom of the operator seat.

22. The utility vehicle of claim 19, wherein the outlet port, the first air inlet port, and second air inlet port are positioned at a height above a top surface of the CVT.

23. The utility vehicle of claim 19, wherein the first air inlet faces a first direction, the second air inlet faces a second direction, and the outlet faces a third direction.

24. The utility vehicle of claim 23, wherein the second and third directions are opposite each other.

25. The utility vehicle of claim 19, wherein the vehicle includes a first door positioned on a first side of the vehicle and a second door positioned on a second side of the vehicle, and one of the first and second air intakes is positioned adjacent one of the first and second doors.

26. The utility vehicle of claim 25, wherein each of the first and second doors has a forward extent and a rearward extent extending along a longitudinal length which is approximately equal to an opening allowing ingress and egress from the vehicle, and the one of the first and second air intakes is positioned adjacent the rearward extent.

27. A utility vehicle, comprising:
a plurality of ground engaging members;
a frame supported by the plurality of ground engaging members;
an operator seat including a seat bottom and a seat back supported by the frame;
an engine supported by the frame the engine being positioned rearward of a forward-most edge of the operator seat bottom;
a continuously variable transmission ("CVT") supported by the frame and positioned rearward of a forward most edge of the operator seat base, the CVT operably coupling the engine to at least one of the plurality of ground engaging members;
a first air conduit including a first air inlet port and configured to supply air to an interior of the CVT;
a second air conduit including a second air inlet port and configured to supply additional air to the interior of the CVT, wherein the second air inlet port is located at a position higher than the seat bottom of the operator seat; and
a third air conduit including an outlet port and configured to exhaust air from the interior of the CVT, and at least two of the first, second, and third air conduits are at least partially forward of the engine.

28. A utility vehicle, comprising:
a plurality of ground engaging members;
a frame supported by the plurality of ground engaging members;
an operator seat including a seat bottom and a seat back supported by the frame;
an engine supported by the frame the engine being positioned rearward of a forward-most edge of the operator seat bottom;
a continuously variable transmission ("CVT") supported by the frame and positioned rearward of a forward most edge of the operator seat base, the CVT operably coupling the engine to at least one of the plurality of ground engaging members;
a first air conduit including a first air inlet port and configured to supply air to an interior of the CVT;
a second air conduit including a second air inlet port and configured to supply additional air to the interior of the CVT; and
a third air conduit including an outlet port and configured to exhaust air from the interior of the CVT, and at least two of the first, second, and third air conduits are at least partially forward of the engine, wherein the outlet port, the first air inlet port, and second air inlet port are positioned at a height above a top surface of the CVT.

29. A utility vehicle, comprising:
a plurality of ground engaging members;
a frame supported by the plurality of ground engaging members;
an operator seat including a seat bottom and a seat back supported by the frame;
an engine supported by the frame the engine being positioned rearward of a forward-most edge of the operator seat bottom;
a continuously variable transmission ("CVT") supported by the frame and positioned rearward of a forward most edge of the operator seat base, the CVT operably coupling the engine to at least one of the plurality of ground engaging members;
a first air conduit including a first air inlet port and configured to supply air to an interior of the CVT;
a second air conduit including a second air inlet port and configured to supply additional air to the interior of the CVT; and
a third air conduit including an outlet port and configured to exhaust air from the interior of the CVT, and at least two of the first, second, and third air conduits are at least partially forward of the engine, wherein the second and third directions are opposite each other.

30. A utility vehicle, comprising:
a plurality of ground engaging members;
a frame supported by the plurality of ground engaging members;
an operator seat including a seat bottom and a seat back supported by the frame;
an engine supported by the frame the engine being positioned rearward of a forward-most edge of the operator seat bottom;
a continuously variable transmission ("CVT") supported by the frame and positioned rearward of a forward most edge of the operator seat base, the CVT operably coupling the engine to at least one of the plurality of ground engaging members;
a first air conduit including a first air inlet port and configured to supply air to an interior of the CVT;
a second air conduit including a second air inlet port and configured to supply additional air to the interior of the CVT; and
a third air conduit including an outlet port and configured to exhaust air from the interior of the CVT, and at least two of the first, second, and third air conduits are at least partially forward of the engine, wherein the first direction is upwardly, the second direction is along a left side of the vehicle, and the third direction is along a right side of the vehicle.

* * * * *